United States Patent
Spear, Jr. et al.

[19]

[11] Patent Number: 5,863,671
[45] Date of Patent: *Jan. 26, 1999

[54] PLASTIC PLATELET FUEL CELLS EMPLOYING INTEGRATED FLUID MANAGEMENT

[75] Inventors: Reginald G. Spear, Jr.; Jerrold E. Franklin, both of Sacramento; William A. Hayes, Wilton; David E. Janke, Orangevale, all of Calif.

[73] Assignee: H Power Corporation, Belleville, N.J.

[*] Notice: The term of this patent shall not extend beyond the expiration date of Pat. No. 5,858,567.

[21] Appl. No.: 443,139

[22] Filed: May 17, 1995

Related U.S. Application Data

[63] Continuation-in-part of Ser. No. 322,823, Oct. 12, 1994, abandoned.

[51] Int. Cl.[6] .................................................. H01M 8/04
[52] U.S. Cl. .............................. 429/12; 429/26; 429/34; 429/38
[58] Field of Search .................................. 429/12, 26, 34, 429/35, 38, 39, 210, 129, 247

[56] References Cited

U.S. PATENT DOCUMENTS

| | | |
|---|---|---|
| 3,468,712 | 9/1969 | Gillespie . |
| 3,489,614 | 1/1970 | Tomter . |
| 3,530,005 | 9/1970 | Leonard . |
| 3,634,139 | 1/1972 | Reiser ................................. 136/86 R |
| 3,746,578 | 7/1973 | Warszawski et al. . |
| 3,755,000 | 8/1973 | Demange ............................ 136/86 D |
| 3,814,631 | 6/1974 | Warszawski et al. . |
| 3,901,731 | 8/1975 | Warszawski et al. ................ 136/86 R |
| 4,048,385 | 9/1977 | Regnaut ..................................... 429/34 |
| 4,074,020 | 2/1978 | Regnaut ..................................... 429/34 |
| 4,124,478 | 11/1978 | Tsien et al. ............................. 204/255 |
| 4,210,512 | 7/1980 | Lawrence et al. ..................... 204/257 |
| 4,330,274 | 5/1982 | Perry, Jr. et al. ....................... 429/19 |
| 4,403,018 | 9/1983 | Alfenaar et al. ......................... 429/34 |
| 4,444,851 | 4/1984 | Maru ......................................... 429/26 |
| 4,590,134 | 5/1986 | Warszawski et al. ..................... 429/35 |
| 4,590,135 | 5/1986 | Warszawski et al. ..................... 429/38 |
| 4,604,332 | 8/1986 | Warszawski et al. ..................... 429/38 |
| 4,640,876 | 2/1987 | Warzawski et al. ...................... 429/37 |
| 4,687,607 | 8/1987 | Shigeta et al. ............................ 264/29 |
| 4,718,997 | 1/1988 | Grimes et al. ........................... 204/228 |
| 4,743,519 | 5/1988 | Kaji et al. ................................. 429/36 |
| 4,758,481 | 7/1988 | Fauvel ....................................... 429/39 |
| 4,778,736 | 10/1988 | Kaji et al. ................................. 429/38 |
| 4,869,800 | 9/1989 | Hofmann et al. ........................ 204/253 |
| 4,898,699 | 2/1990 | Hofmann et al. ........................ 264/43 |
| 5,108,849 | 4/1992 | Watkins et al. ........................... 429/30 |
| 5,116,695 | 5/1992 | Rao et al. .................................. 429/12 |

(List continued on next page.)

Primary Examiner—Anthony Skapars
Attorney, Agent, or Firm—Heller, Ehrman, White & McAuliffe; Jacques M. Dulin

[57] ABSTRACT

Improved fuel cell stacks constructed from a plurality of cells, each comprising a series of interrelated mono and bipolar collector plates (BSPs), which in turn are built up by lamination of a core of related non-conductive plastic orceramic platelets sandwiched between conductive microscreen platelets of metal or conductive ceramic or plastic, with an electrode membrane (EMA) between adjacent BSPs. The platelets, both metal and plastic of the composite BSPs, are produced from sheet material with through and depth features formed by etching, pressing, stamping, casting, embossing and the like. Adjacent plates, each with correspondingly relieved features form serpentine channels within the resultant monolithic platelet/cell stack for integrated fluid and thermal management. The plastic platelets are particularly useful for PEM fuel cells employing $H_2$ and Air/$O_2$ as fuel. The platelets are easily made by printing (embossing) processes, and dies made by photolithographic etching for rapid redesign. Each BSP can be individually tailored to each type of membrane, fuel, and intra-cell location within the stack. As materials are cheap and easy to manufacture and assemble, lightweight fuel cells of very high power density are realizable. Industrial applicability includes both stationary and vehicular power supplies, in both micro and macro sizes.

33 Claims, 43 Drawing Sheets

U.S. PATENT DOCUMENTS

| | | | |
|---|---|---|---|
| 5,116,696 | 5/1992 | Barp | 429/26 |
| 5,132,174 | 7/1992 | Romanowski | 429/26 |
| 5,192,627 | 3/1993 | Perry, Jr. et al. | 429/17 |
| 5,230,966 | 7/1993 | Voss et al. | 429/26 |
| 5,252,410 | 10/1993 | Wilkinson et al. | 429/33 |
| 5,300,370 | 4/1994 | Washington et al. | 429/34 |
| 5,356,731 | 10/1994 | Sitters et al. | 429/45 |
| 5,382,478 | 1/1995 | Chow et al. | 429/26 |
| 5,432,021 | 7/1995 | Wilkinson et al. | 429/17 |

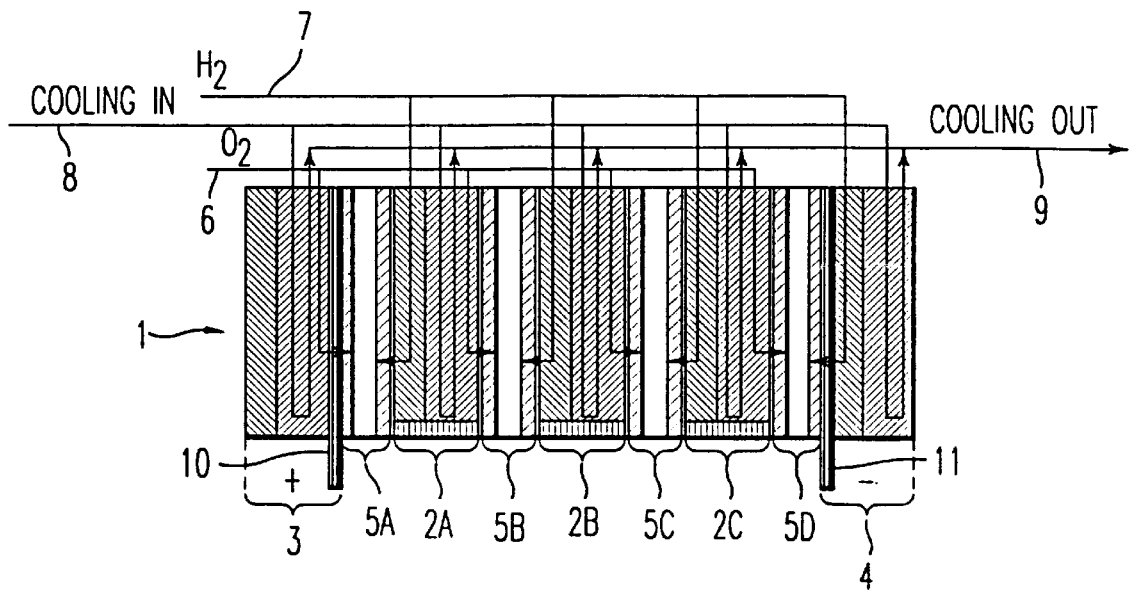
FIG. 1
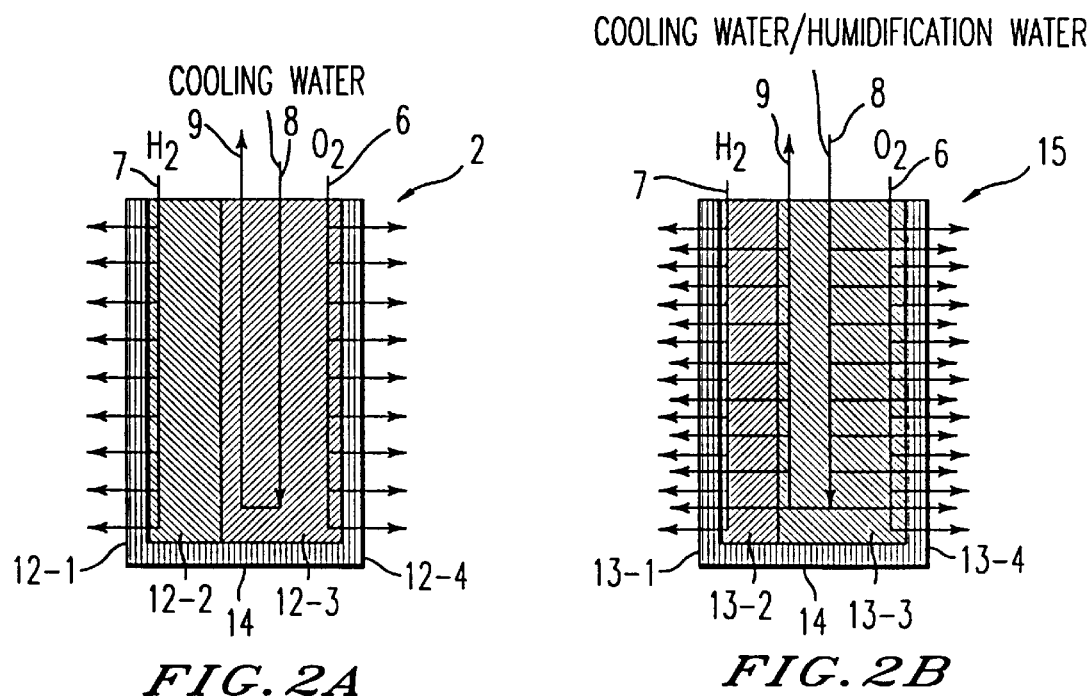
FIG. 2A
FIG. 2B

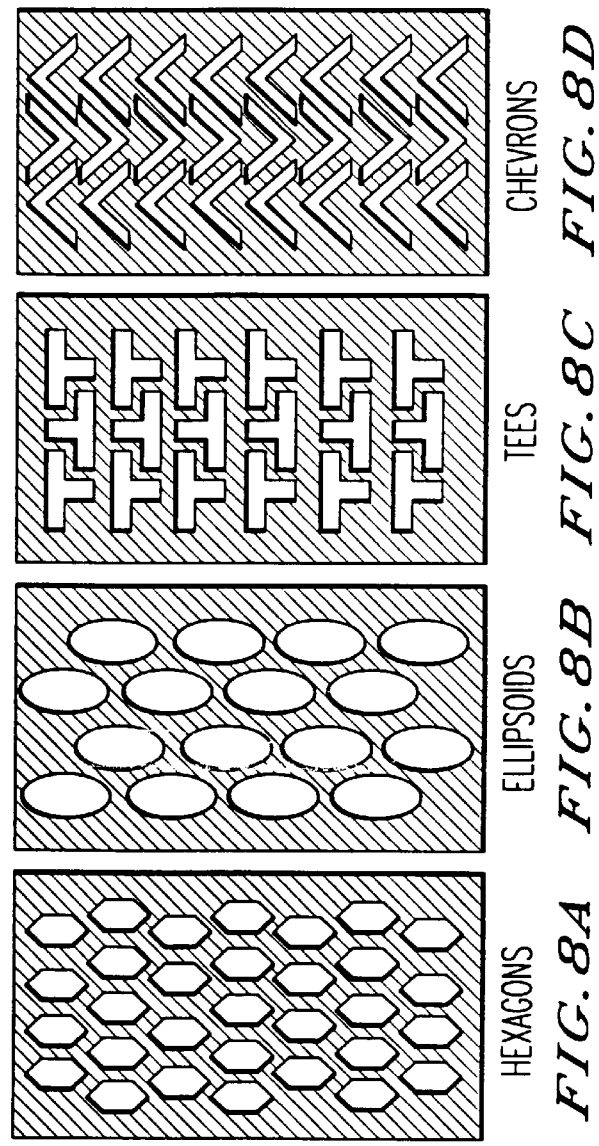
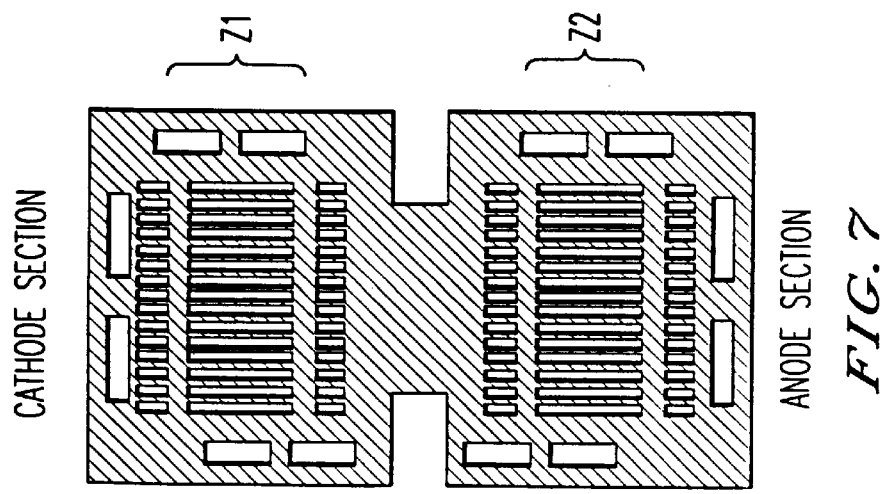

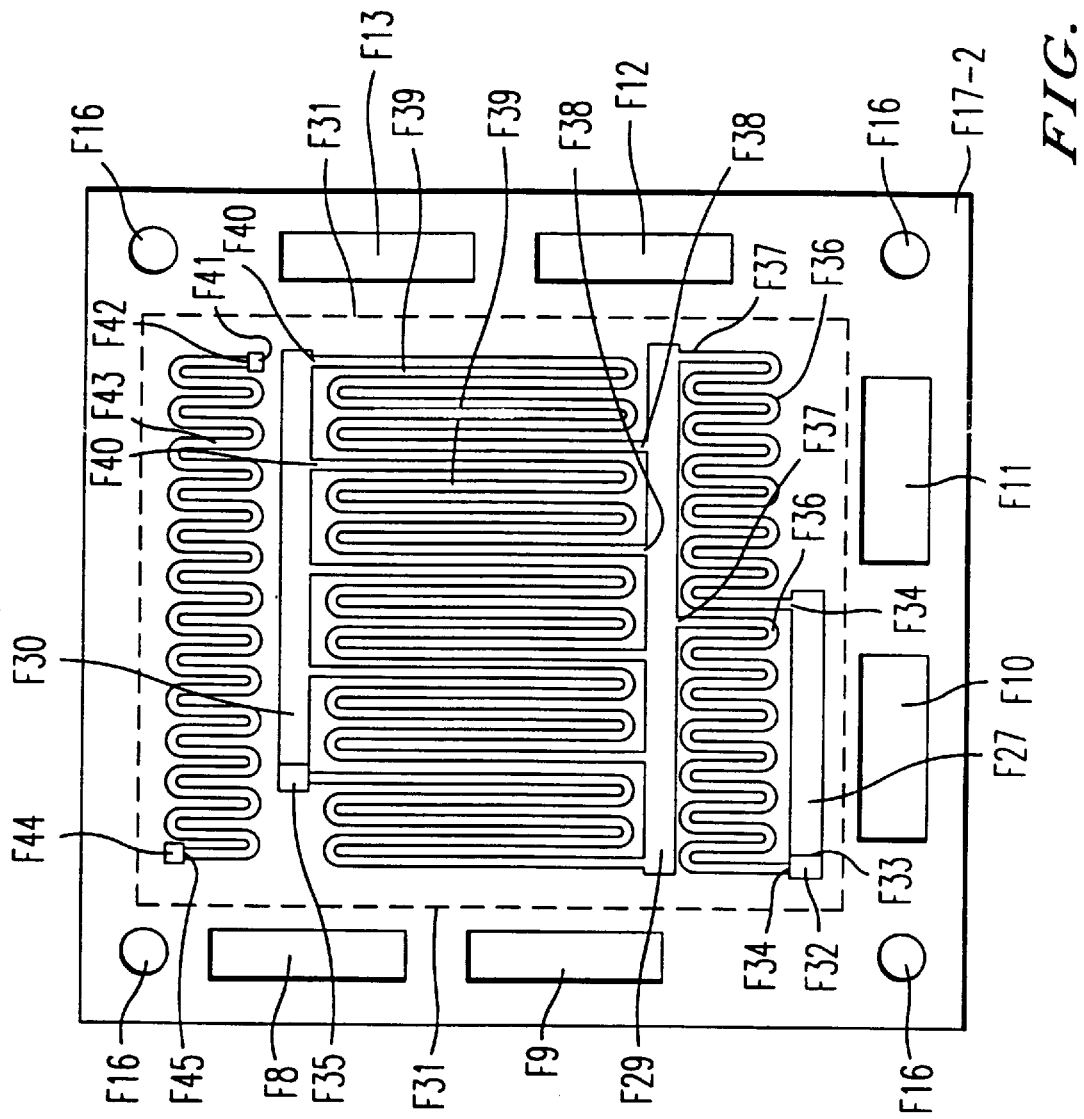

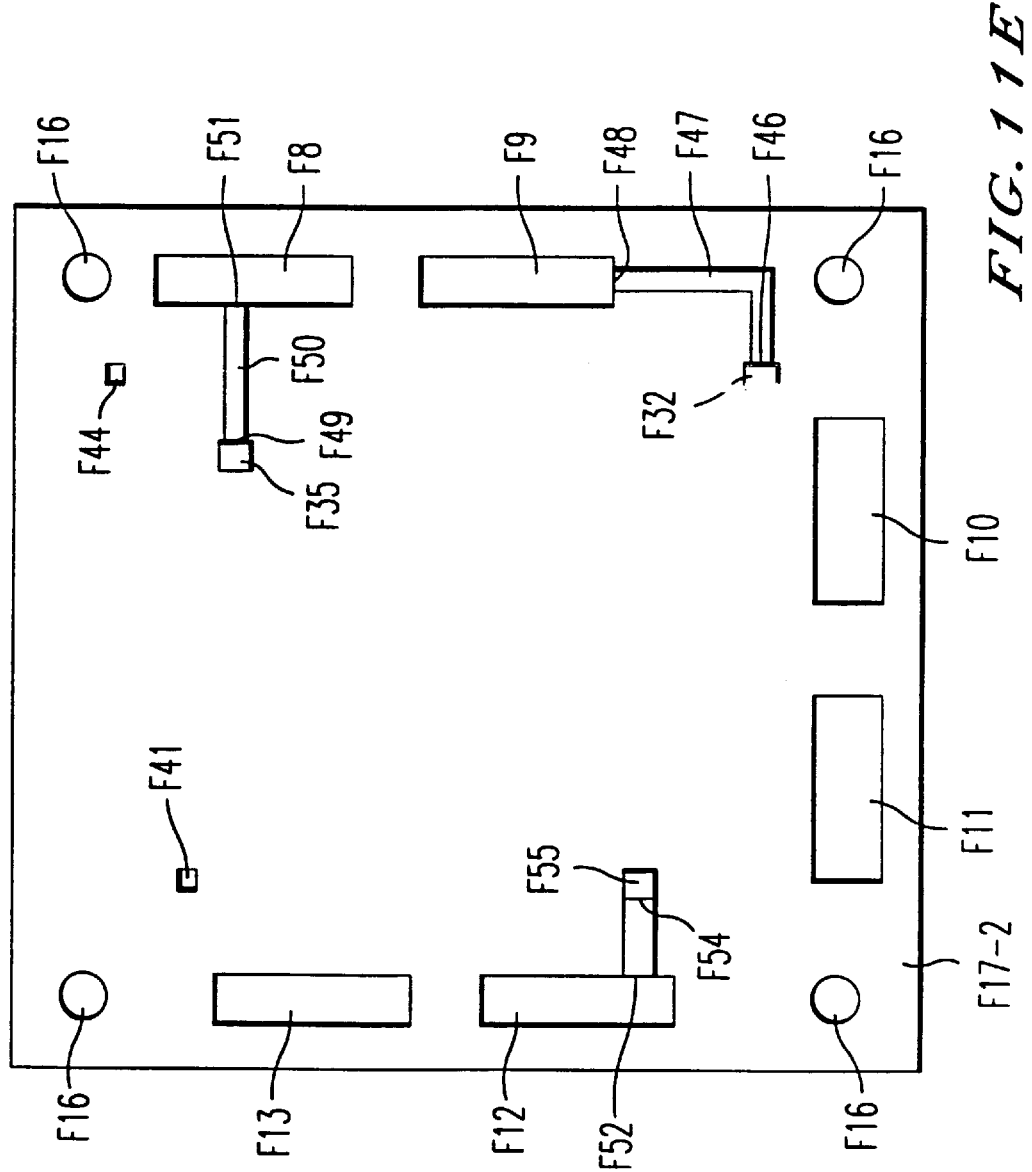

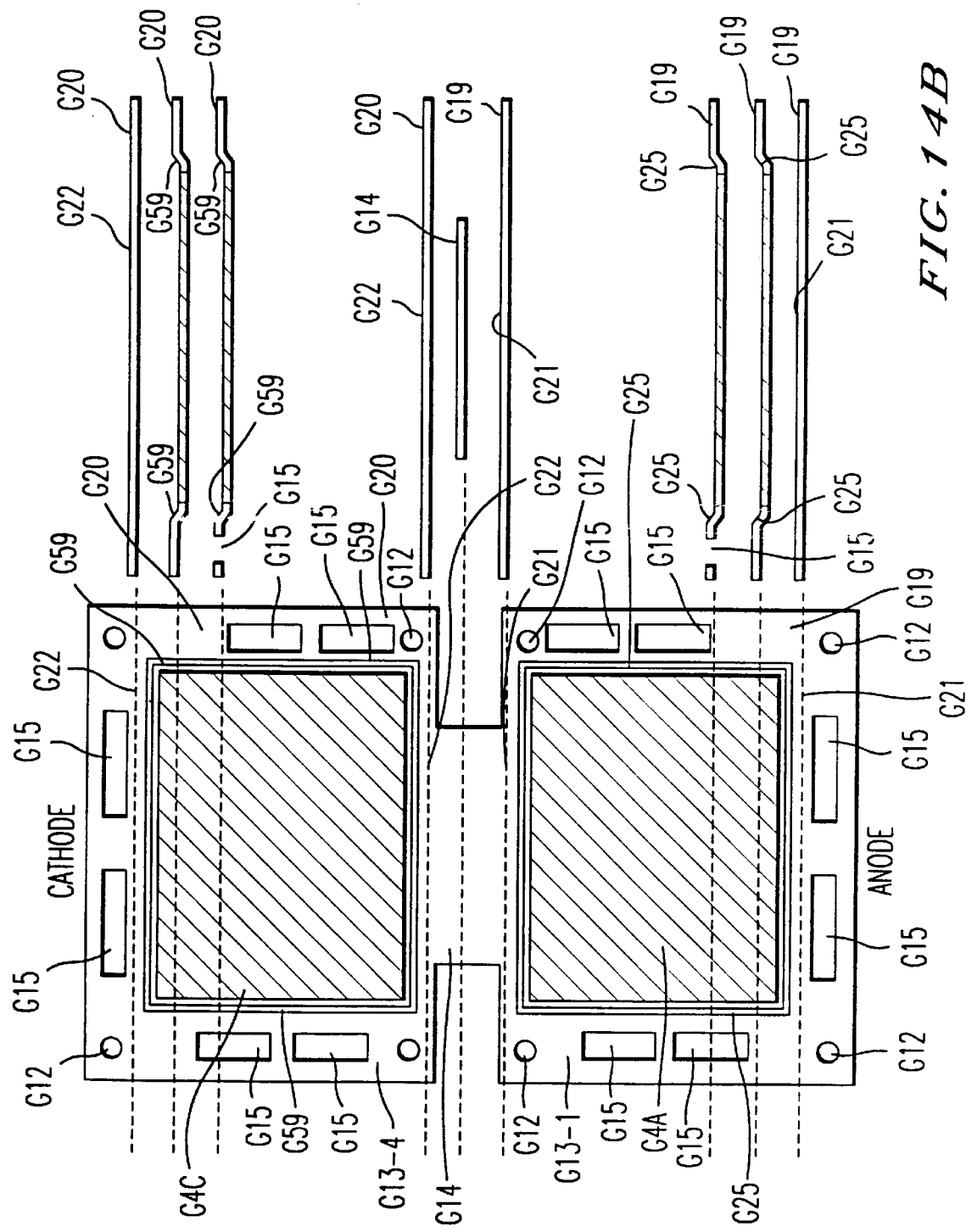

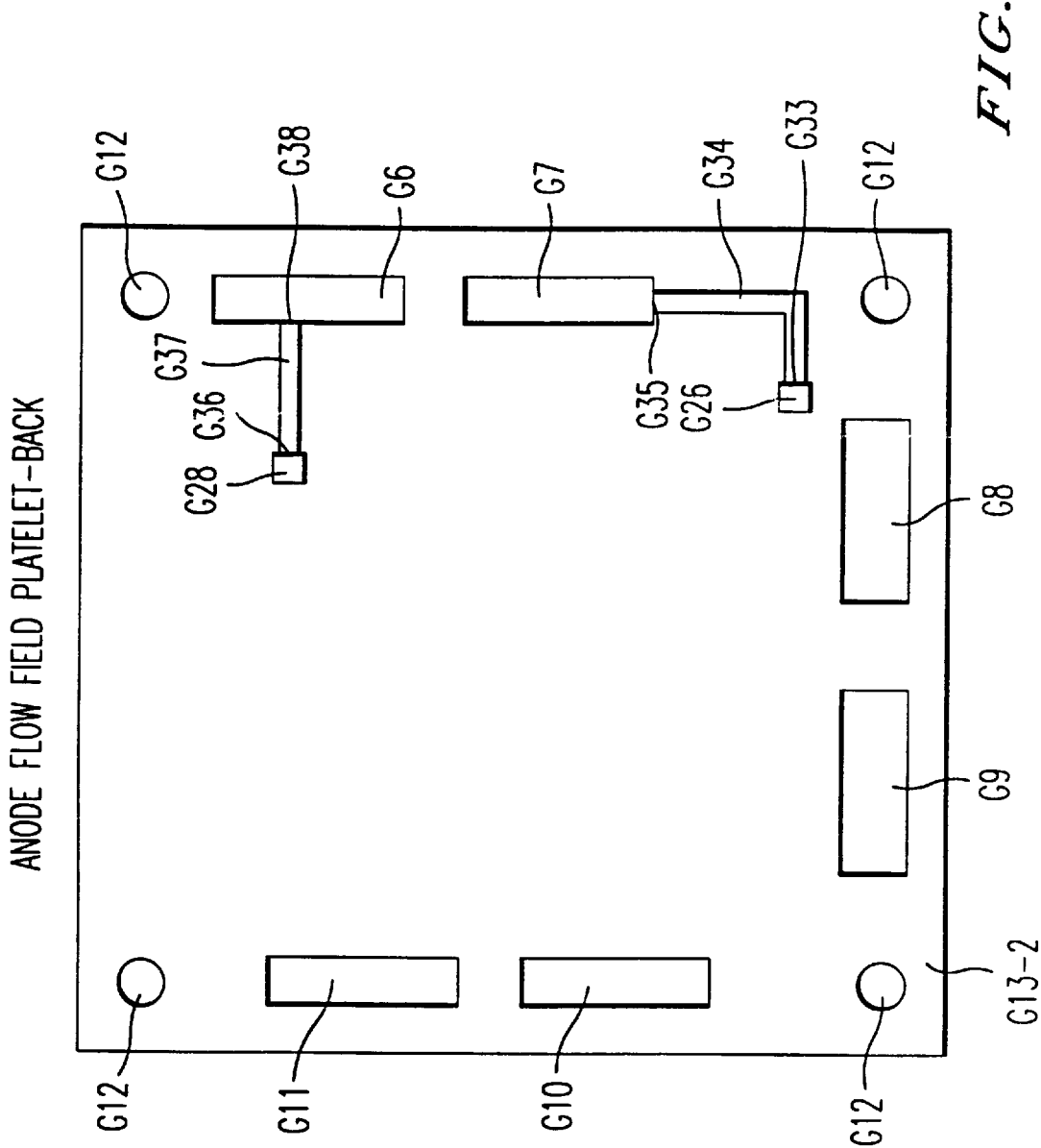

CATHODE FLOW FIELD PLATELET-FRONT

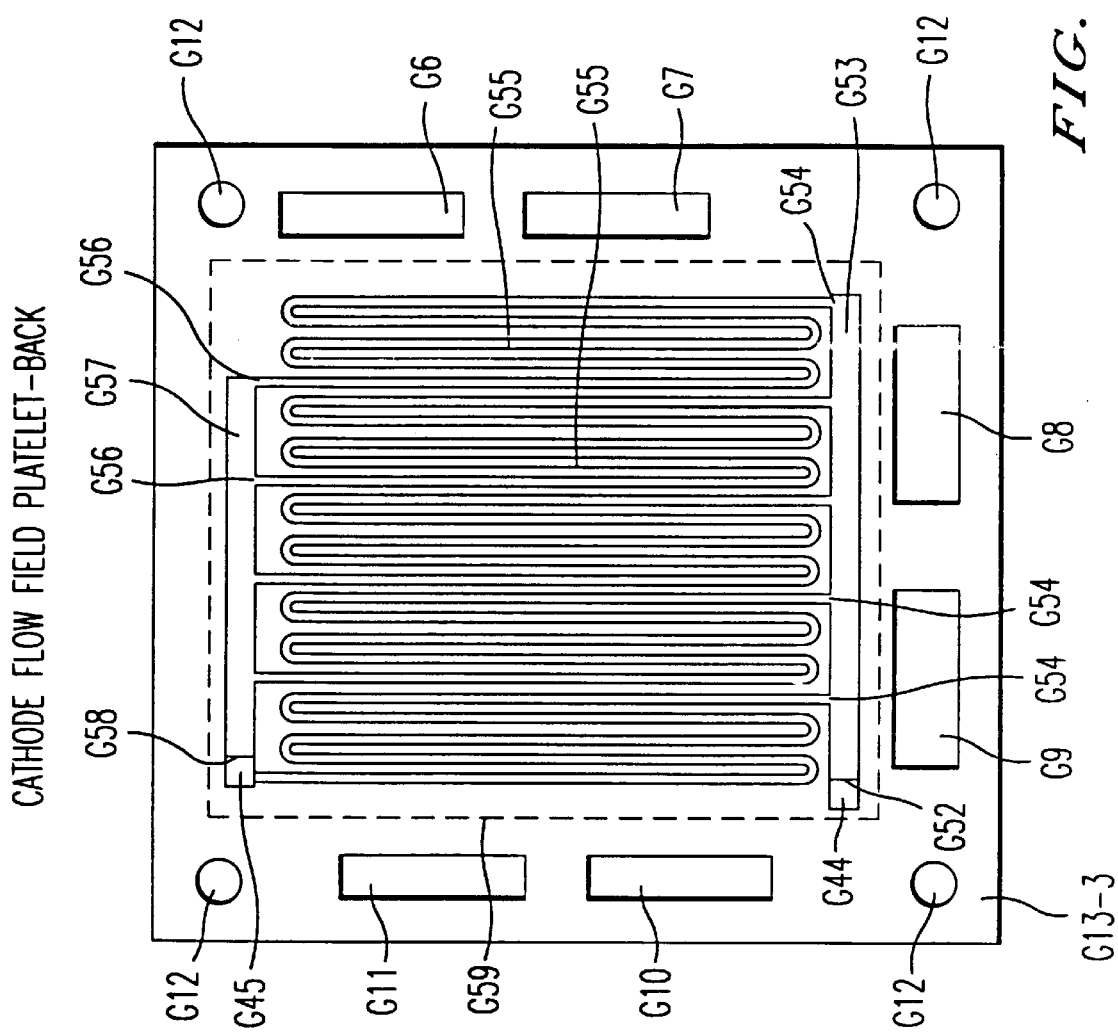

MULTIPLE CURRENT BRIDGE MICROSCREEN
BI-POLAR SEPARATOR PLATE CONSTRUCTION
WINDOW FRAME CONFIGURATION

INTEGRATED HUMIDIFICATION AND THERMAL MANAGEMENT BUS BAR
MICROSCREEN BI-POLAR SEPERATOR PLATE CONSTRUCTION

INTEGRATED HUMIDIFICATION AND THERMAL MANAGEMENT BUS BAR
MICROSCREEN BI-POLAR SEPERATOR PLATE CONSTRUCTION

ANODE AND CATHODE MICROSCREEN PLATELET-FRONT OR BACK

ANODE FLOW FIELD PLATELET-FRONT

ANODE FLOW FIELD PLATELET-BACK

CATHODE FLOW FIELD PLATELET-FRONT

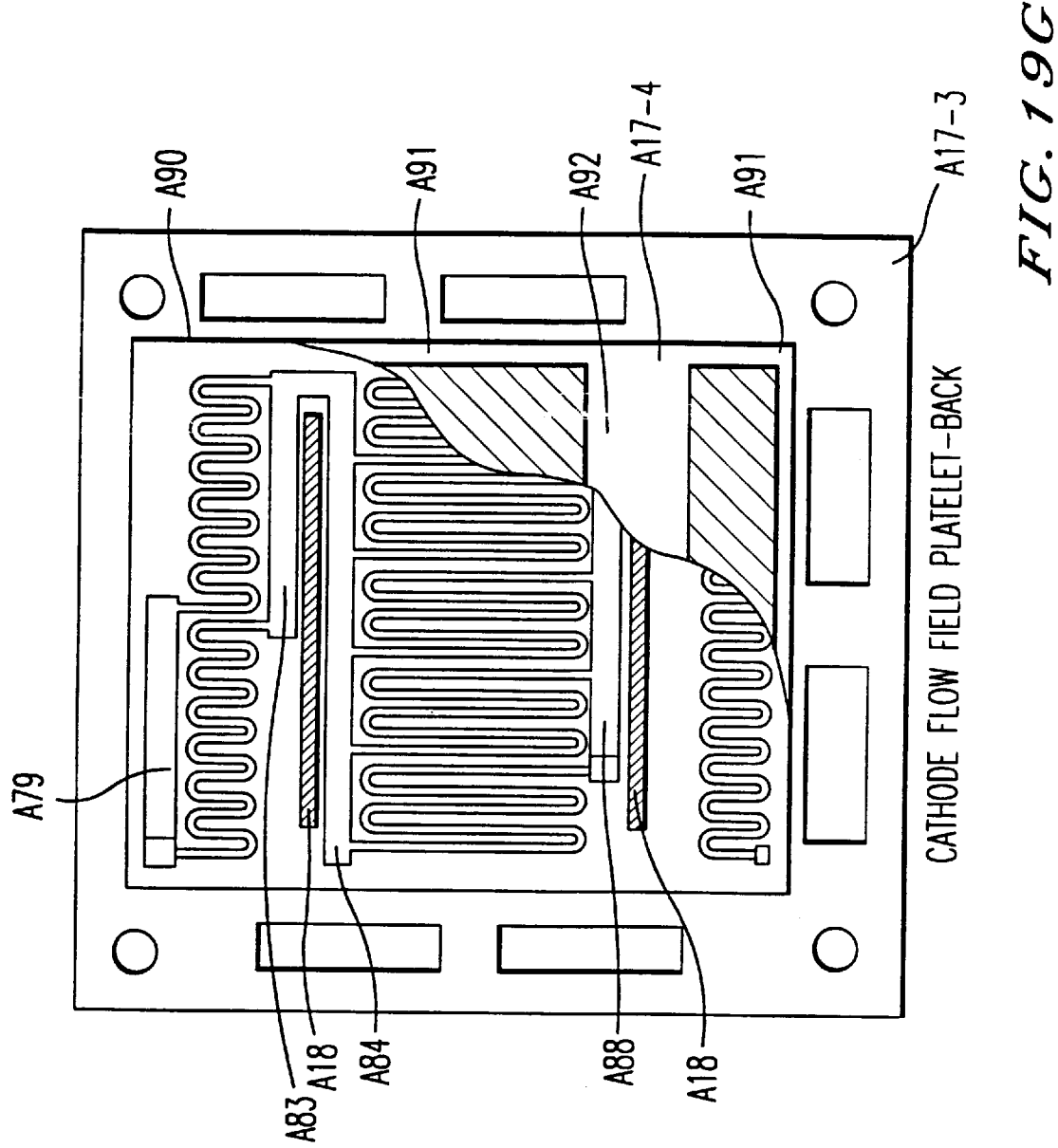
FIG. 19G  CATHODE FLOW FIELD PLATELET-BACK

INTEGRATED THERMAL MANAGEMENT BUS BAR MICROSCREEN BI-POLAR
SEPARATOR PLATE CONSTRUCTION

INTEGRATED THERMAL MANAGEMENT BUS BAR MICROSCREEN BI-POLAR
SEPARATOR PLATE CONSTRUCTION

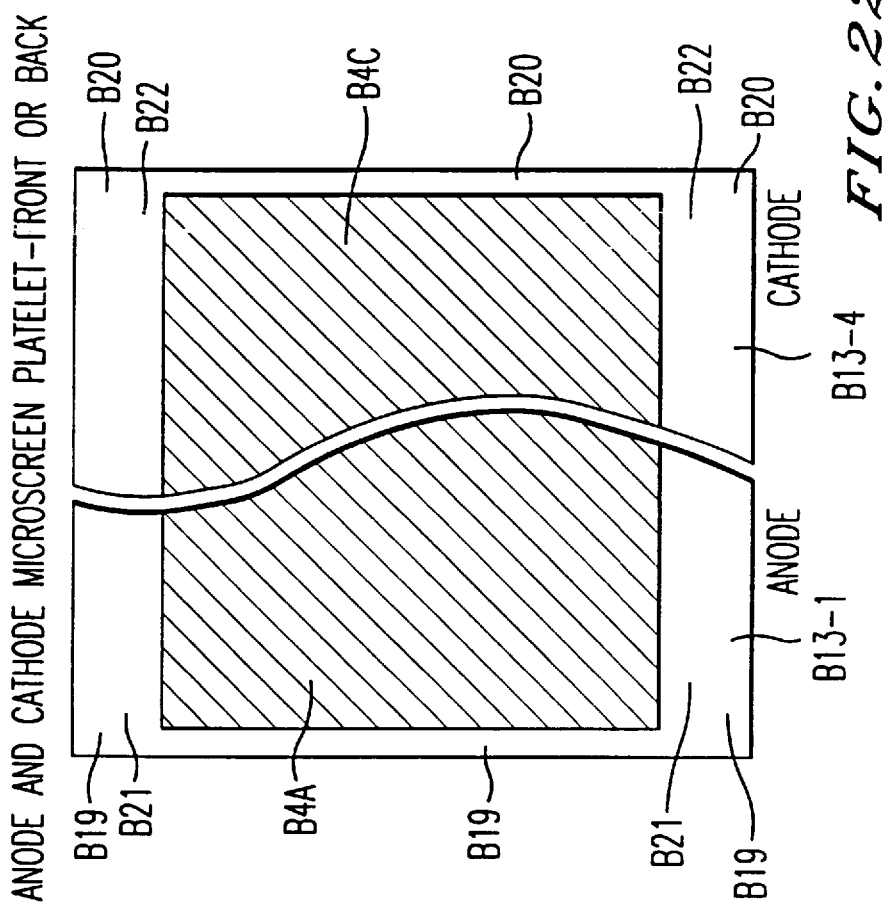

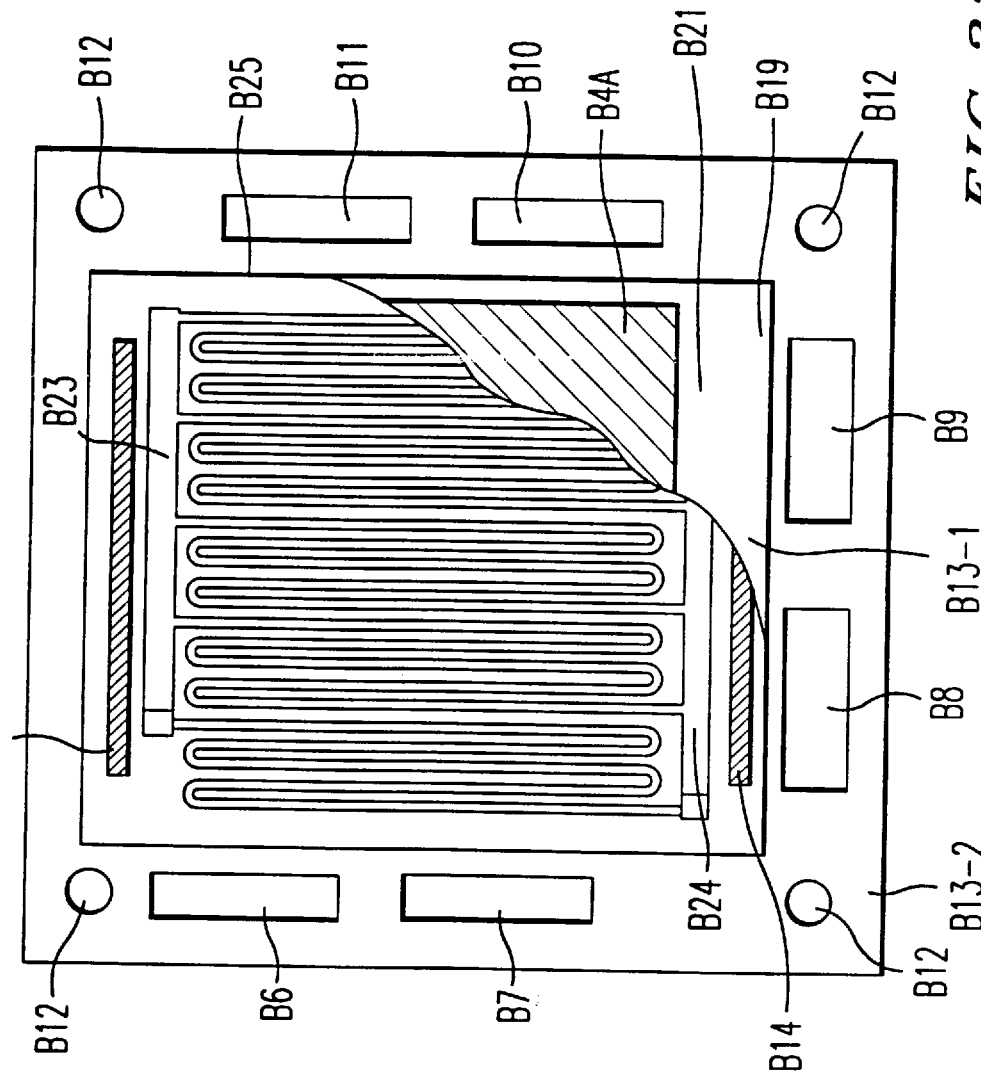

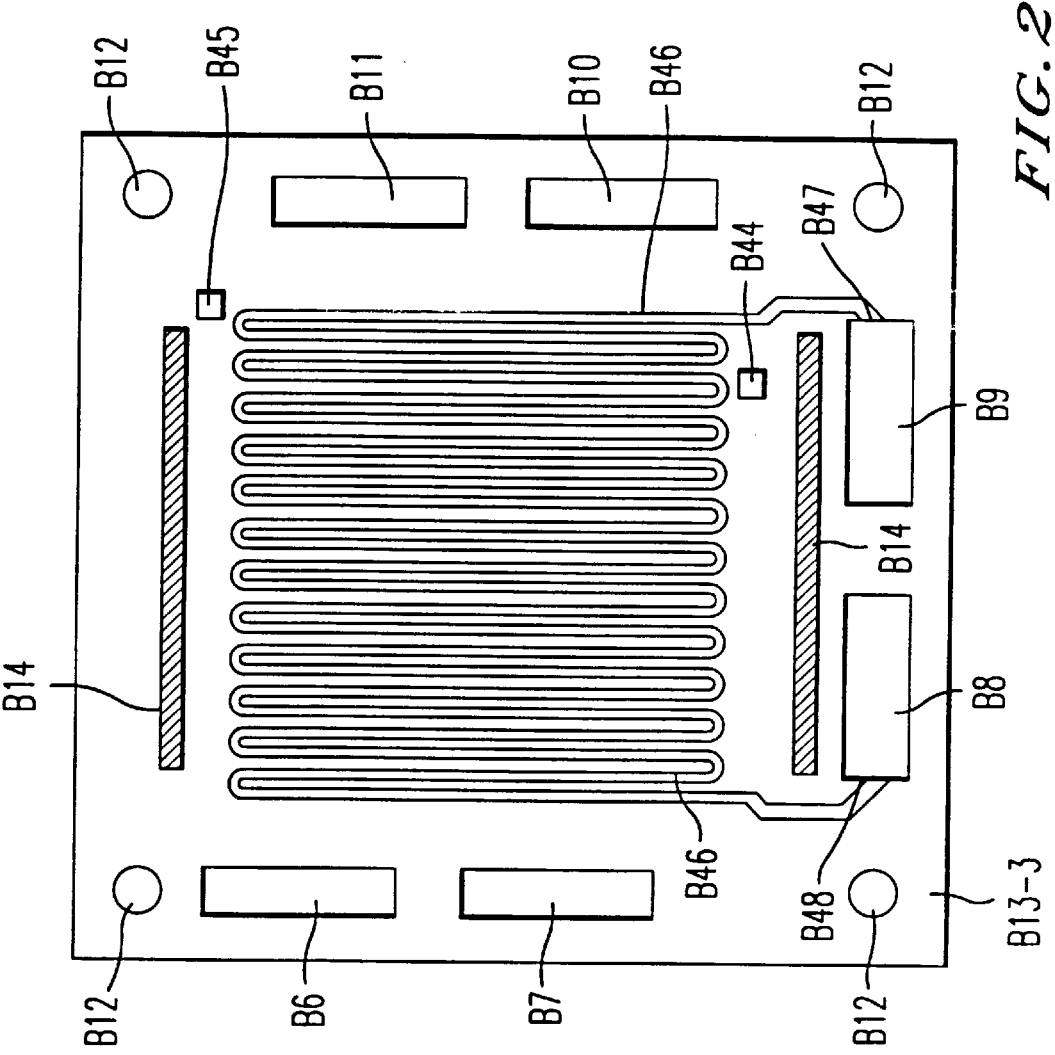

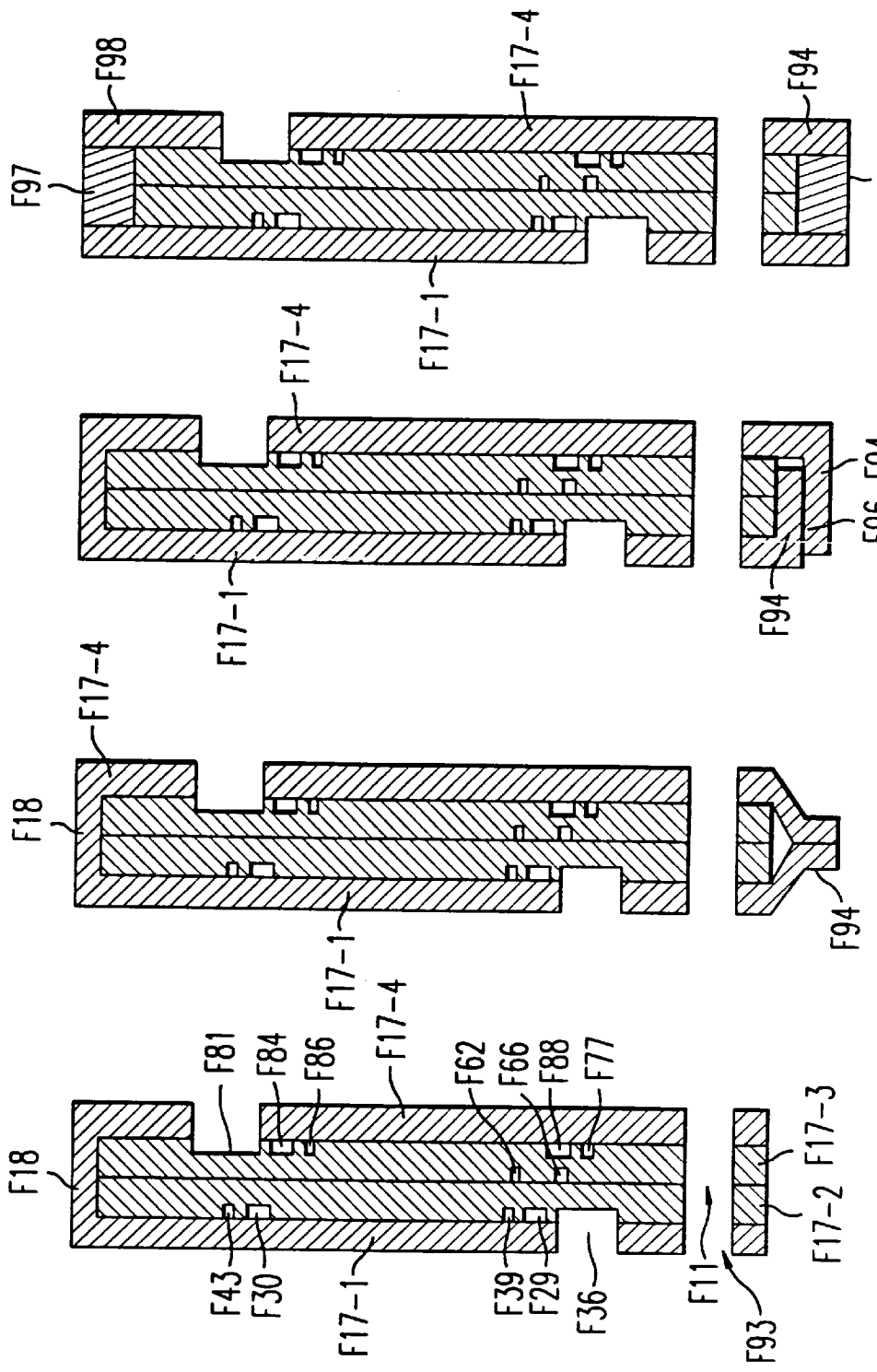

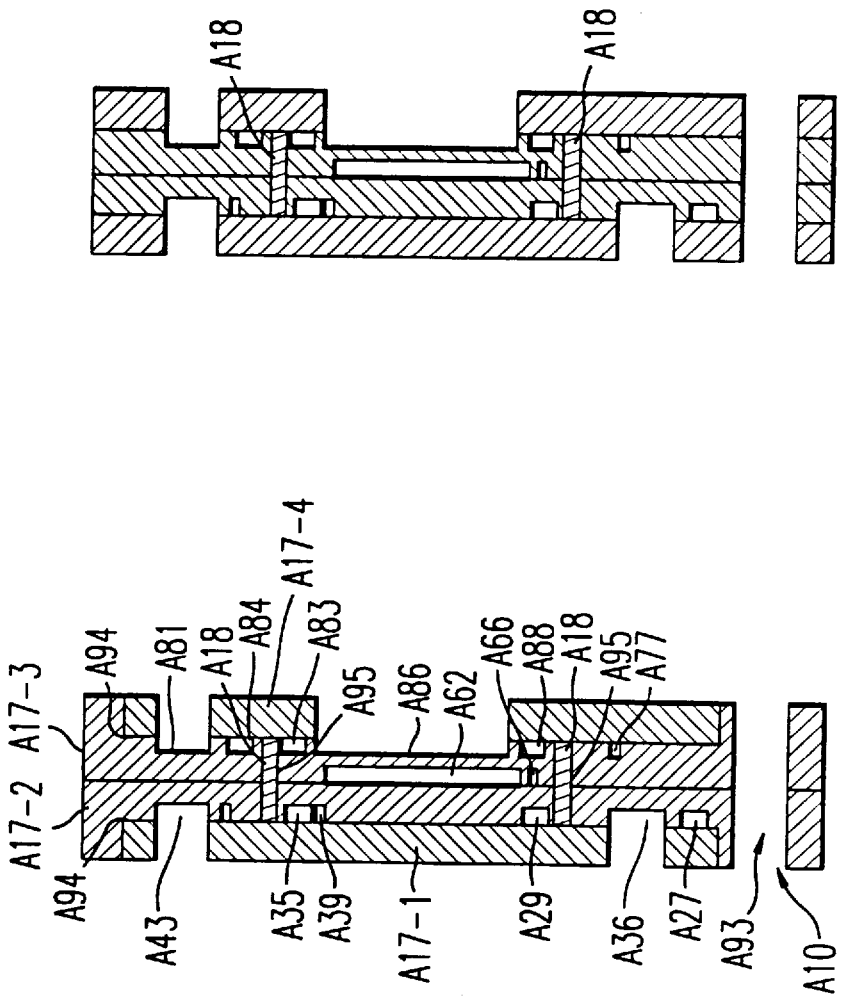

PLASTIC PLATELET FUEL CELLS EMPLOYING INTEGRATED FLUID MANAGEMENT

CROSS-REFERENCE TO RELATED APPLICATION

This application is a continuation-in-part of U.S. application Ser. No. 08/322,823 filed Oct. 12, 1994 by Spear et al., now abandoned, entitled Fuel Cells Employing Integrated Fluid Management Platelet Technology, the benefit of the filing date of the common subject matter of which is claimed under 35 U.S.C. § 120 and the subject matter of which is hereby incorporated by reference herein.

TECHNICAL FIELD

This invention relates to plastic platelet fuel cells, and more particularly to fuel cells constructed of stacked platelets having integrated fluid management (IFM) features, and to methods of manufacture and operation of the IFM cells. A particular embodiment employing the principles of this invention is a hydrogen-air/$O_2$ fuel cell employing multiple composite separators formed of bonded platelets of plastic, forming a fluid management core, with metallic or other electrical conduction type surface platelets functioning as current collectors. The platelets have individually configured microchannel reactant gas, coolant and humidification zones therein. Typical IFM plastic platelet cells of this invention operate in the range of about 50° to 150° C., with an output on the order of 0.25–1.0 kW per Kg (0.5–1.0 kW/L) for use in both stationary and mobile power generation applications in open or closed loop configurations. The IFM platelet and separator design can be adjusted throughout the fuel cell stack to accommodate varying thermal management and humidification requirements within each cell as a function of its position in the stack.

BACKGROUND OF THE ART

Fuel cells for direct conversion of hydrogen or carbonaceous fuels to electricity have shown great theoretical promise, but have not become widely used in commerce because of technical problems and economic reasons. In the field of hydrogen-air/$O_2$ fuel cells, power density, that is kilowatts of power generation per kilogram, has been marginal, and the lifetime has been unsatisfactorily short. Prior art cells have experienced drop-off in power with age due in part to poisoning of catalysts or electrolyte membranes, and the poor distribution of fuel gases internally has led to thermal hot spots leading to cell failure and the like.

A particularly important class of fuel cells with promise for stationary and mobile electricity generation is the low temperature $H_2/O_2$ fuel cell employing solid polymeric proton exchange membrane having a noble metal catalyst coated on at both sides thereof, which membrane is located between the fuel cell electrodes. These fuel cells employ $H_2$ as fuel, whether directly supplied as such or generated in association with the cell by chemical reaction, such as electrolysis, from metal hydrides or from reformed hydrocarbons. The oxidant is $O_2$ or air where suitable. Water is required both for cooling and for humidification of the membrane, to keep it from drying out and becoming inefficient or structurally weakened through stretching and cracking. Typically, the anode side dries out first for a variety of reasons, including: electro-osmotic pumping from anode to cathode; supply of gases in excess of the electrochemical reaction rate; and the air or oxygen flow on the cathode side purges both the product water and the water vapor passing through the membrane from the hydrogen anode side. Accordingly, the fuel gases need to be humidified in the fuel cell stack to reduce the dehydration effect. The cooling water removes excess heat generated in the slow combustion of the catalyst-mediated electrochemical reaction in the cells, and is conducted external of the stack for heat exchange. In some designs the cooling water is used to humidify the reactant gases.

There are several suitable electrode membrane assemblies (EMAs) available for such low temperature fuel cells. One is from H-Power Corp of Belleview, New Jersey which employs a Pt catalyst coated on a polymer film, such as DuPont NAFION® brand perflourosulfonated hydrocarbon as the membrane. Alternatively, Dow Chemical provides a perflourosulfonated polymer which has been reported in U.S. Pat. No. 5,316,869 as permitting current densities on the order of 4000 amps/s.f. with cell voltages in excess of 0.5 V/cell, for a cell stack power density in excess of 2 kW/s.f.

A typical design of a currently available fuel cell stack is the Ballard Fuel Cell Stack of 35 active electrochemical cells, 19 thermal management cells, and 14 reactant humidification cells employing a Pt on NAFION-117 EMA in stacks of ¼" thick graphite plates. The stack is reported to have an overall volume of 0.5 cu. ft. with a weight of 94 lbs and a 3 kW output from $H_2$ and $O_2$.

However, the graphite plates must be relatively thick to provide structural integrity and to prevent reactant crossover. That is, since the graphite is porous to $H_2$ and $O_2$, it must be at least 0.060" thick to reduce the permeation crossover to an acceptable level. Further, graphite plates are brittle. Thus, they are prone to crack as the cell stacks must be placed under compression to effect intra and inter-cell sealing to prevent reactant gas leakage. Graphite plates have low thermal and electrical conductivity which gives rise to hot spots and dead spots. They are also difficult to manufacture, especially the gas distribution channels. The stack output is relatively low, on the order of 0.03 kW/lb. In the example cited above, the number of inactive cooling and humidification cells almost equals the number of active electrochemical cells. This effectively doubles the number of gasketed seals required in a stack thereby decreasing stack reliability and performance.

The aforementioned U.S. Pat. No. 5,316,869 does not offer a solution to graphite plate cell stack design as it is concerned with microprocessor control of a closed loop system external to the stack.

Accordingly, there is a need for an improved fuel cell design, and methods of producing the fuel cells and operation thereof which overcome limiting problems of the prior art.

DISCLOSURE OF INVENTION

SUMMARY: The invention is directed to improved fuel cell stacks constructed from a plurality of cells, each comprising a series of interrelated, plastic, ceramic and metal platelets having integrated fluid management (IFM) features. The invention also includes methods for design, construction, platelet feature forming, assembly and bonding of the platelets into modular polar separators (substack cell assemblies), and methods of operation of fuel cell stacks employing the Integrated Fluid Management Technology (IMFT) metal and plastic platelets of this invention.

While particularly disclosed as applicable to proton exchange membrane (PEM) fuel cells employing $H_2$ and Air/$O_2$ as fuel (whichever is most appropriate), the techniques of this invention are equally applicable to alkaline, molten carbonate and solid oxide type fuel cells, and to reformers used in conjunction with fuel cells. A wide variety of other fuel/oxidizer combinations may be employed, such as $NH_3/O_2$; $H_2/Cl_2$ $H_2/Br_2$ $CH_3OH/O_2$, and the like, it being understood that reference to $O_2$ include In referring to "fuel cells" herein, it should be understood that term includes one or more unit cells, each of which comprises a bipolar separator plate (BSP) in contact with an appropriate electrode membrane (EMA) as an assembly and includes stacks of unit cells terminated by current collector plates.

The fuel cells of this invention are constructed of one or more cells, each cell of which in turn comprises a pair of bi-polar separator plates (BSP) sandwiching an electrode membrane assembly (EMA) therebetween. The separators may be either unipolar (for the terminal end plates) or bipolar, with one side being the anode ($H_2$) side and the other the cathode ($O_2$) side. In turn, each unipolar or bipolar separator assembly of this invention comprises a fluid management core assembly (FMCA) sandwiched between a pair of microscreen plates (MSP). Each of the core assembly and the microscreen plate may be made of a plurality of platelets in contact with each other, and preferably bonded as a unitary whole. The microscreen plate (MSP) functions as a current collector to pass electrons to edge conductors (bridges, tabs, spring clips, edge jumpers, pleated conductive current bridges, edge bus bars, and the like) and/or to internal bus bars, and is constructed of current conductive material, such as metal or conductive plastic. The microscreen plate may be of window frame design, with a recessed or inset central section surrounded by a positioning frame. In bus bar embodiments, the window frame may be of non-conductive material, such as plastic or ceramic, while the screen is conductive, e.g., conductive plastic, metal, graphite, metal impregnated graphite paper, or the like. By the term microscreen, we mean any sheet-like construction which permits distributed flow therethrough of a gas, such as a perforated, drilled, woven or non-woven sheet material having very small holes or passages therethrough.

The fluid management core assembly (FMCA) comprises a plurality of thin plates, preferably of non-conductive plastic, ceramic or other suitable material into which numerous intricate microgroove fluid distribution channels have been formed, preferably by compression molding but also by injection molding, laser ablation or cutting, embossing, solvent etching, pressing, stamping or other pressure processes that create through-and-partial-depth features. Adjacent plates, each having coordinate partial depth features (e.g., half-channels), upon bonding provide gas, coolant and vapor distribution channels, typically round or oval in cross section which, by virtue of their continuous, sinusoidal and branching configurations are otherwise impossible to construct. Platelet fluid management circuits are constructed from depth and through features. Combinations of these features are used to create flow fields, close-outs, manifolds, vias, via bases, channels, filter elements, metering orifices, mixers, splitters, diverters, lands, islands, NACA ports and Coanda-effect fluid control circuits. The preferred material of the FMCA is plastic, hence the reference herein to plastic platelet fuel cells. These plastic FMCA and MSP window frame platelets or assemblies also may be constructed by laser photolithography, in which a laser beam impinges on a monomer or prepolymer to photopolymerize the monomer to a hard structure, layer-by-layer incrementally. This technique can be used for individual platelets, or to build the entire FMCA so that individual platelet bonding is not required, but the microgrooves and channels are constructed internal to the FMCA in the process.

When two uni-polar separators are assembled with an EMA therebetween it comprises an electrochemical cell. An array of aligned cells, when secured together by bonding or clamping, and optionally including sealing gaskets between cells, comprises a fuel cell stack, a finished fuel cell.

In typical examples, the number of platelets to form an individual cell polar separator subassembly of the overall fuel cell stack may range from 3–10 plates, and preferably 4–7. EMAs are disposed between adjacent polar separators, and preferably are inserted in anode and cathode recesses therein. The presently preferred EMA comprises a 2–17 mil thick perflourosulfonated membrane coated on both sides with a mixture of microfine Pt-black and carbon black in a solvent, and overlain on each side with a 10 mil thick 65% open graphite paper having a Teflon hydrophobic binder therein.

The IFMT fuel cell principles of this invention will be described herein, by way of example only, in reference to a bipolar hydrogen/air or oxygen fuel cell employing a Pt-black/NAFION EMA, operating in the temperature range of from 70°–115° C.

An important feature of the plastic platelet design of this invention is that significant improvements are made in thermal management and in humidification of the gases and electrolyte membranes to very significantly improve the power output of the platelet formed fuel cell of this invention as compared to the prior art. In a preferred embodiment, the surface conduction (current collector) platelets are constructed of metal, typically aluminum, copper, stainless steel, niobium or titanium, and the fluid management core platelets are constructed of plastic, typically filled or unfilled plastic such as: polycarbonate, polyamide, polystyrene, polyplefin, PVC, nylon, or copolymers, terpolymers, or the like, thereof. The metal platelets provide surface conductivity leading to edge conducting current bridges or through-conducting bus bars. The metal surface platelets surround or sandwich the plastic core fluid management platelets. The metal current collector platelets can be evated or treated, e.g., by nitriding, for corrosion resistance, after, but preferably before assembly into the BSPs.

After the platelets are formed, they are then lamination bonded together by any suitable combination of adhesive, heat and/or pressureto form a polar separator subassembly. The EMAs arethen inset into optional special membrane recesses, window frame depressions, in the separator plates, forming individual electrochemical cells, and a plurality of the cells are stacked to form fuel cell stacks. The entire stack assembly is then bound under compression to promote sealing, e.g., by through tie rods, nuts and constant compression devices, to form a unitary monolithic fuel cell stack, with gaskets as required.

A wide variety of solid but porous polymeric proton exchange membranes may be employed, typically sulfonated fluorocarbon membranes from Dow Chemical, Asahi Chemical, Gore or DuPont, with duPont's NAFION being presently preferred. The membrane is coated on both sides with a noble metal catalyst such as Pd, Pt, Rh, Ru, noble metal oxides or mixtures thereof. A preferred membrane of this type is available from H Power Corp of Belleview, N.J. Other types of EMAs that can be used include porous thin sheets of carbon or graphite, or catalyst-coated polyimidazole membranes.

While a specific membrane type and manufacturer may provide some improvement in performance, the invention is not dependent on any one type of membrane or EMA. The integrated fluid management technology (IFMT), plastic platelet approach of this invention is adaptable to a wide variety of fuel cell types, and improved performance will result therefrom.

The plastic platelet technique permits forming a wide variety of microchannel designs for any exterior configuration of the fuel cell, yet with excellent thermal exchange and humidity control for more efficient distribution of the gases with no fuel or oxygen starvation and better steady-state electrical output.

An important advantage in the IFM plastic platelet technology of this invention is that the manufacture of the fuel cells can be automated, and employs high rate photolithographic, etching, pressing, embossing or stamping technology to fabricate platelets from thin metal and plastic sheets, typically 4 to 40 mils thick. Embossing, compression molding, injection molding, or numerically controlled milling is preferably used to fabricate the plastic (FMCA) core platelets.

A significant industrial applicability and technical advantage arises from the fact that the IFM platelet technology permits rapid changes to be made in the separator subassembly design using photolithographic techniques, both with respect to plastic and metal platelets. A single factory can support a wide range of fuel cell designs without the need for high output ordinarily required for production economy. That is, fewer fuel cells of widely different design can be produced and still be economically feasible. In addition, the capital investment is substantially and significantly reduced as the production equipment is close to off-the-shelf photolithographic, masking, and etching or stamping equipment.

By way of example of the photolithographic "printing" process, the multiple sheets of a separator can be accurately graphically designed in large format, photographically reduced, and the plates stamped, embossed or compression molded out of continuous rolls of metal, plastic or conductive plastic sheet material. Alternatively, and in the present best mode, the current collector metal sheets are photolithographically masked with resist, etched to form the fluid management micro-grooves, the photo-resist mask layer chemically or physically removed, and the platelets cleaned. Plastic core (FMC) platelets are formed from sheets of plastic stock by compression molding. Alternatively plastic core platelets can be formed using roller embossing, injection molding or stamping. Preferably the tooling for the embossing or compression molding can be photolithographically etched in metal as described above with negative instead of positive masks, or vice versa.

The finished platelets are then assembled to form the separators, placed in a lamination bonding oven having a pressure ram and laminated together under a specific schedule of heat and pressure to form a monolithic composite separator plate subassembly having conductive surface features and intricate internal plastic FMC microchannels, including channels at different levels orthogonal to each other, through which the various gases and water or other coolant flow. Lamination bond aids such as adhesives, solvents or glues may be applied to the surfaces of the plastic and metal platelets to facilitate bonding and sealing. The specific choice of metal and core plastic dictates the particular choice of bond aids used, if any.

The metallic surface platelets may be treated with specific chemicals to form a passivating or anticorrosive and conductive layer. In the preferred embodiment, titanium microscreen platelets are placed in a nitrogen atmosphere at elevated temperature which results in the reaction of nitrogen with the titanium to form a passivating or an anticorrosive and conductive titanium nitride layer on all exposed surfaces, including the interior gas and water channels.

Platelet polar separator design and production can be done on a continuous production line, analogous to a PC-board manufacturing line. The EMAs are then inserted between individual BSPs, the cells then stacked, and exterior end plates added to form the completed fuel cell stack which is held together under pressure by tie rods, and nuts, or other constant compression devices, to effect reactant-tight sealing. Electrical leads, reactant gases and coolant water are hooked-up, gas and/or fluid fuels introduced, and the cells brought on line.

In a typical 4-platelet IFMT bipolar separator subassembly of this invention, there are 4 different plates, with plates 1 and 4 being joined by a current bridge, and each of plates 2–3 being different. The platelets in sequence are:

1. Anode metal microscreen platelet (to provide current conduction from the EMA);
2. Anode plastic flow field platelet (to provide anode flow field distribution, anode reactant humidification and cathode water circulation);
3. Cathode plastic flow field platelet (to provide separator/cell thermal management, cathode flow field distribution, cathode reactant humidification and anode water circulation; and
4. Cathode metal microscreen platelet (to provide current conduction to the EMA); In the edge conduction embodiment the two microscreen collector platelets are joined by at least one edge current bridge to effect electron flow from anode to cathode.

The current carrying capacity of the current bridge may be augmented by one or more current tabs that are folded over and electrically bonded to effect electrical conduction thorough the separator.

In the bus bar embodiment, the two microscreen collector platelets are joined by at least one bus bar, preferably two, passing transversely through the FMC separator to effect electron flow from anode to cathode. There is at least one, preferably two, bus bars that are electrically bonded to the anode and cathode microscreen platelets and occupy positions with in the plastic core platelets to effect electrical conduction thorough the separator.

The details of platelet formation, described herein by way of example, are shown to evidence that there is no microchannel collapse or in-fill during the cell lamination bonding process.

In the two bipolar separator examples above, plates 1 and 4 are each about 12 mils thick and plates 2 and 3 are each about 35 and 45 mils thick respectively. Upon lamination bonding the plates compress somewhat, and the total thickness of the resulting monolithic bipolar separator laminate is about 100 mils.

For embodiments incorporating a window frame depression to receive the EMA, the anode and cathode recess depths are on the order 11 mils deep to accommodate 11 mil thick EMA graphite paper electrodes. The total EMA thickness is on the order of 26–30 mils thick depending upon the choice of graphite paper electrodes, catalyst ink and membrane thickness and is somewhat compliant. The preferred DuPont NAFION membrane, coated on both sides with the microdispersed Pt-black catalyst in carbon black, is on the order of 4–5 mils thick, and each of the outer graphite/teflon paper layers is about 11 mils thick. The graphite paper is on the order of 65% open to provide good and uniform reactant gas distribution. On the anode side the graphite paper conducts electrons away from the catalytic reaction sites on the electrolyte membrane to the lands of the separator plate for draw-off as fuel cell electrical output. Electrons return from the external circuit via the cathode. On the cathode side graphite paper conducts electrons from the lands of the separator plate to the catalytic reaction sites on the electrolyte membrane.

The fuel cell multiple bipolar separator stack must be terminated at each end with an anode and a cathode unipolar separator terminal end plate, which also serves as the terminal current collector. For the unipolar anode separator we use: an anode microscreen (platelet 1); an anode flow field platelet (platelet 2); and a one-sided cathode platelet, i.e., the cooling circuits of the cathode flow field platelet (platelet 3) with the cathode flow field circuits closed out. For the unipolar cathode separator we use: a one sided platelet, i.e., the anode flow field platelet (platelet 2) with the anode flow field closed out; a cathode flow field platelet (platelet 3); and a cathode microscreen platelet (platelet 4). In both the edge conduction and bus bar through-conduction embodiments the terminal end plates conduct electrical power to the external load. Both embodiments may use terminal end plates of similar design and construction.

As an alternative example, where no reactant gas humidification is required, a 4-platelet bipolar separator assembly may be employed, and the sequence of platelets is as follows:

1 Anode metal microscreen platelet (to provide current conduction from the EMA);
2 Anode plastic flow field platelet (to provide anode flow field distribution and cathode water circulation);
3 Cathode plastic flow field platelet (to provide separator/cell thermal management, cathode flow field distribution and anode water circulation; and
4 Cathode metal microscreen platelet (to provide current conduction to the EMA); As with the two previous 4-platelet realizations, current conduction is accomplished using the edge conduction or bus bar conduction mechanisms previously described.

The assembled separator (multi-platelet sub-assembly) is on the order of 100 mils thickness and weighs around 3–6 oz (85–170 grams) depending on the number and thickness of plates and materials. Approximately 10 separators/kw are used in a cell stack. Completed bipolar separator plates are assembled with alternating EMAs on tie rods to effect alignment and compression. After assembly on the tie rods, compression endplates on the order of 1.5 inches thick are applied and the entire fuel cell stack assembly is placed under compression of 50–200 psi by threaded tie rods to form the monolithic fuel cell stack. The cell operating pressure of 1–65 psi is easily achievable with output at around 70–150 amps at a voltage determined by the number of cells. To seal adjacent separator sub-assemblies, an interlocking sealing ridge (which is generally triangular in cross section) on the order of 1–2 mils in height is etched, pressed or molded onto the sealing surface (outside surface) surrounding manifolds and flow so that the ridge will fully interlock with the mating seal ridge of the adjacent separator sub-assembly, or with the appropriate terminal endplate, as the case may be.

The fuel cells of the IFMT platelet design of this invention can include a reformer section to provide $H_2$, e.g., via the steam-shift process employing an underoxidized burner plus steam to produce $H_2$, $O_2$ and $CO_2$. Any other hypocarbon reformer may be employed in combination with the IFMT platelet cells of this invention.

A key feature of the platelets of this invention is the use in combination of gas and water distribution channels, formed in corresponding, aligned half channels in each of a pair of coordinate opposed mating plate faces (i.e., mating faces of adjacent plates that face each other and contact each other in the stack), and similarly formed delivery manifolds. Optional but preferred are formed sealing ridges on the periphery of the plates to assist in sealing adjacent cell assemblies.

Critical to efficient high-outputoperation of PEM cells is proper thermal balance and hydration, and control thereof by uniform gas flow. Current PEM fuel cells exhibit problems of poor thermal management and water balance, low graphite conductivity and ductility, limited scalability and excessive reactant depletion. Proper thermal management in PEM cells is critical. The preferred membranes have a maximum operating temperature in the range of 90°–98° C., since temperatures above that permanently ruin the membrane by damaging the ionophoric porestructure. Sincethe IFMT plastic platelet fuel cells of this invention have heat exchanger sections integrated in each bipolar separator, as compared to one between every 4–5 separators in graphite PEM cells, our stacks can be scaled easily to larger sizes since both the heat generation and control (heat exchange) scale with area. Since we can easily tailor heat control to each type of membrane and fuel, and the intra-cell location within the stack, we can employ higher performance EMAs, resulting in higher power densities.

In regard to water balance, the integrated humidification in each separator maintains better water balance as each is individually varied to accommodate the different requirements of the anode and cathode sides of the fuel cell. Water is removed from the anode side by electro-osmotic pumping through the membrane and reactant gas flow drying. Water builds up on the cathode side from the throughput of the electro-osmotic pumping and production of reaction water, which are both removed by air/$O_2$ gas flow drying.

In contrast to graphite PEM cells, the composite metavplastic IFMT separators of this invention are some 30 times more conductive, thus reducing the $I^2R$ losses in the stack under high current densities. These losses reduce voltage and power obtainable from the stack. The lower internal resistance of the composite separators provides a more even distribution of current, thus reducing the build-up of hot spots and dead spots in the cells. Graphite separators are placed under compression to effect sealing, but pressure affects the resistance of graphite in a non-linear fashion. This characteristic makes it very difficult to produce graphite cells with uniform output. In contrast, composite separators have excellent thermal and electrical conductivity which reduces hot and dead spots.

Graphite is porous to $H_2$, $O_2$ and air which reduces the chemical efficiency of graphite stacks because some $H_2$ is consumed in non-productive, sometimes destructive direct oxidation. To overcome the porosity of graphite, nonconductive plastic binders are used which further decreases the conductivity of the separator plates. Another commonly used approach to reducing graphite plate permeation is to make the plates thicker, but this adversely affects electrical and thermal conductivity.

Graphite separators also crack when the cell is subjected to compression to effect the sealing necessary to prevent gases leakage, as the cells operate at 1–60 psig. The tendency to crack severely limits the number and size of the cells in the stack. Where one or more separators on the interior of the stack develops leaks, the electrical output is compromised or significantly reduced. Composite metal/plastic platelets, being ductile do not present these problems.

Further, it is an important advantage of the invention that the IFM technology of the invention permits variation of intra-stack platelet design to effect better thermal management. That is, the cells in the middle of an uncooled stack do not have the same thermal environment, and accordingly not the same humidification requirements of cells at or nearer the ends of the stack. The platelet design, in terms of relative anode, cathode, coolant and humidification microchannel design can be easily changed and intra-stack position defined to accommodate the various gradients within the stack. Likewise, stacks can be designed to suit a wide variety of external conditions, an arctic design differing from a tropical, and a subsea differing from a space design.

This advantage of flexibility of design—the capability to tailor the configuration and path lengths and channel widths of microchannels in each zone of the separator (anode, cathode, heat exchange and humidification) and from separator to separator (cell to cell) progressively and individually within the stack to accommodate the intra stack environment and gradients—results in ease of scaling to higher power outputs, e.g., on the order of greater than 50–100 kw.

The series/parallel serpentine channel design provides more uniform distribution of the reactant gases. This is particularly important in providing significantly better cathode performance when operating with Air, due to depletion of $O_2$ as the air travels through the channels. In current channel design, air enters $O_2$ rich and leaves $O_2$ depleted, since the $O_2$ is consumed in the electrochemical reaction. The same depletion effect is true of $H_2$ resulting in increasing concentrations of impurities relative to $H_2$. In our invention, the shorter series of channels manifolded in parallel, and the ability to design and redesign channels of varying configurations, or graduated width, improves cathode kinetics, a currently dominant limitation of current fuel cells. In our invention, the flow is divided into a series of parallel circuits in which the precise pressure drops can be obtained. By increasing the number of parallel circuits, the pressure drop can be lowered as the flow rate is reduced and the channel side wall frictional effects are reduced due to shorter path length.

While the currently preferred best mode of the invention employs window frame platelets with EMAs of carbon paper over the catalyst/carbon-black coated membrane to provide a highly porous sheet having random gas distribution channels there through, an important alternative embodiment of the invention employs a carbon-paper-less membrane wherein microfine holes are etched through the "window pane area" of the window frame to effect the same gas distribution function. In producing the window frame platelet, the window pane area is defined in the appropriate medial areas of the plate that is located interiorly of the outer plate edges. (Lines defining the pane area may be through-formed except for a few thin bridges holding the window pane section in place during platelet fabrication. The bridges are later cut and the pane removed, or let fall out, to complete the window frame platelet.) The open areas receive the carbon fiber paper upon compression of the full sheet membrane between adjacent platelets. In the alternate embodiment, instead of removing the window pane area material, a "window screen" area is created in the window pane area by micro-fine through forming, the holes being on the order of 5000–10,000/sq. inch. Then carbon paperless membrane is compressed between the adjacent separator plates.

Objects and Advantages: It is among the objects and advantages of this invention to provide an improved fuel cell design and methods of construction and operation, particularly plastic platelet fuel cells of the hydrogen and oxygen or air type designed with IFM features which show 3× or better improvement in cost and performance over currently available graphite cells.

The improved fuel cell stacks of the invention have the advantage of employing plastic platelet separators, which platelets have specially configured gas and water distribution microchannels created by compression molding, injection molding, embossing, etching, laser ablation or cutting, or stamping.

It is another object to provide improved composite bipolar and unipolar separator plates and methods of construction having the advantage of construction from plastic fluid management platelets which are enclosed by conductive microscreen current collector platelets of metal or conductive plastic.

Another advantage of the IFM plastic platelets of this invention is that bipolar and unipolar separator plates constructed therefrom exhibit improved current collection by use of one or more edge-conductive current bridges and/or through-conductive metal bus bars.

It is another object to provide an integrated process for manufacture of fuel cells via a plurality of stacked separator plate assemblies, comprising: photolithography of a series of individual metallic current collection platelets, followed by feature forming thereof by etching (chemical milling), pounding or stamping, and optionally coating the metal current collector platelets with an antioxidant; followed by compression molding, etching, stamping, or injection molding of core plastic fluid management platelets, and thereafter assembly of the metal and plastic platelets into separator stacks; and then low temperature lamination bonding of the composite unipolar or bipolar separator platelet stacks under heat and pressure schedules with the advantages of low cost, ease of manufacture, and rapid design change to suit power demand needs.

It is another advantage of the invention to apply integrated fluid management (IFM) to fuel cell stack design, particularly to the design of plastic, conductive plastic, plastic and metal and composite platelets assembled into unipolar or bipolar separators (individual cells), and plural cells into stacks, to improve fuel and oxidant gas humidification and distribution for contact with the membranes, and for heat and humidity control to prevent hot spots and membrane degradation due to dehydration.

It is another object and advantage to provide photolithographically and chemically milled tooling for compression or injection molding of plastic platelets employing IFM principles. It is another advantage that the IFM designs of plastic platelets of the invention can be rapidly produced by any suitable sheet plastic processing technique, including injection molding, stamping, solvent or plasma etching, and laser photolithography in a suitable monomer or prepolymer bath. It is another object to provide compression or injection molded plastic platelets for fuel cell separator assemblies having special sealing ridges which have the advantage of permitting good sealing of EMAs between polar separators to form cells which are then secured under compression to form fuel cell stacks.

It is another advantage of the invention that IFM design principles permit rapid design, redesign or modification of platelet polar separators which include integrated reactant humidification, thermal management, and reactant flow and distribution control within a polar separator formed of a plurality of plastic, composite or conductive plastic platelets bonded into a monolithic unitary structure. It is another object of the invention to provide variable IFM platelet polar separator design within a fuel cell stack with the advantage that use of a plurality of different platelet and polar separator designs within a stack can accommodate the differing thermal environment and humidification requirements that are intra-stack position dependent. Still other objects and advantages will be evident from the description, drawings and claims of the invention.

BRIEF DESCRIPTION OF DRAWINGS

The invention will be described in more detail by reference to the drawings, grouped by subheadings identified below.

General Fuel Cell, Separators and Platelets

FIG. 1 is a schematic section view through a fuel cell stack employing plastic/conductive IFM platelet bipolar separators embodying the principles of this invention particularly adapted for operation with $H_2$ and $Air/O_2$;

FIGS. 2A and 2B are schematic section views through a cooled, non-humidified (FIG. 2A) and a humidified (FIG. 2B) and cooled fuel cell IFMT platelet separator of this invention showing the wide variation possible in number of platelets used;

FIG. 7 shows a plan view of a metal conductive plastic or metallized plastic current collector having first (upper) cathode section joined by an edge conductive current bridge (lower section) in which the screen apertures are slots;

FIGS. 8A–D depict typical but not exhaustive hole patterns for metal current collector microscreen platelets, FIG. 8A being hexagons, FIG. 8B ellipsoids, FIG. 8C alternating inverted T's, and FIG. 8D alternating inverted interleaved chevrons;

Edge Conduction Bipolar Separator Plate

Figure 9:
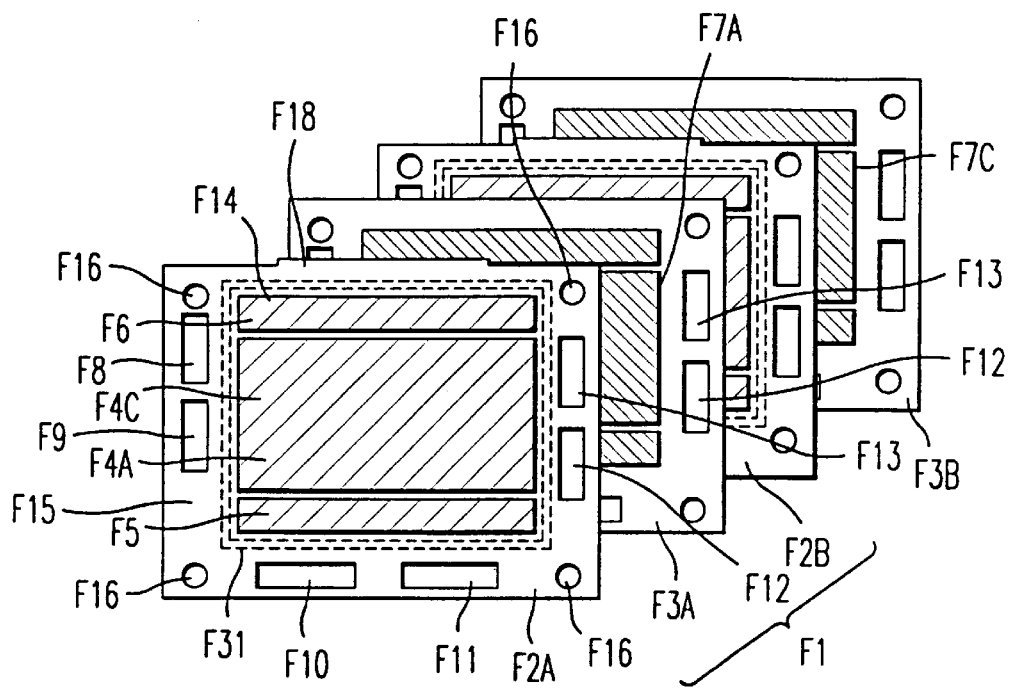
Figure 10:
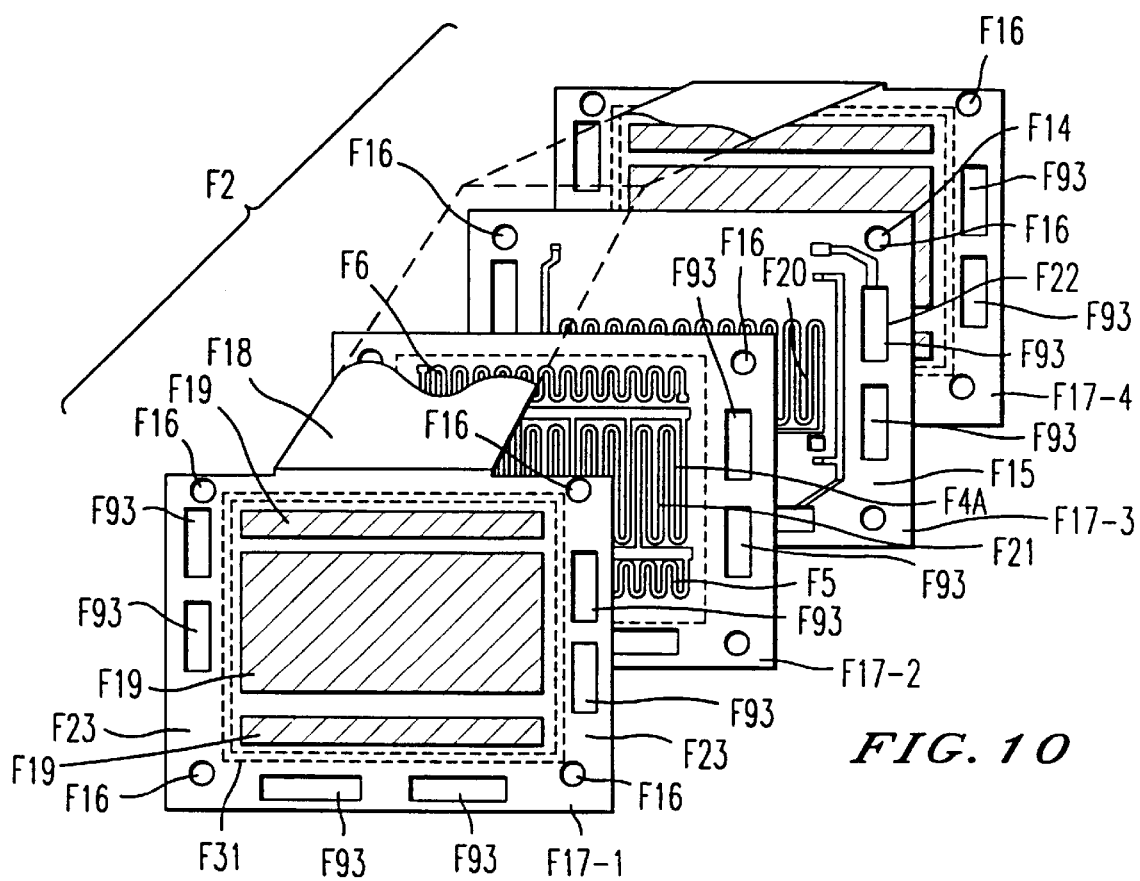
Figure 11A:
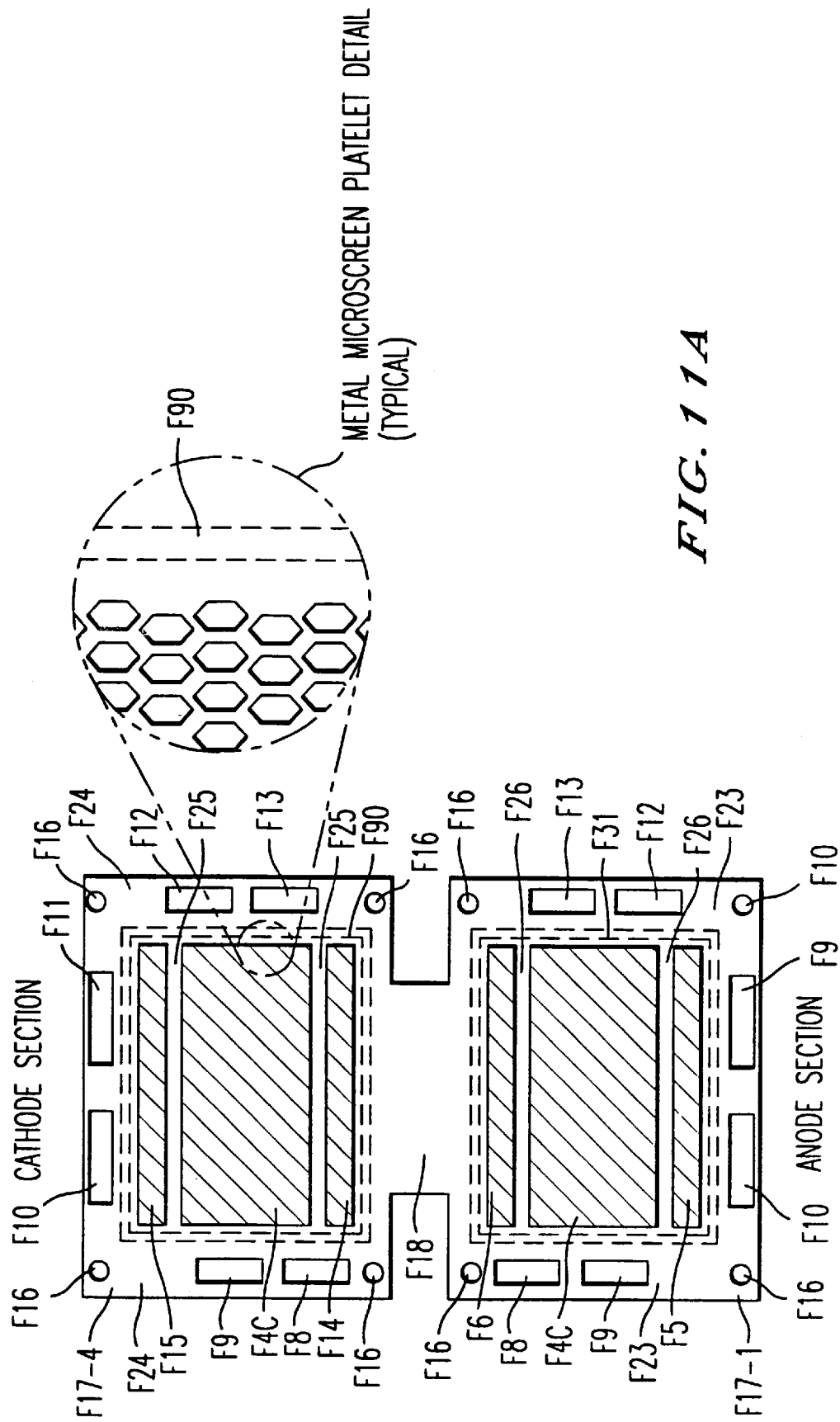
Figure 11B:
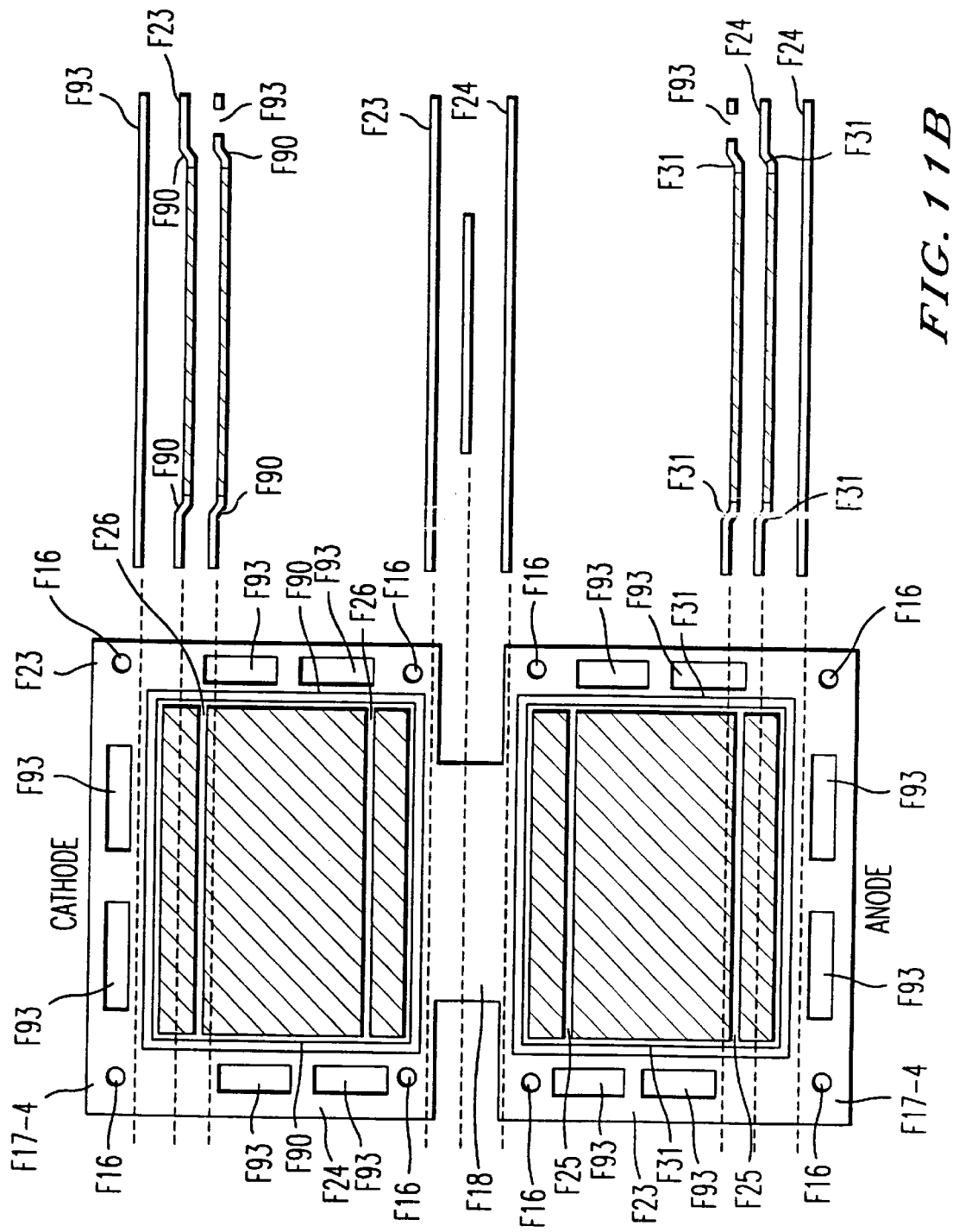
Figure 11C:
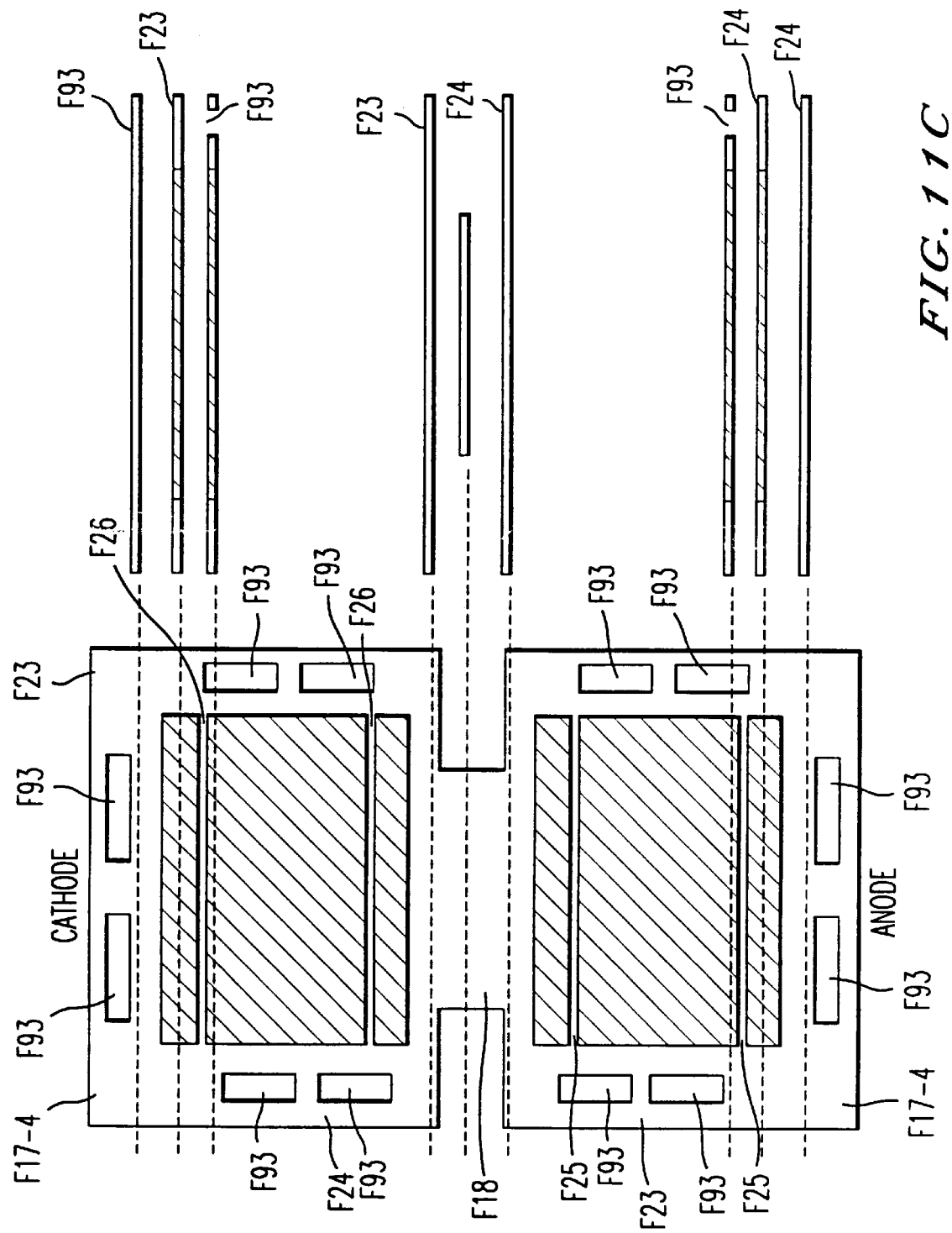

FIG. 9 is an exploded isometric view of 2-cell subassembly for a fuel cell stack made from edge conduction bipolar separators, with window frame and with integrated humidity, thermal and reactant flow field management of the invention in FIGS. 10 and FIGS. 11A–G;

FIG. 10 is an exploded isometric view of one embodiment of a 4-platelet composite edge conduction bipolar separator with window frame and integrated humidity, thermal and reactant flow field management for an IFMT fuel cell separator of this invention;

FIGS. 11A–G are aseries of detailed plan views of the embodiment of a 4-platelet edge conduction separator of FIG. 10 in which: FIGS. 11A–C depict a double microscreen platelet with the front side of the anode microscreen at bottom and back side of the cathode microscreen platelet at top (platelets 1 and 4), connected by a single bridge.

Figure 11F:
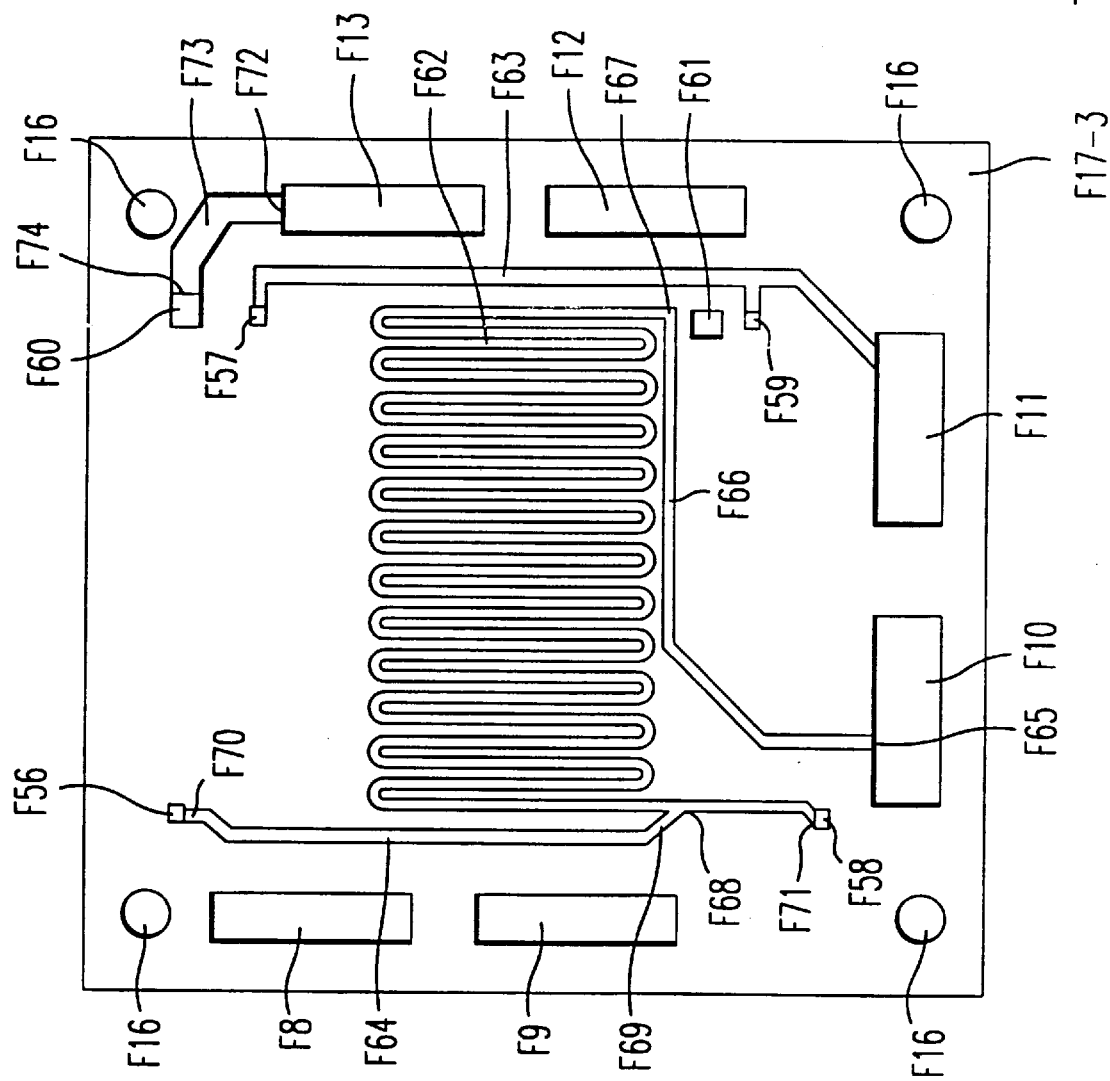
Figure 11G:
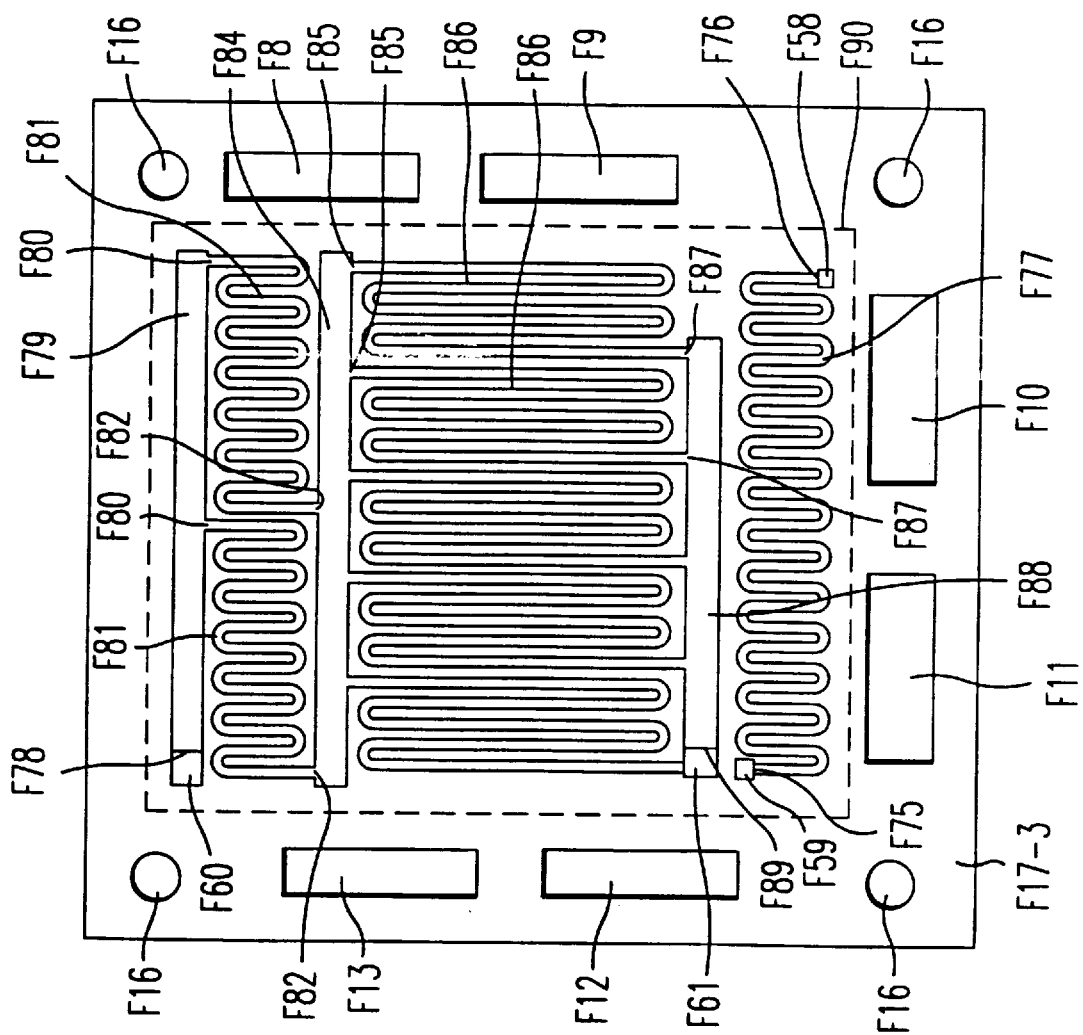
Figure 12:
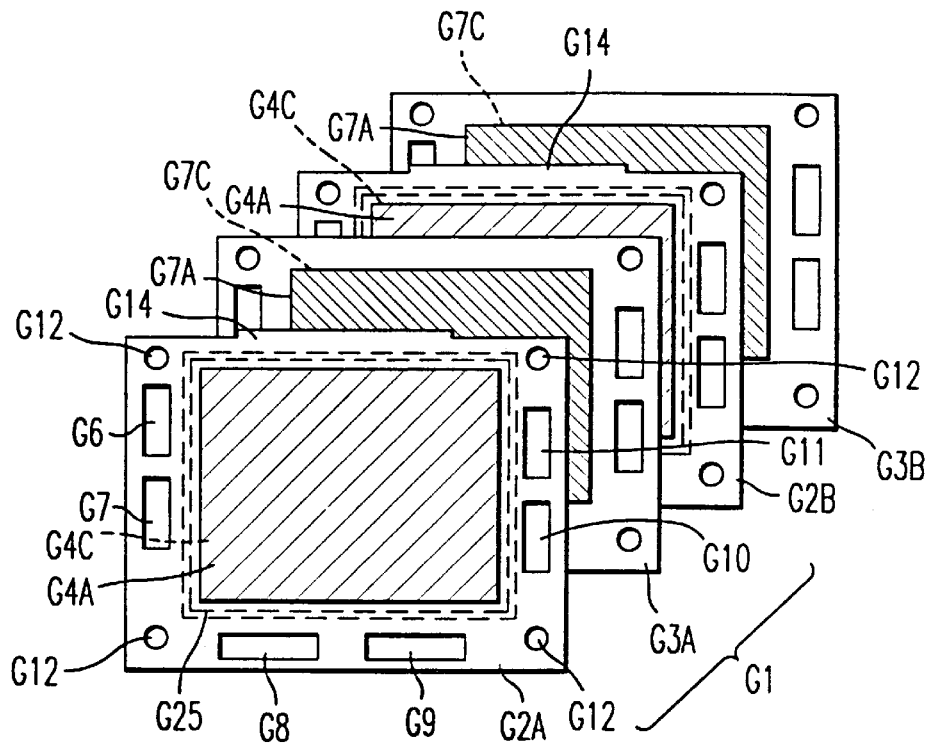
Figure 13:
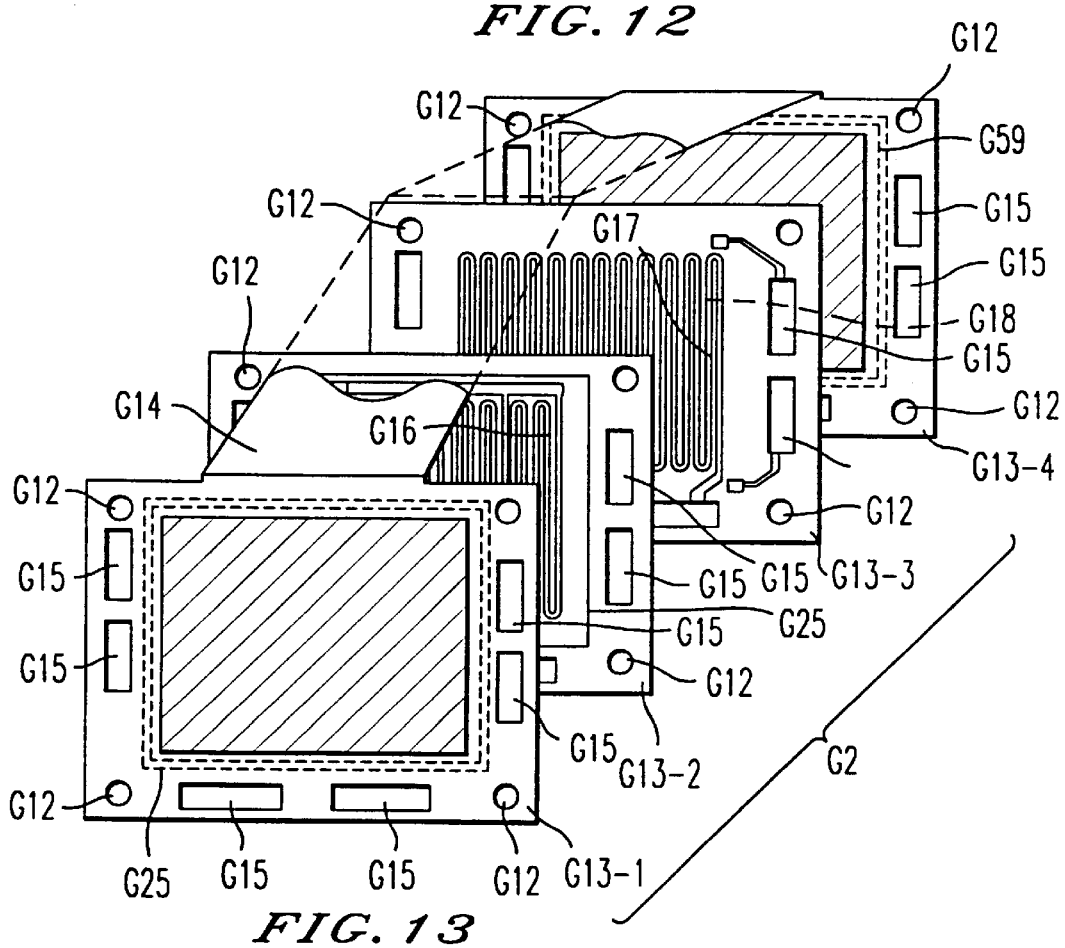
Figure 14A:
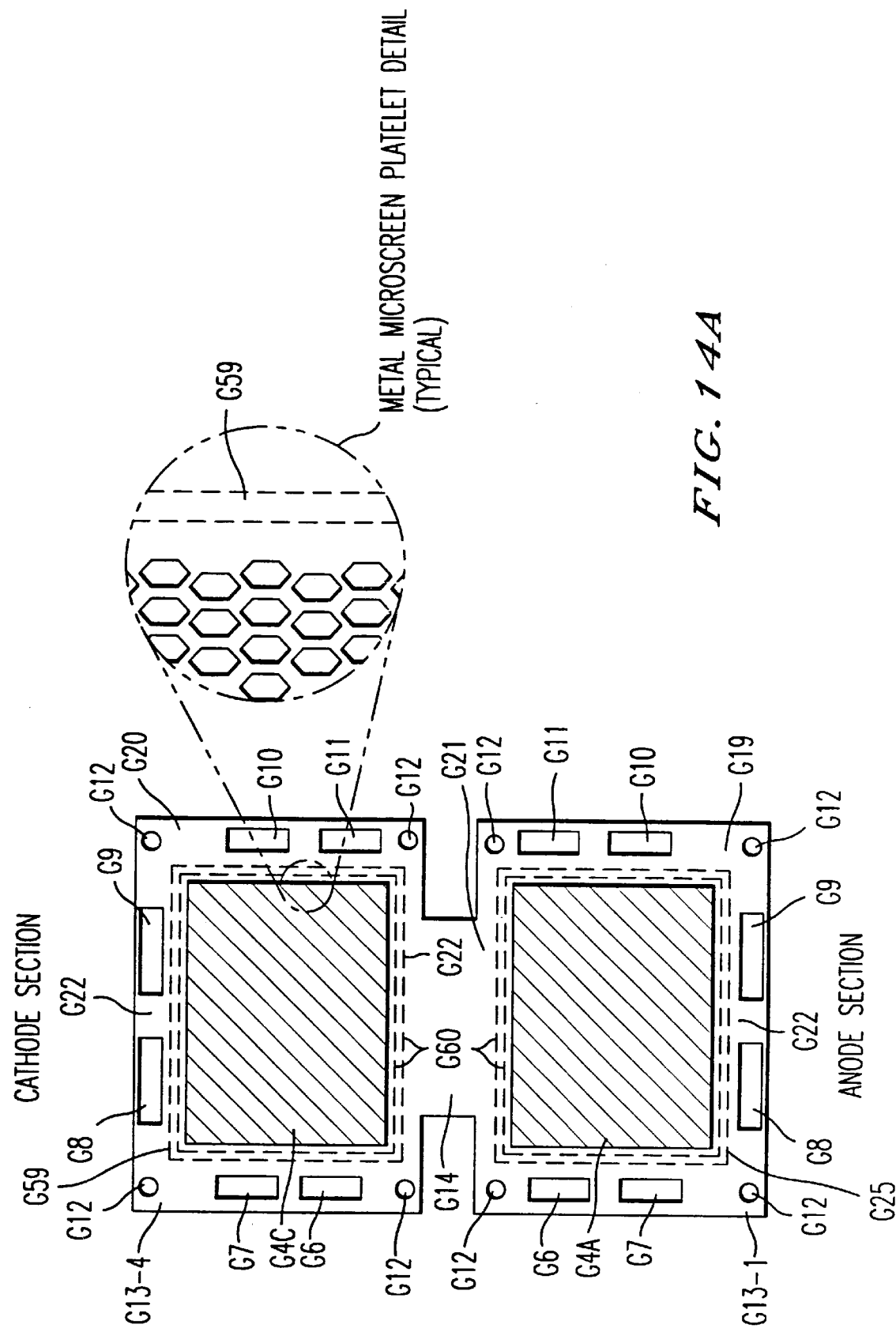
Figure 14C:
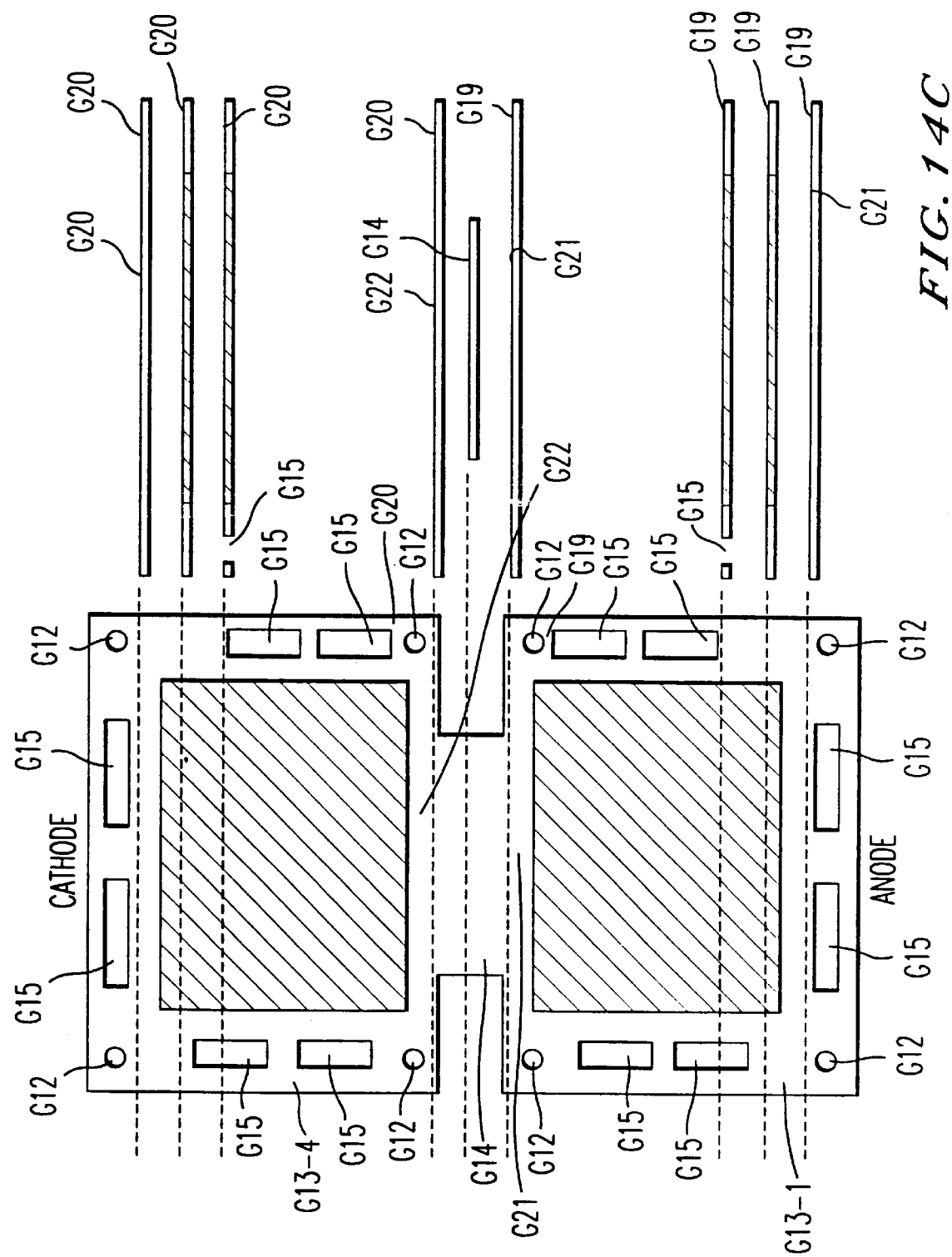
Figure 14D:
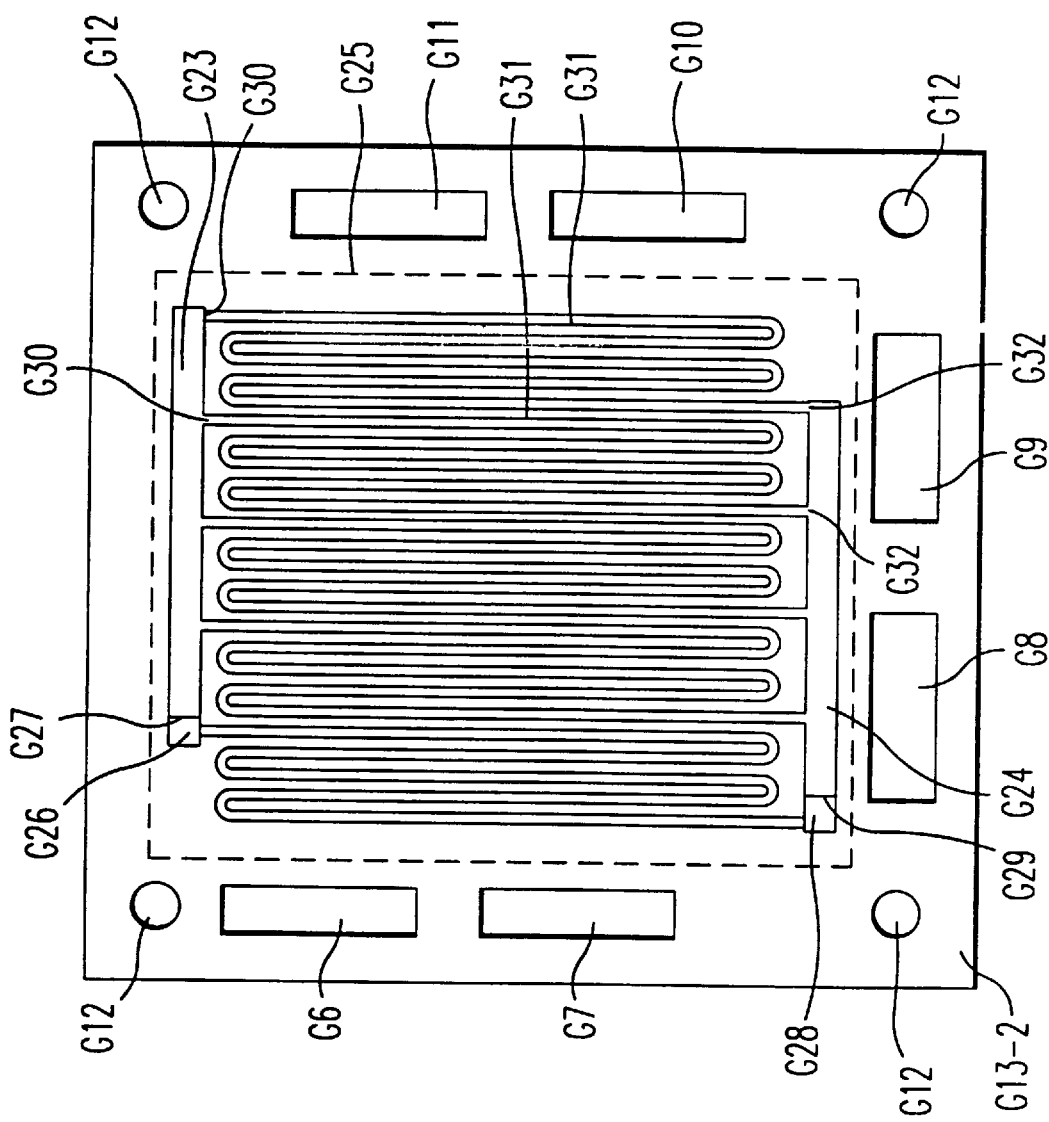
Figure 14F:
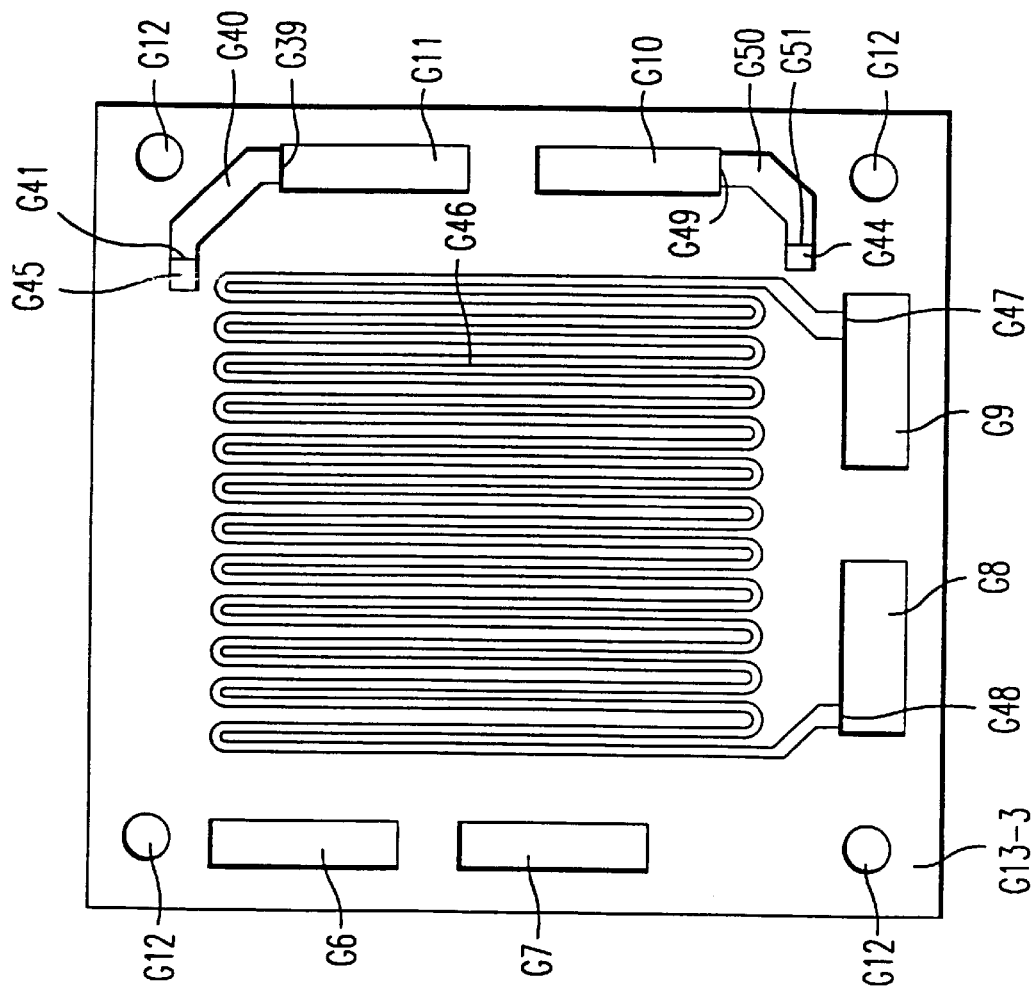
Figure 15:
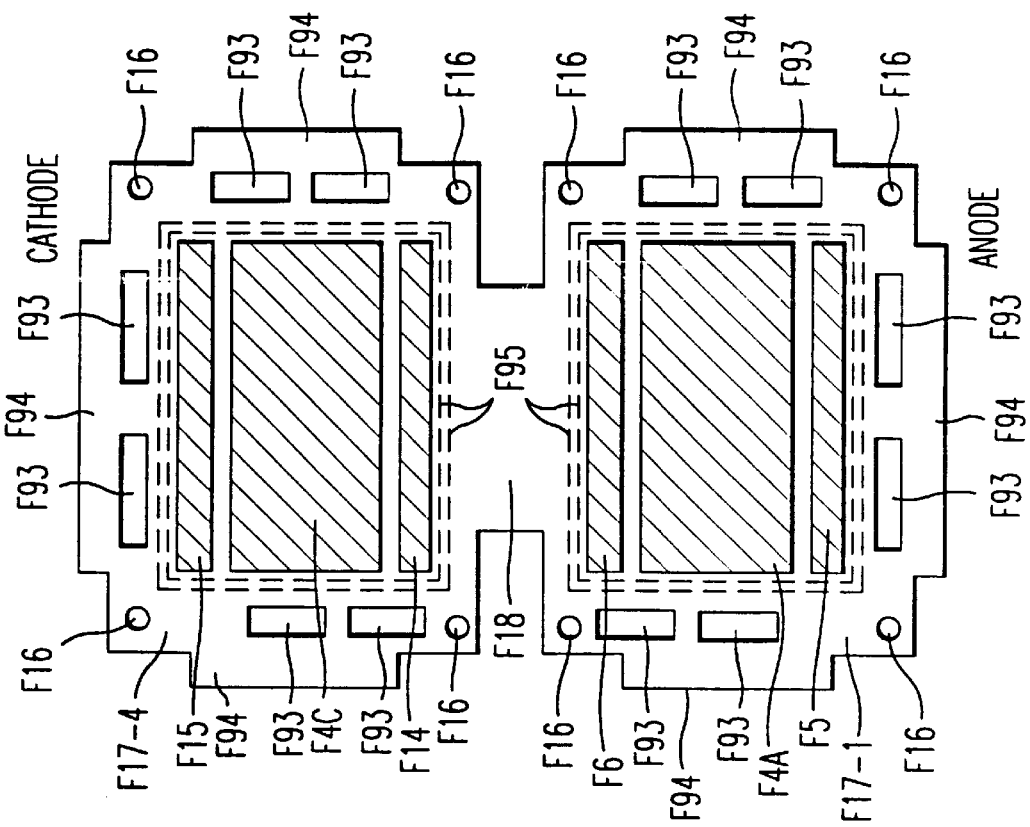
Figure 16:
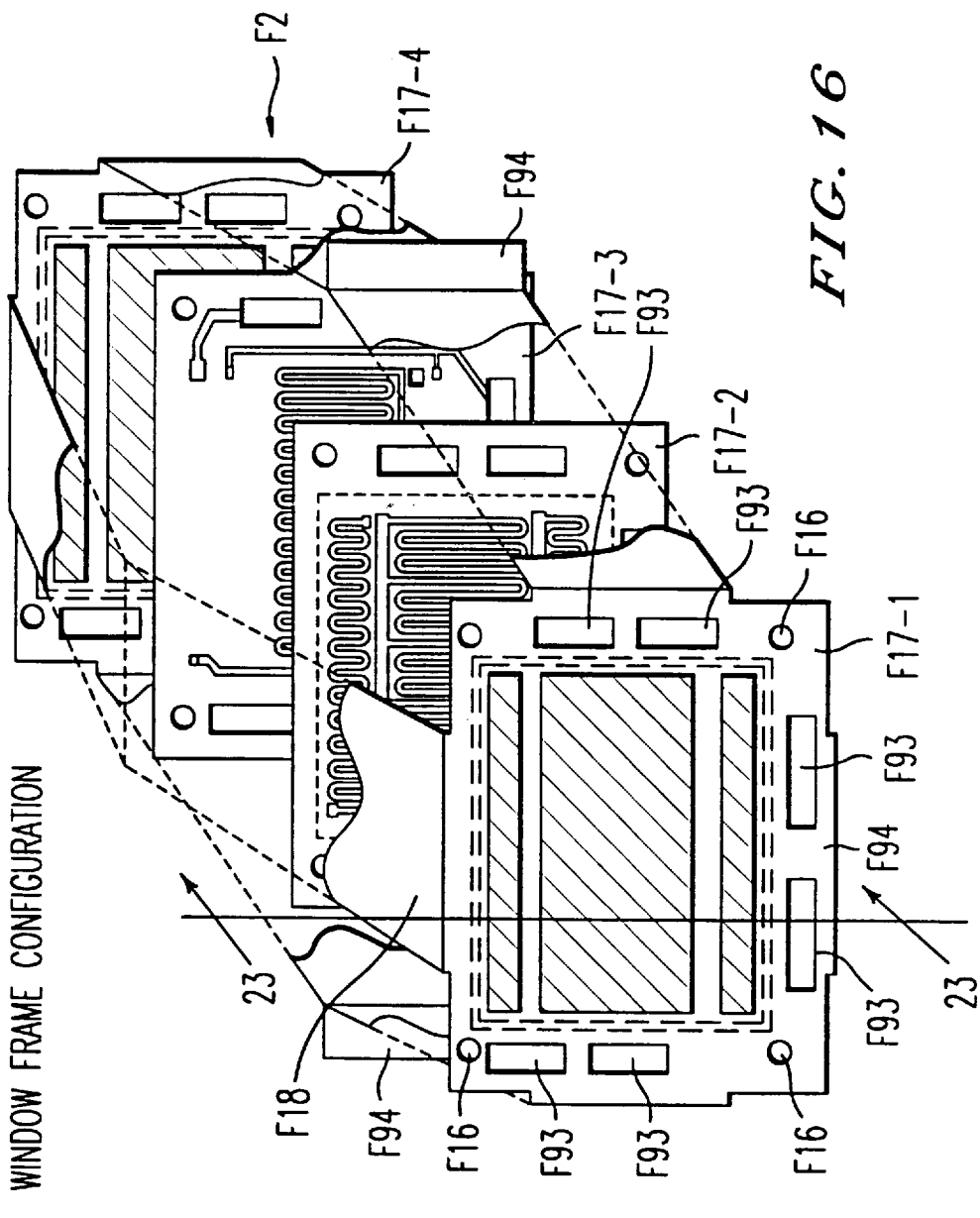

FIG. 11A is a front view of a single current bridge double microscreen platelet with window frame an inset detail depicts one embodiment of a typical microscreen hole pattern;

FIG. 11B shows the double microscreen platelet of FIG. 11A and corresponding section views;

FIG. 11C shows a double microscreen platelet without window frame and corresponding section views;

FIGS. 11D and 11E are front and back sides, respectively, of the plastic anode flow field platelet (platelet 2);

FIGS. 11F and 11G are front and back sides, respectively, of the plastic cathode flow field platelet (platelet 3);

FIG. 12 is an exploded isometric view of 2-cell subassembly for a fuel cell stack made from edge conduction bipolar separators, with window frame and with integrated thermal and reactant flow field management of the invention in FIGS. 14A–G;

FIG. 13 is an exploded isometric view of one embodiment of a 4-platelet composite edge conduction bipolar separator with window frame and integrated thermal management and reactant flow field management for an IFMT fuel cell separator of this invention;

FIGS. 14A–G are a series of detailed plan views of the embodiment of a 4-platelet edge conduction separator of FIG. 13 in which:

FIGS. 14A–C depict a double microscreen platelet with the front side of the anode microscreen at bottom and back side of the cathode microscreen platelets at bottom (platelets 1 and 4) connected by a single current bridge; an inset detail depicts one embodiment of a typical microscreen hole pattern;

FIG. 14A is a front view of a single current bridge double microscreen platelet with window frame;

FIG. 14B shows the double microscreen platelet of FIG. 14A and corresponding section views;

FIG. 14C shows a double microscreen platelet without window frame and corresponding section views;

FIGS. 14D and 14E are front and back sides, respectively, of the plastic anode flow field platelet (platelet 2);

FIGS. 14F and 14G are front and back sides, respectively, of the plastic cathode flow field platelet (platelet 3);

FIG. 15 is a detailed plan view of a microscreen platelet having multiple current bridges and/or tabs;

FIG. 16 is an exploded isometric view of one embodiment of a 4-platelet composite edge conduction bipolar separator with window frame, having four edge conduction current bridges and featuring integrated humidity, thermal management and reactant flow field management for an IFMT fuel cell separator of this invention;

Bus Bar Through-Conduction Bipolar Separator Plate

Figure 17:
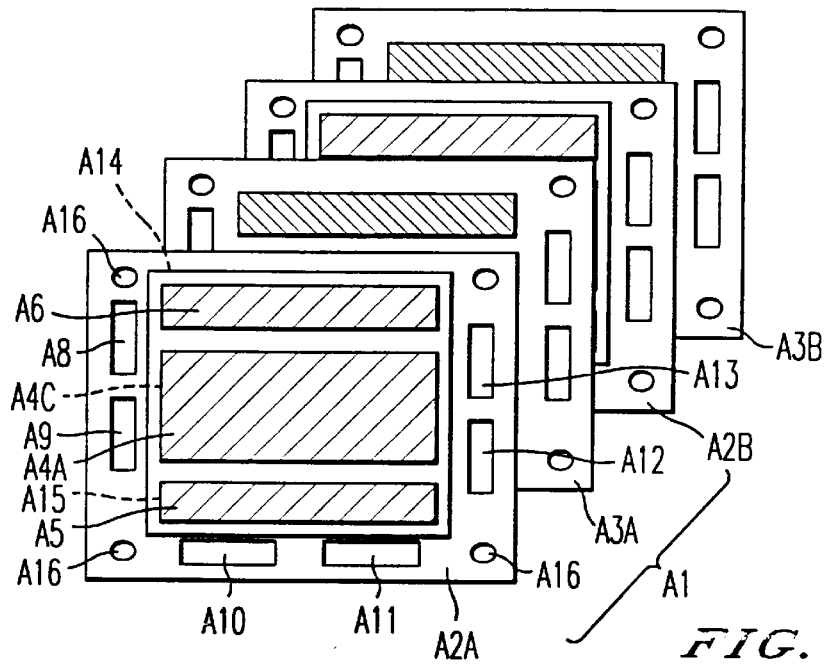
Figure 18:
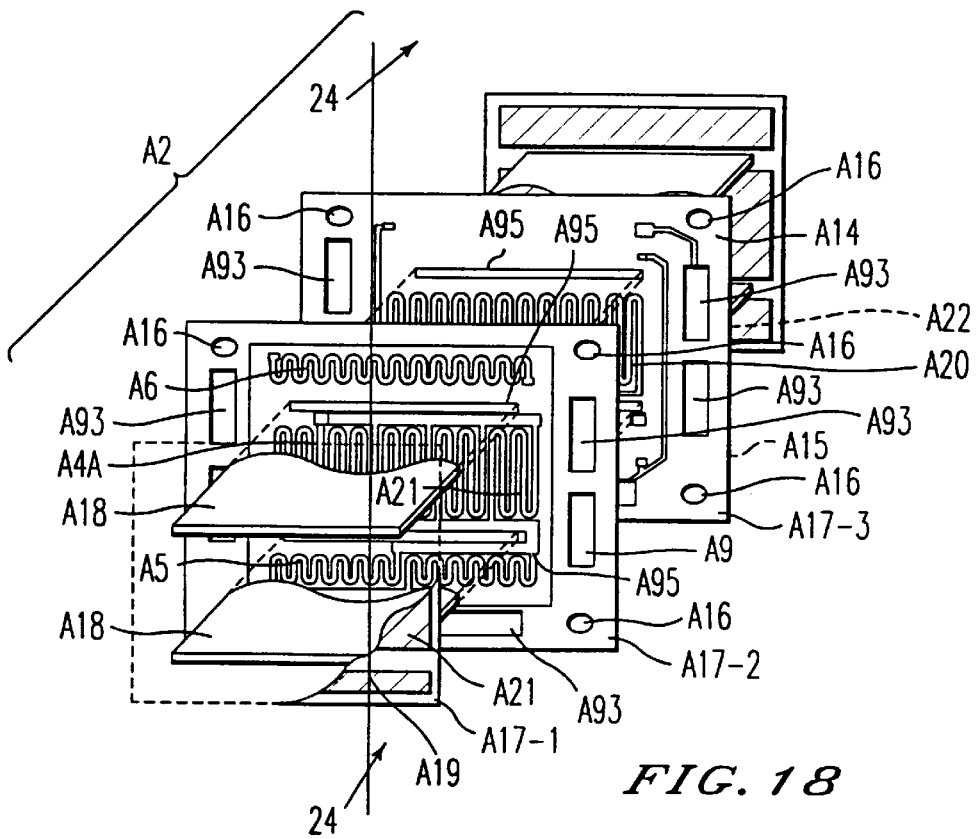
Figure 19A:
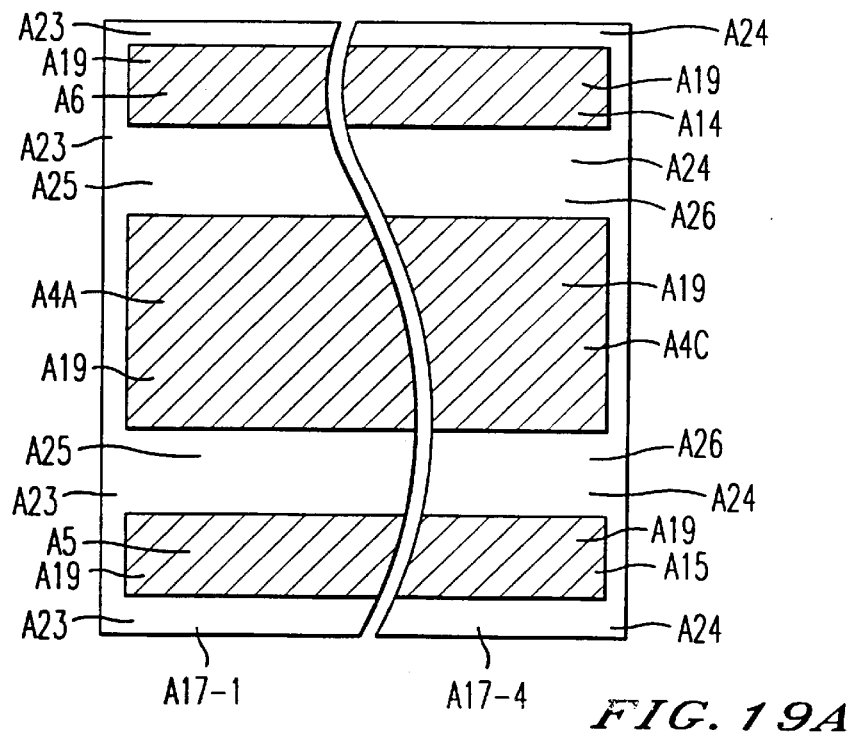
Figure 19B:
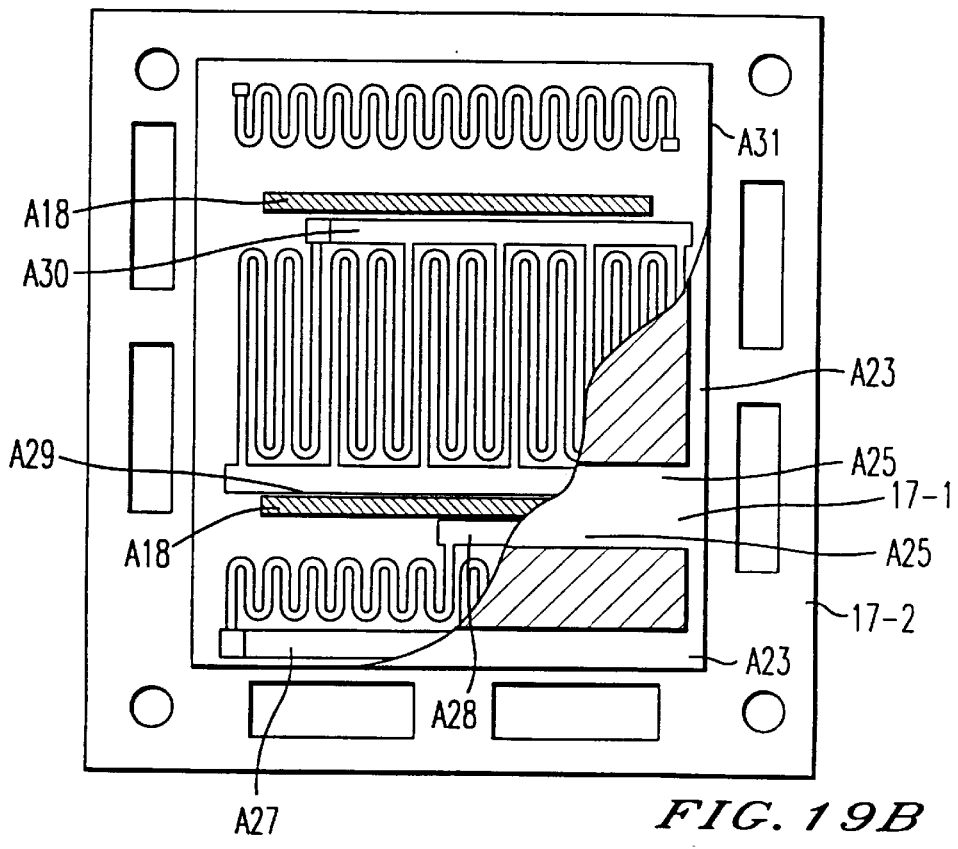
Figure 19C:
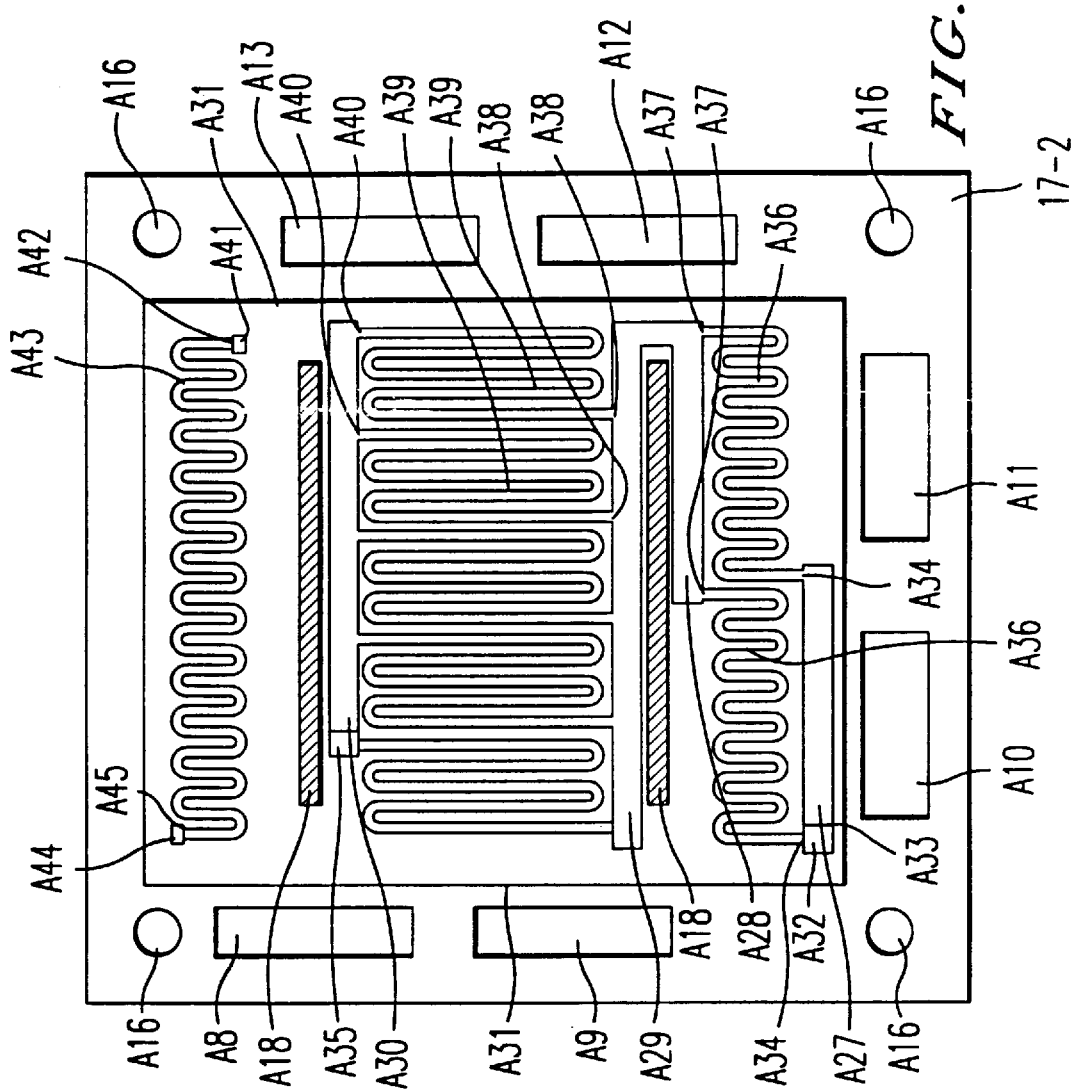
Figure 19D:
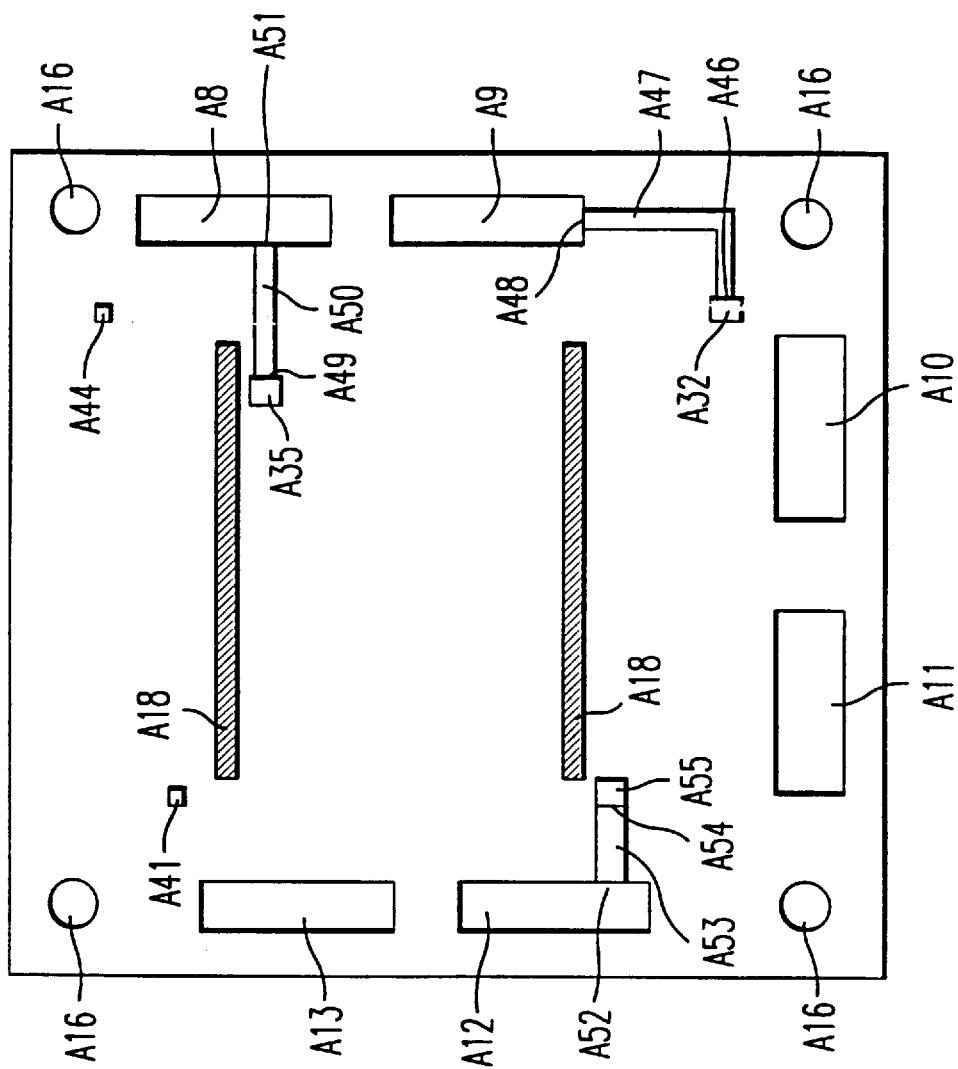
Figure 19E:
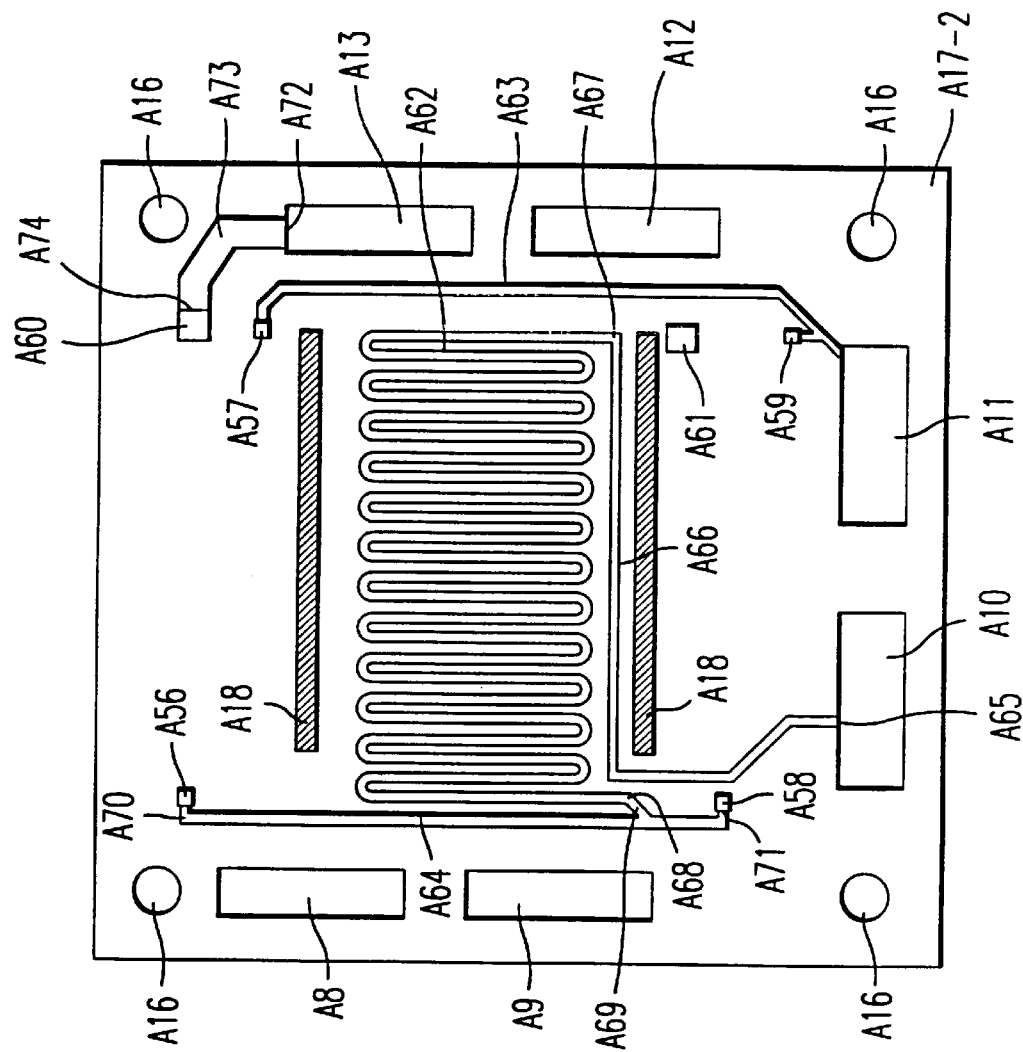
Figure 19F:
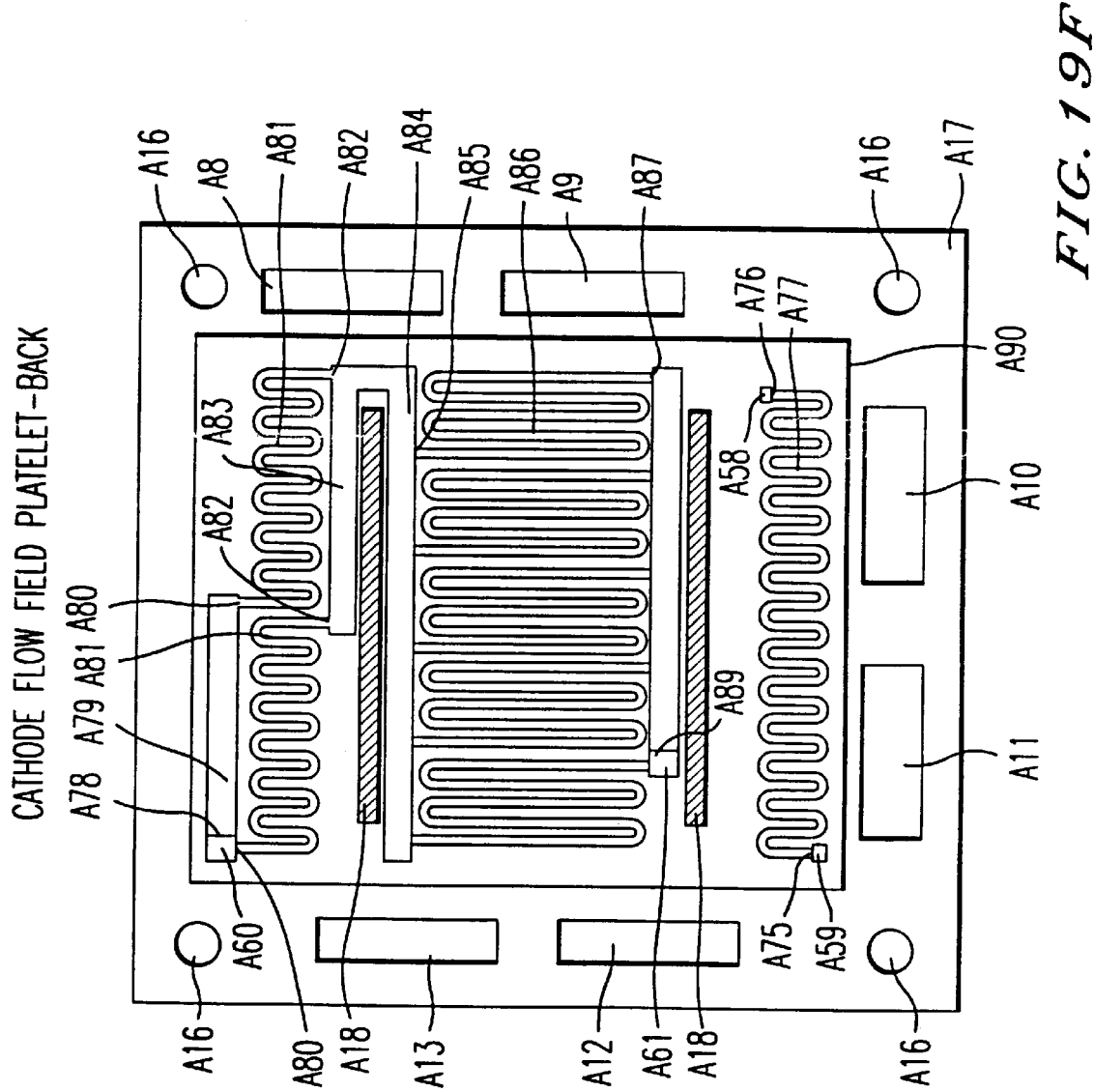
Figure 20:
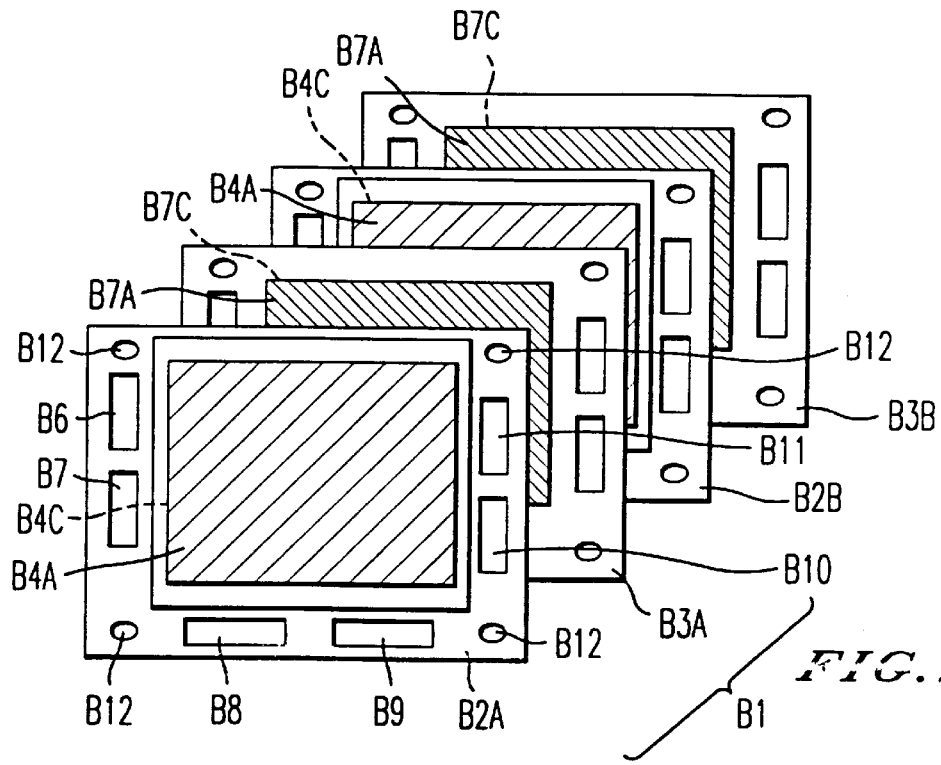
Figure 21:
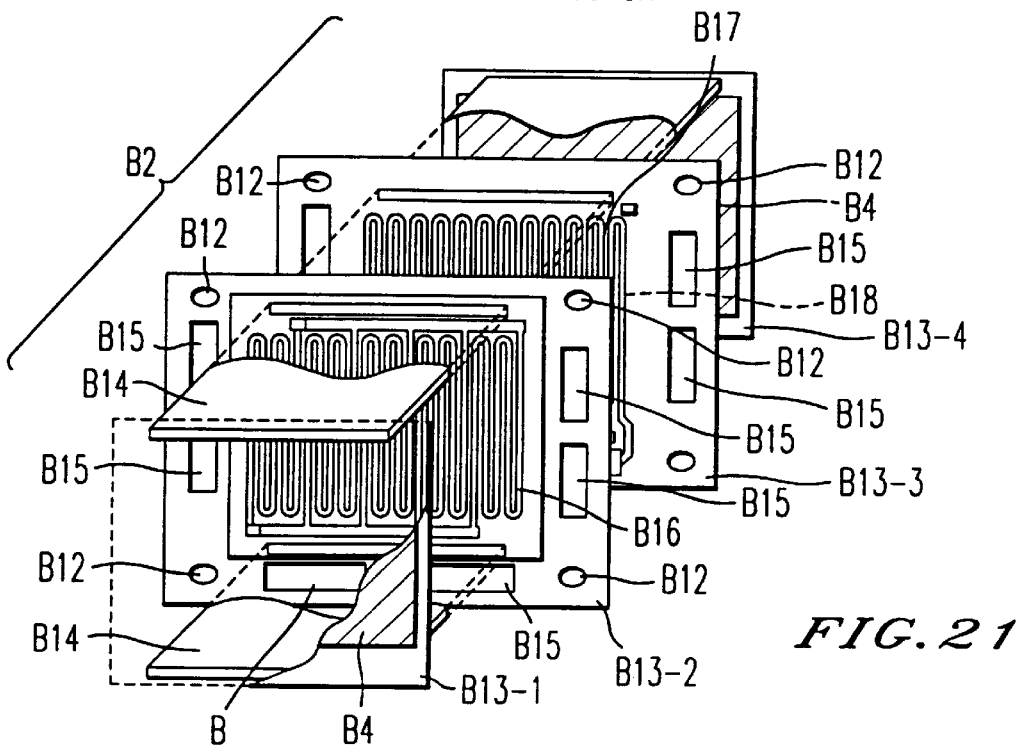
Figure 22C:
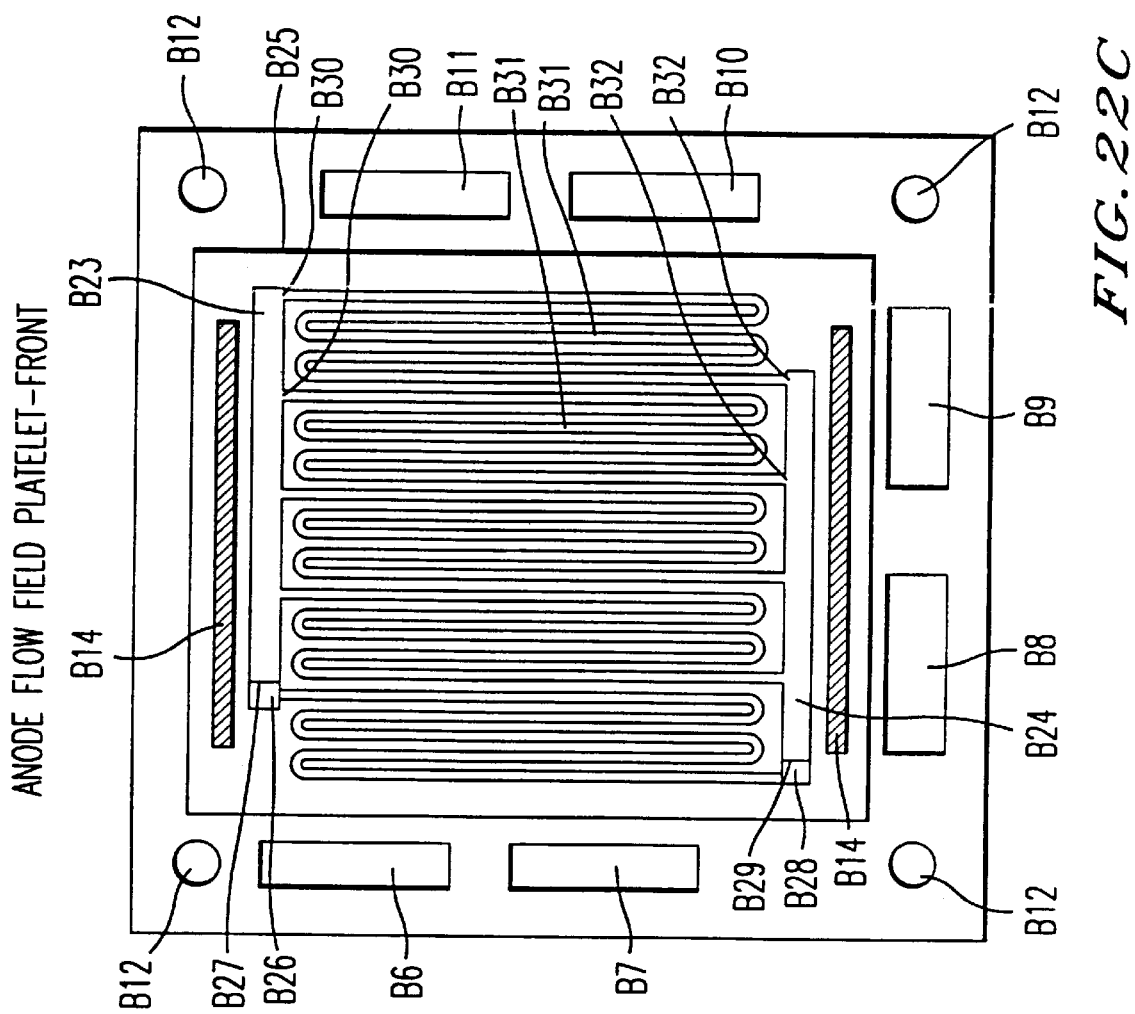
Figure 22D:
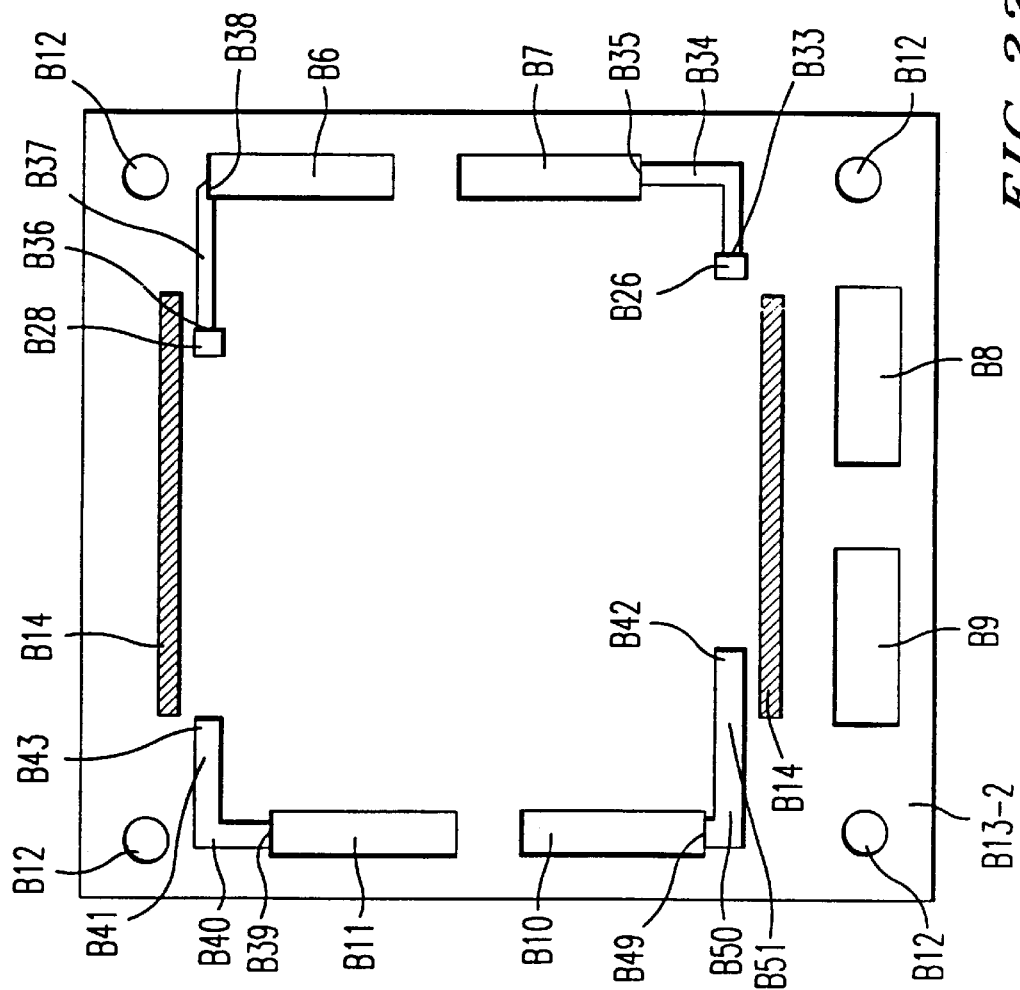
Figure 22F:
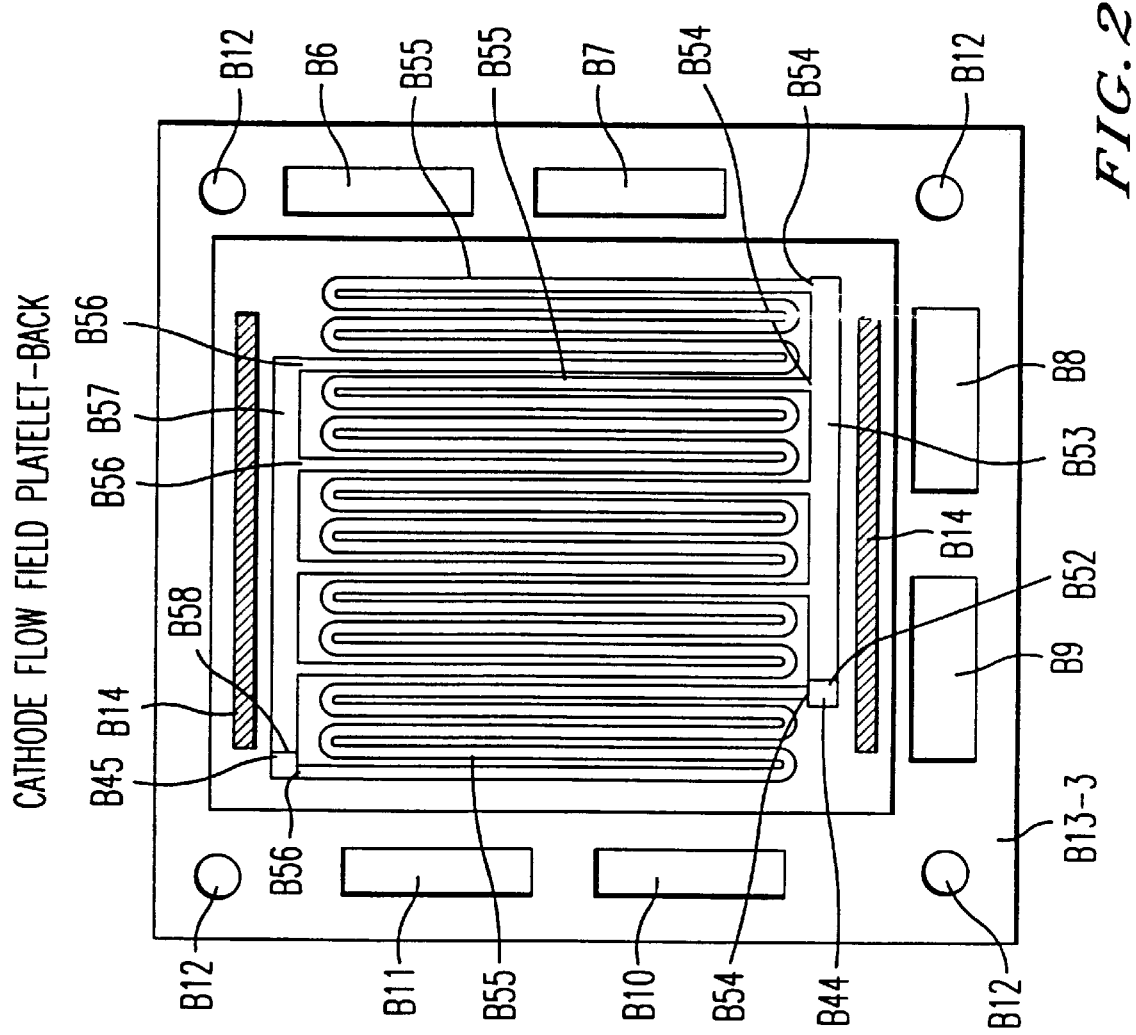
Figure 22G:
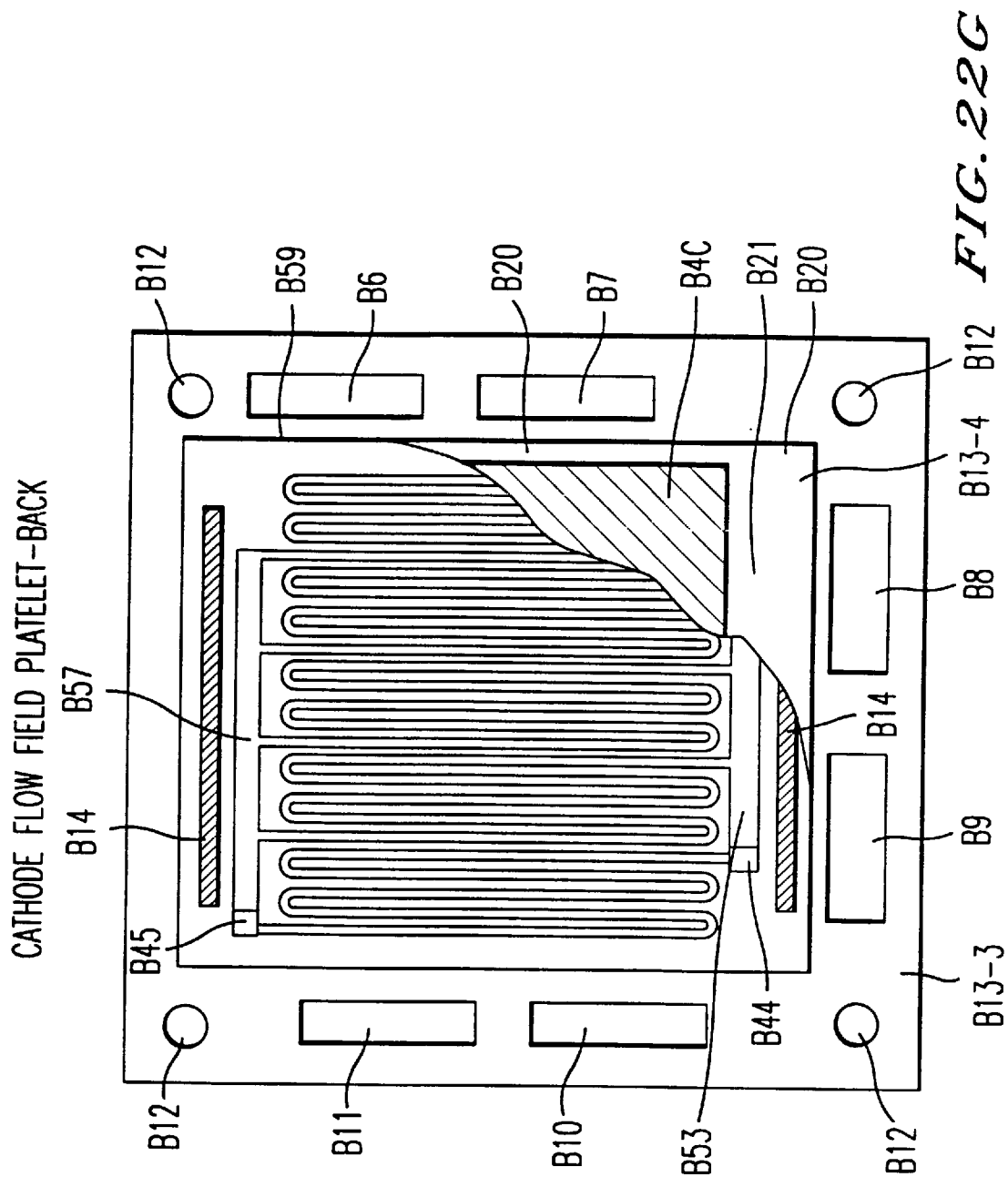

FIG. 17 is an exploded isometric view of a 2-cell subassembly for a fuel cell stack made from bus bar through-conduction bipolar separators, with window frame and with integrated thermal and reactant flow field management of the invention in FIGS. 19A–G;

FIG. 18 is an exploded isometric view of one embodiment of a 4-platelet composite bus bar through-conduction bipolar separator with integrated humidity, thermal and reactant flow field management for an IFMT fuel cell of this invention;

FIGS. 19A–G are a series of detailed plan views of the embodiment of a 4-platelet bus bar through-conduction separator of FIG. 18, in which:

FIG. 19A depicts the anode (left side) and cathode (right) current collector microscreen platelets (platelets 1 and 4) in the lower right;

FIG. 19B is a plan view of the anode flow field platelet (platelet 2) and fragmentary portion of the anode current collection microscreen (platelet 1) oriented thereon;

FIGS. 19C and 19D are front and back sides of the plastic anode flow field platelet (platelet 2);

FIGS. 19E and 19F are front and back sides of the plastic cathode flow field platelet (platelet 3);

FIG. 19G is a plan view of the cathode flow field platelet (platelet 3) and a fragmentary portion of the cathode current collection microscreen (platelet 4);

FIG. 20 is a exploded isometric view of a 2-cell subassembly for a fuel cell stack made from bus bar through-conduction bipolar separators, with integrated thermal and reactant flow field management of the invention in FIGS. 22A–22G;

FIG. 21 is an exploded isometric view of one embodiment of a 4-platelet composite bus bar through-conduction bipolar separator with integrated thermal and reactant flow field management for an IFMT fuel cell of this invention;

FIGS. 22A–G are detailed plan views of the embodiment of a 4-platelet bus bar through-conduction separator of FIG. 21, in which:

FIG. 22A depicts both the identical anode and cathode current collector microscreen platelets (platelets 1 and 4);

FIG. 22B is a plan view of the anode flow field platelet (platelet 2) and a fragmentary portion of the anode current collection microscreen (platelet 1);

FIGS. 22C and 22D are front (22C) and back (22D) sides of the plastic anode flow field platelet (platelet 2);

FIGS. 22E and 22F are front and back sides of the plastic cathode flow field platelet (platelet 3);

FIG. 22G is a plan view of the cathode flow field platelet (platelet 3) and a fragmentary portion of the cathode current collection microscreen (platelet 4);

Edge and Through-Conduction Section Views

FIGS. 23A–23D show various alternative constructions of the metal microscreen collector plates arranged for edge conduction with respect to the core plastic platelets in the separator plates of the type of FIG. 16 taken along line 23—23 therein;

FIGS. 24A and 24B show two alternative constructions of the through-conduction bus bars for the separator plate assembly of the type of FIG. 18, taken along the line 24—24 therein;

Platelet, BSP and Cell Fabrication Processes

Figure 25:
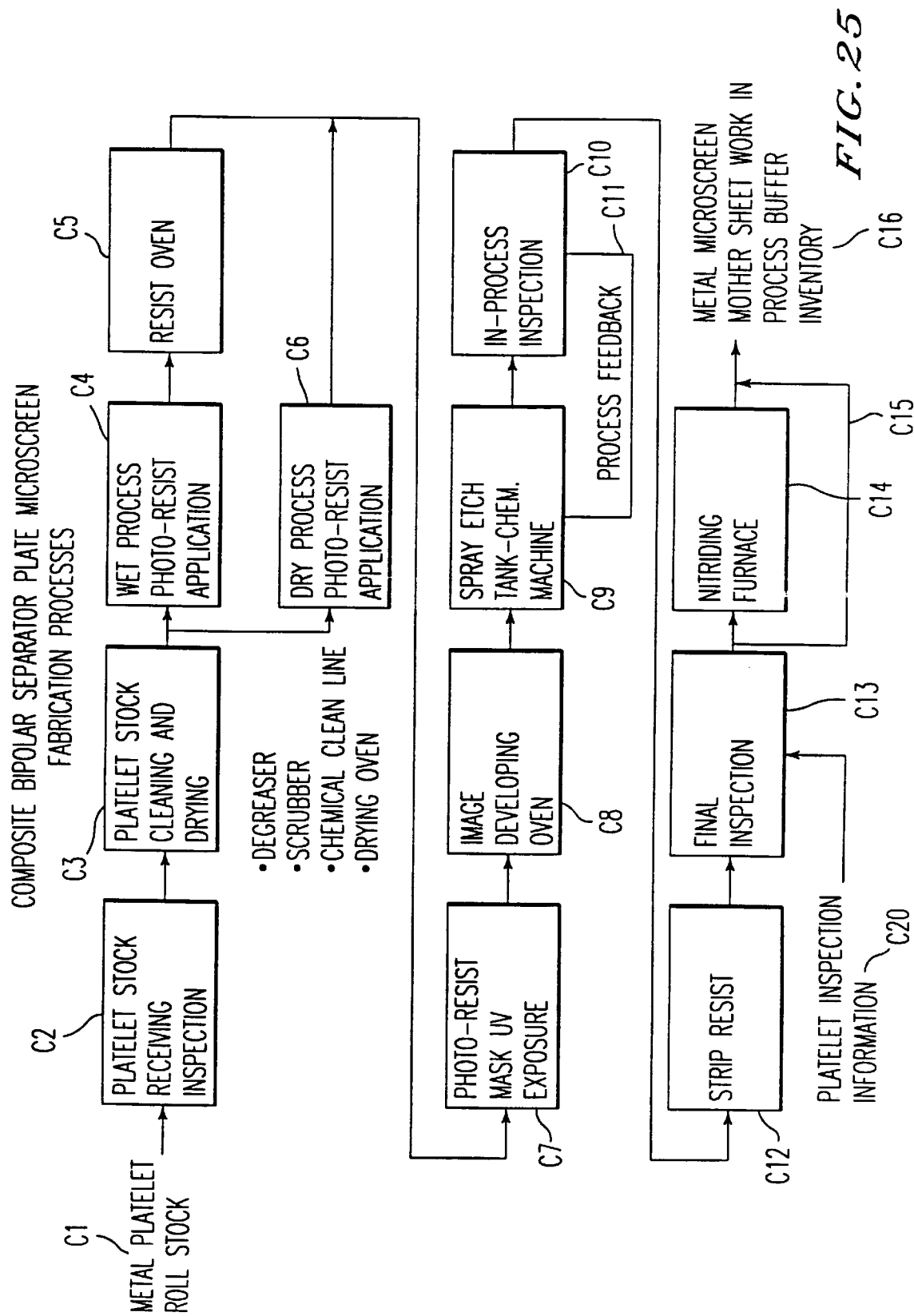
Figure 26:
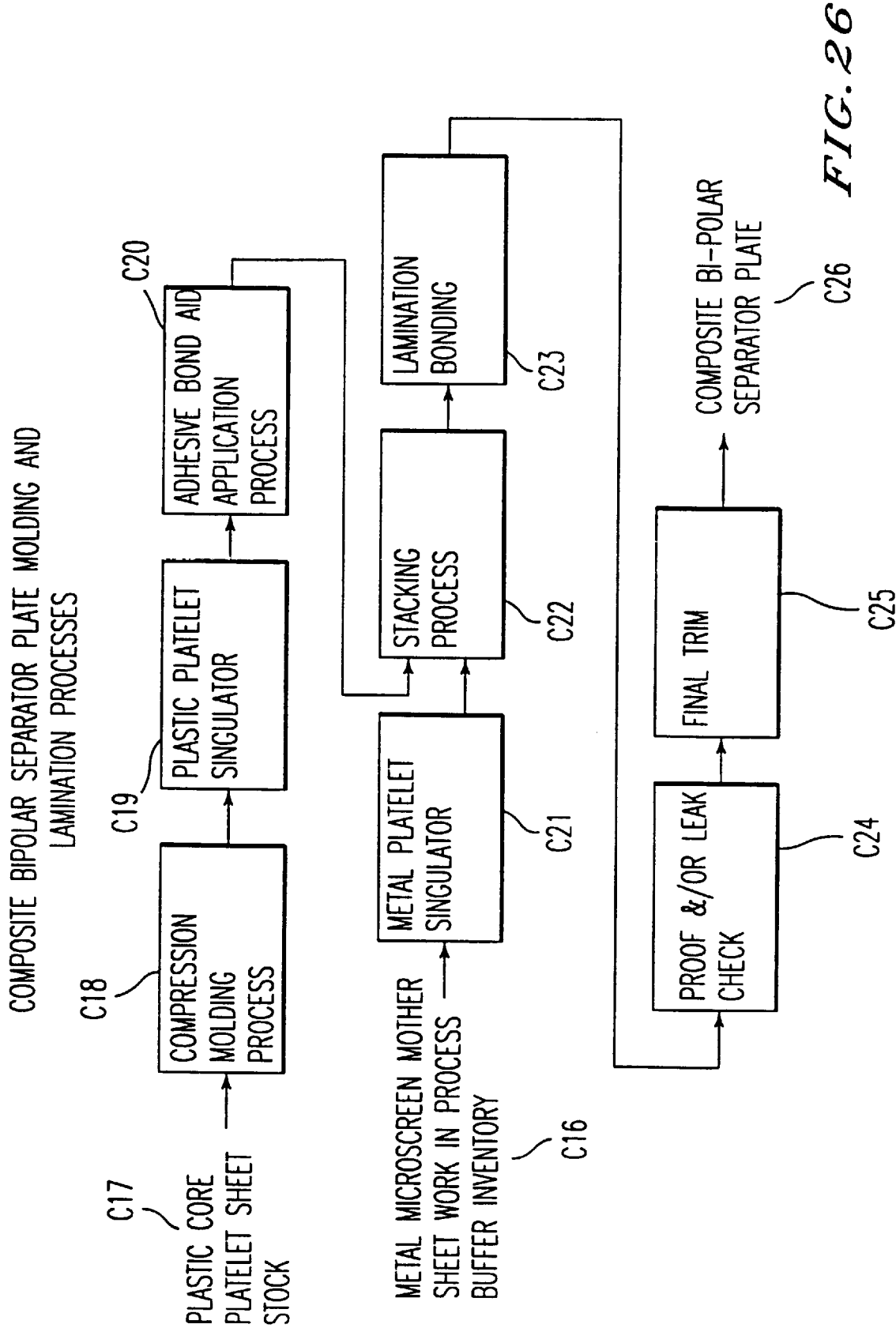
Figure 27:
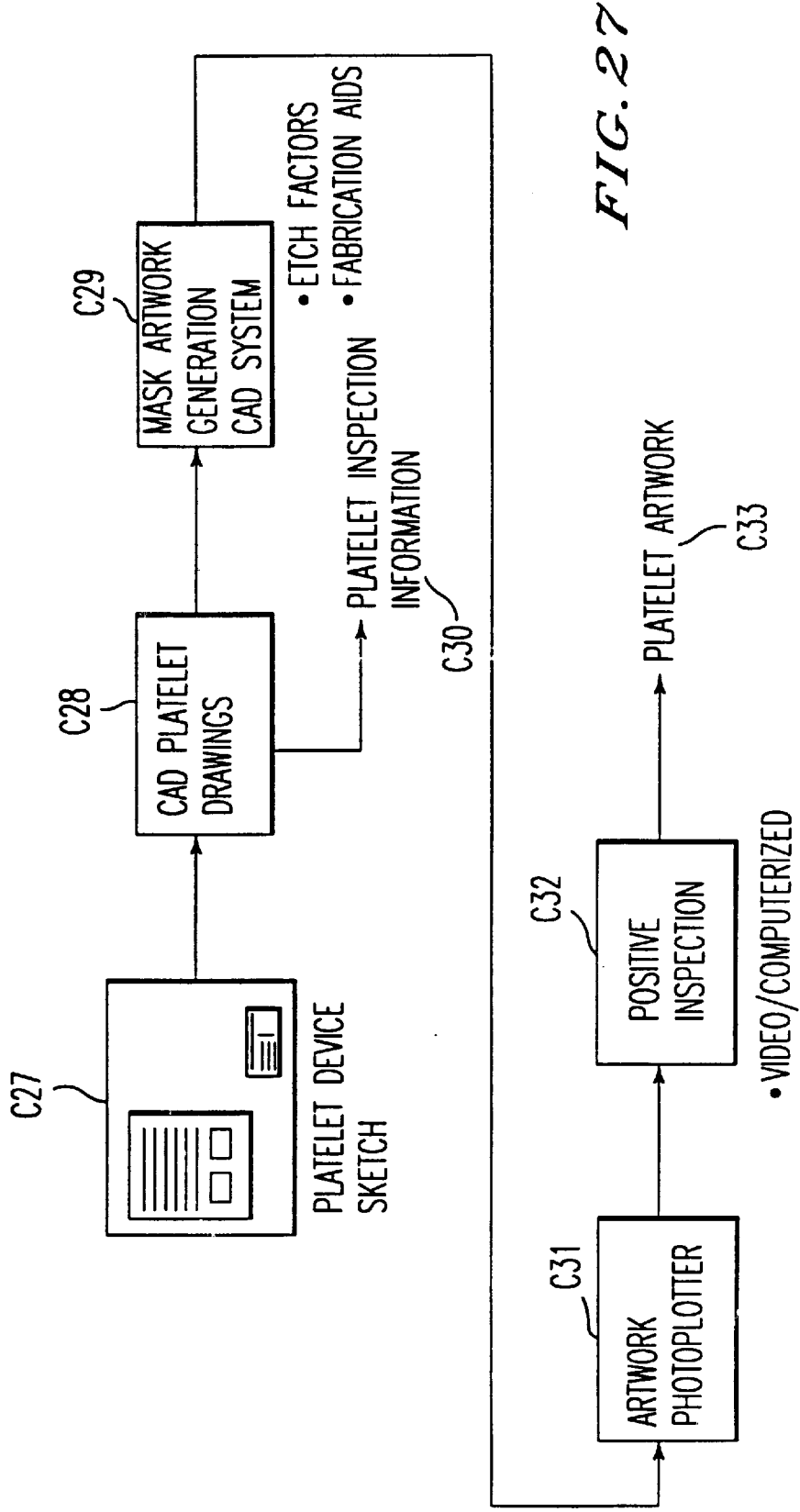

FIG. 25 is a flow sheet of a continuous metal platelet manufacturing process in which features are formed by depth and through etching;

FIG. 26 is a flow sheet of a continuous plastic platelet manufacturing process in which features are formed by compression molding and composite bipolar separator plates are fabricated by lamination bonding;

FIG. 27 is a flow sheet of the process for adaptively rapid generation of the photolithographic artworks for individual platelet designs in accord with the IFMT principles of this invention.

BEST MODE OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows in simplified (schematic) cross section a fuel cell stack 1 of this invention employing a plurality of multi-platelet bipolar separators 2A, B, C and a pair of cathode and anode unipolar end separators 3, 4 respectively. Proton exchange Electrode Membrane Assemblies (EMAs) 5A, B, C, and D are disposed between the separators as shown. Air and/or $O^2$ is inlet via manifold system 6; $H_2$ and/or other fuel is inlet via manifold 7; and cooling/humidification water is inlet at 8 and outlet at 9.

FIGS. 2A and 2B show in schematic section view the construction of one embodiment of composite bipolar separators 2 formed from bonded metal and plastic or ceramic platelets 12 for the non-humidified version of FIG. 2A, and platelets 13 for the humidified version 15 of FIG. 2B. This figure also illustrates the wide variation in the number and types of plates that may be employed to construct a separator by various combinations of depth etching (or feature forming) and through-etching (through feature forming) of metal platelets. Plastic platelet features are formed by compression or injection molding. For example, FIG. 2A shows a 4-platelet configuration as follows: 12-1 is the anode microscreen current collector; 12-2 is an anode flow field platelet; 12-3 is the cathode flow field platelet; and 12-4 it the cathode microscreen currentcollector. The metal anode microscreen platelet 12-1 is electrically connected to the conductive current bridge 14 which is electrically connected to the cathode microscreen current collector 12-4. The anode flow field platelet is constructed from plastic or ceramic and contains the features that implement the serpentine channels of the anode active area flow field. The cathode flow field platelet is constructed from plastic or ceramic and contains the features that implement the serpentine channels of the cooling water heat exchanger and the cathode active area flow field.

Similarly, FIG. 2B shows a 4-platelet configuration as follows: 13-1 is the anode microscreen current collector; 13-2 is an anode flow field platelet; 13-3 is the cathode flow field platelet; and 13-4 the cathode microscreen current collector. The metal anode microscreen platelet 13-1 is electrically connected to the conductive current bridge 14 which is electrically connected to the cathode microscreen current collector 13-4. The anode flow field platelet is constructed from plastic or ceramic and contains the features that implement the serpentine channels of the hydrogen humidification flow field, cathode humidification water flow field and anode active area flow field. The cathode flow field platelet is constructed from plastic or ceramic and contains the features that implement the serpentine channels of the cooling water heat exchanger, anode water flow field, air humidification flow field, and the cathode active area flow field.

Figure 3:
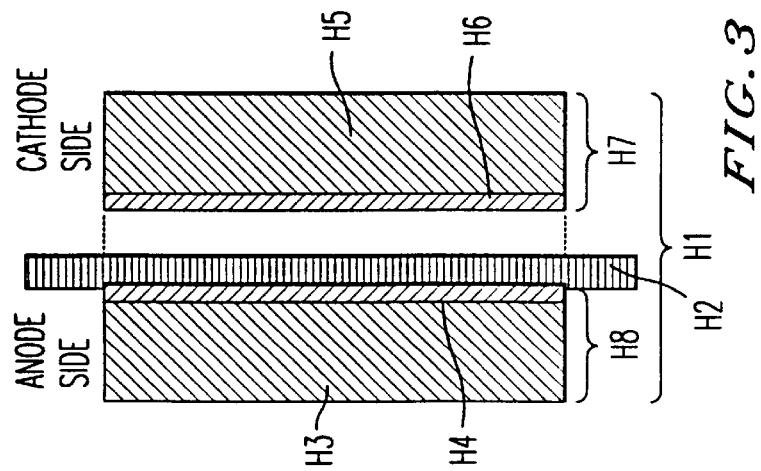
FIG. 3 is a schematic cross section detailing electrode membrane assembly construction with a part exploded away.

FIG. 3 is a partially exploded view of the construction of an electrode membrane assembly (EMA) H1 of the type used with this invention. EMA H1 corresponds to the EMA 5 (5A–D) of FIG. 1. An EMA is constructed from a laminate of a graphite anode electrode H3, anode catalyst layer H4, electrolytic membrane H2, cathode catalyst layer H6, and a graphite cathode electrode H5. In typical EMA construction the electrodes, catalyst layers and electrolytic membrane are lamination bonded to form an ionically conductive composite structure.

Electrodes are fabricated from graphite paper, Toray TGP-H090 typically being used. Composite platinum catalysts are deposited on the electrode prior to lamination bonding with the electrolytic membrane. Typical catalysts are mixtures of platinum black, carbon black and hydrophobic agents. Carbon black, Vulcan XC-72R is typically used to suspend the platinum black. Teflon is used to give the electrode hydrophobic properties. DuPont Teflon PTFE suspension TFE027 is atypical hydrophobic agent used to treat electrodes. DuPont Nafion® is the standard electrolytic membrane used in PEM fuel cells. Lamination bonding of the anode and cathode electrode assemblies, H8 and H7 (exploded away from $H_2$) respectively is facilitated by treating the electrodes with a 5% solution of Nafion® polymer. Lamination bonding follows a predetermined schedule of temperature and pressure to effect a polymeric bond between the electrode assemblies H8 and H7 and the membrane H2.

Bipolar Separator Schematics

Figure 4A:
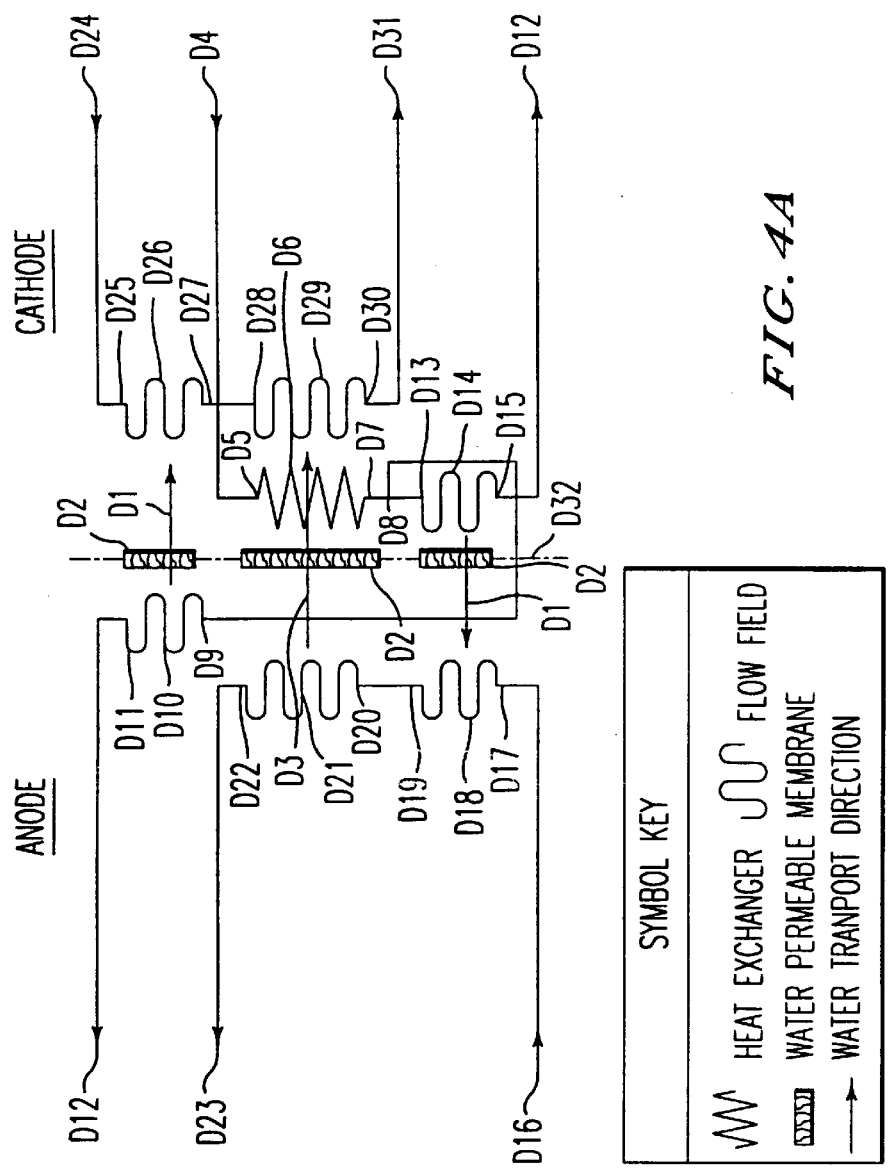
FIG. 4A is a schematic of the fluid circuits for an integrated humidity and thermal management bipolar separator of this invention.

FIG. 4A is a single cell fluid flow circuit schematic for integrated humidity and thermal management IFM separators. The schematic is drawn down the center line D32 of the electrochemical cell. The centerline passes down the center of the electrolytic membrane D2. The anode side of a separator is on the left side, labeled Anode, and depicts the features found on the anode flow field platelet. The cathode side of a separator is depicted on the right side, labeled Cathode, and depicts the features found on the cathode flow field platelet. The schematic clearly shows the integration of seven fluid management devices into a single bonded composite separator. The seven functions are the cathode humidification water serpentine channel D10 flow field, hydrogen humidification serpentine channel D18 flow field, anode active area serpentine channel D21 flow field, anode humidification water serpentine channel D14, cooling water serpentine channel D6 heat exchanger, cathode humidification serpentine channel D26 flow field, and cathode active area serpentine channel D29 flow field. These functions are connected using a series of internal manifolds. This mechanical, fluid and thermal integration is a key element of this invention.

Counter-flow humidification flow D1 through the electrolytic membrane D2 which is a key element of this invention is clearly depicted by the directional arrows representing molecular water flow. Counterflow humidification is implemented using water on the anode side (referred to as cathode water) to humidify cathode air (oxygen). By analogy, water on the cathode side (referred to as anode water) is used to humidify anode hydrogen. In IFM fuel cells the electrolytic membrane performs a dual rolls as a humidification membrane and a solid electrolyte.

The electrolytic membrane D2 is ionically conductive to hydrated protons. During normal operation protons D3 formed on the anode are electro-osmotically pumped across the membrane to the cathode. Protons being pumped across the membrane carry one or more associated water molecules causing anode dry-out during high power operation. Humidification of anode hydrogen mitigates this problem.

Humidification of cathode air is also required because air is only 20% oxygen and is 78% nitrogen. To compensate for the lower oxygen composition of air, cathode channels have larger cross sections than corresponding pure oxygen designs. Larger cross sections are required to support higher flow rates while maintaining reasonable pressure drops. High air flow rates tend to dry out the cathode which is mitigated by cathode air humidification.

Control of the amount of humidification is achieved by varying the area ratio of anode active area to hydrogen humidification area, and by controlling the ratio of cathode active area to air (oxygen) humidification area. Typical anode and cathode area ratios are 15% to 24% humidification to active area.

Dry hydrogen gas enters the hydrogen inlet D16, flows through internal manifolds and feed circuits to the anode humidification serpentine channel inlet D17, flows through the anode humidification serpentine channel D18 picking up water vapor (becoming hydrated), flows out the anode humidification serpentine channel exit D19, through internal collection and distribution manifolds to the anode active area serpentine channel inlets D20, passes through the anode active area serpentine channels D21 where the hydrogen is oxidized to produce protons and electrons, leaves the active area through the anode active area serpentine channel exits D22, flowing through internal collection manifold finally exiting as depleted hydrogen through the hydrogen exit D23.

Dry air (oxygen) gas enters the air (oxygen) inlet D24, flows through internal manifolds and feed circuits to the cathode humidification serpentine channel inlet D25, flows through the cathode humidification serpentine channel D26 picking up water vapor (becoming hydrated), flows out the cathode humidification serpentine channel exit D27, through internal collection and distribution manifolds to the cathode active area serpentine channel inlets D28, passes through the cathode active area serpentine channels D29 where the air (oxygen) is reduced by electrons and protons to produce product water, leaves the active area through the cathode active area serpentine channel exits D30, flowing through internal collection manifold and finally exiting as depleted air (oxygen) and product water through the air (oxygen) exit D31.

Cooling and hum edification water enters the cooling water inlet D4, flows through internal manifolds to the cooling water serpentine channel inlet D5, flows through the cooling water serpentine channel picking up heat produced as by product of the electrochemical reactions, flows out the cooling water serpentine channel exit D7, into internal manifolds, to the humidification water inlet manifold junction D8, feeding the two humidification water circuits. Hot water from the humidification water inlet manifold junction D8 flows through internal manifolds to the cathode humidification water serpentine channel inlet D9, flows into the cathode humidification water serpentine channel D10 with a small potion osmotically pumped across the electrolytic membrane D2 to humidify cathode air (oxygen), flows out the cathode humidification water serpentine channel exit D11, through internal manifolds finally exiting through the cooling water outlet D12.

By analogy, hot water from the humidification water inlet manifold junction D8 flows through internal manifolds to the anode humidification water serpentine channel inlet D13, flows into the anode humidification water serpentine channel D14 with a small portion osmotically pumped across the electrolytic membrane D2 to humidify anode hydrogen, flows out the anode humidification water serpentine channel exit D15, through internal manifolds finally exiting through the cooling water outlet D12.

Figure 4B:
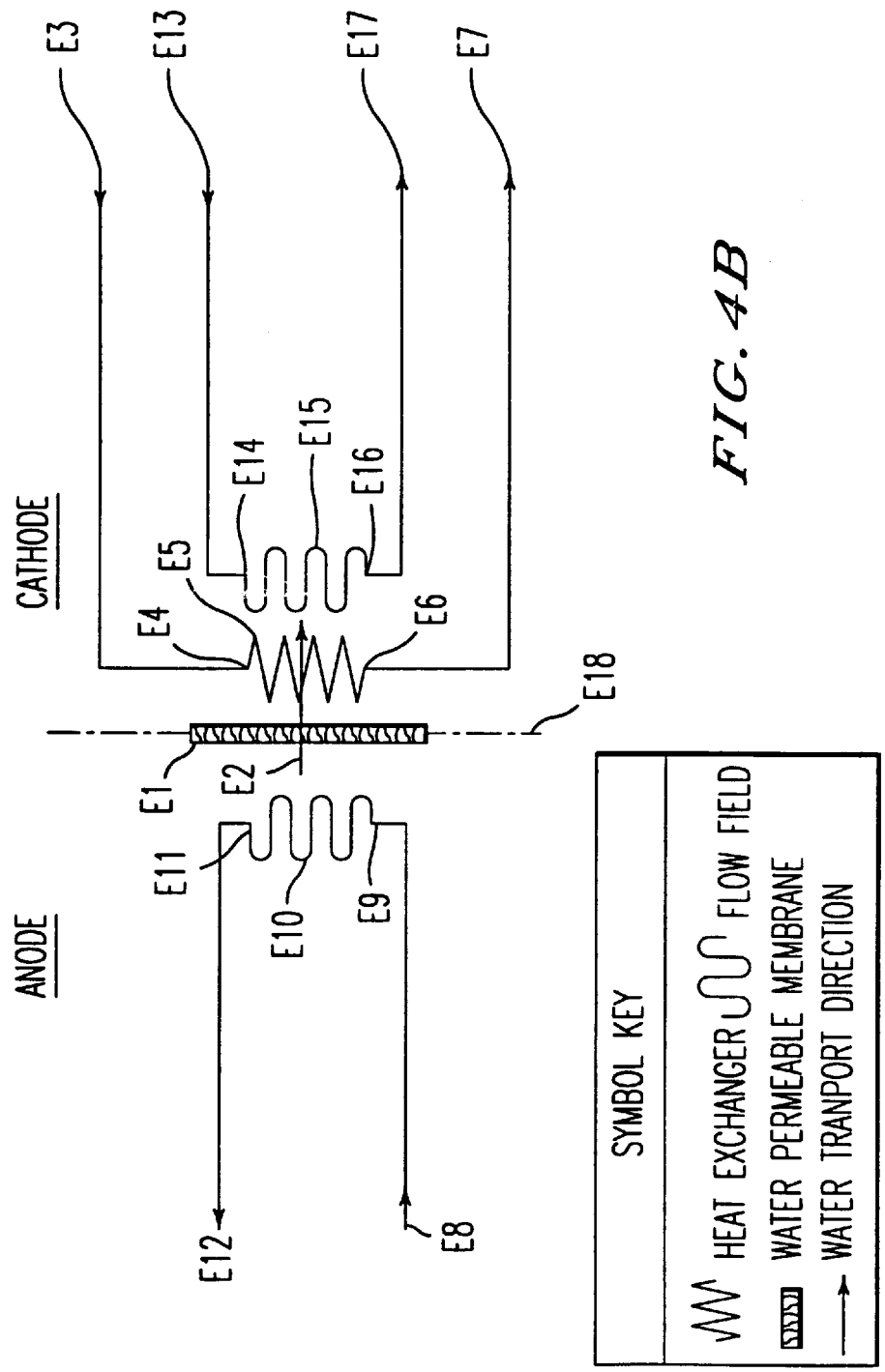
FIG. 4B is a schematic of the fluid circuits for an integrated thermal management bipolar separator of this invention.

FIG. 4B is a fluid circuit schematic for integrated thermal (only) management IFM separators. The schematic is drawn down the center line E18 of the electrochemical cell. The centerline passes down the center of the electrolytic membrane E1. The anode side of a separator is on the left side labeled Anode and depicts the features found on the anode flow field platelet. The cathode side of a separator is depicted on the right side labeled Cathode and depicts the features found on the cathode flow field platelet. The schematic clearly shows the integration of three fluid management devices into a single bonded composite separator. The three functions are: an anode active area serpentine channel E10 flow field; cooling water serpentine channel E5 heat exchanger; and a cathode and cathode active area serpentine channel E15 flow field. These functions are connected using a series of internal distribution and collection manifolds. This mechanical, fluid and thermal integration is a key element of this invention.

The electrolytic membrane E1 is ionically conductive to hydrated protons. During normal operation protons P9 formed on the anode are electro-osmotically pumped across the membrane to the cathode. Protons being pumped across the membrane carry one or more associated water molecules causing anode dry-out during high power operation. At low powers this is mitigated by back diffusion of water molecules from cathode to anode. At high powers this is mitigated by external humidification of hydrogen. Cathode dry-out occurs when operating on air at high power. This is also mitigated by external humidification of cathode air.

Hydrogen gas enters the hydrogen inlet E8, flows through internal distribution manifolds and feed circuits to the anode active area serpentine channel inlets E9, passes through the anode active area serpentine channels E10 where the hydrogen is oxidized to produce protons and electrons, leaves the active area through the anode active area serpentine channel exitsE11, flowing through internal collection manifold finally exiting as depleted hydrogen through the hydrogen exit E12.

Air (oxygen) gas enters the air (oxygen) inlet E13, flows through internal distribution manifolds and feed circuits to the cathode active area serpentine channel inlets E14, passes through the cathode active area serpentine channels E15 where the air (oxygen) is reduced by electrons and protons to produce product water, leaves the active area through the cathode active area serpentine channel exits E16, flowing through internal collection manifold finally exiting as depleted air (oxygen) and product water through the air (oxygen) exit E17.

Cooling and humidification water enters the cooling water inlet E3, flows through internal manifolds to the cooling water serpentine channel inlet E4, flows through the cooling water serpentine channel picking up heat produced as by product of the electrochemical reactions, flows out the cooling water serpentine channel exit E5, into internal manifolds, to the humidification water inlet manifold junction E6, flowing into internal manifolds finally exiting through the cooling water outlet E7.

Figure 5:
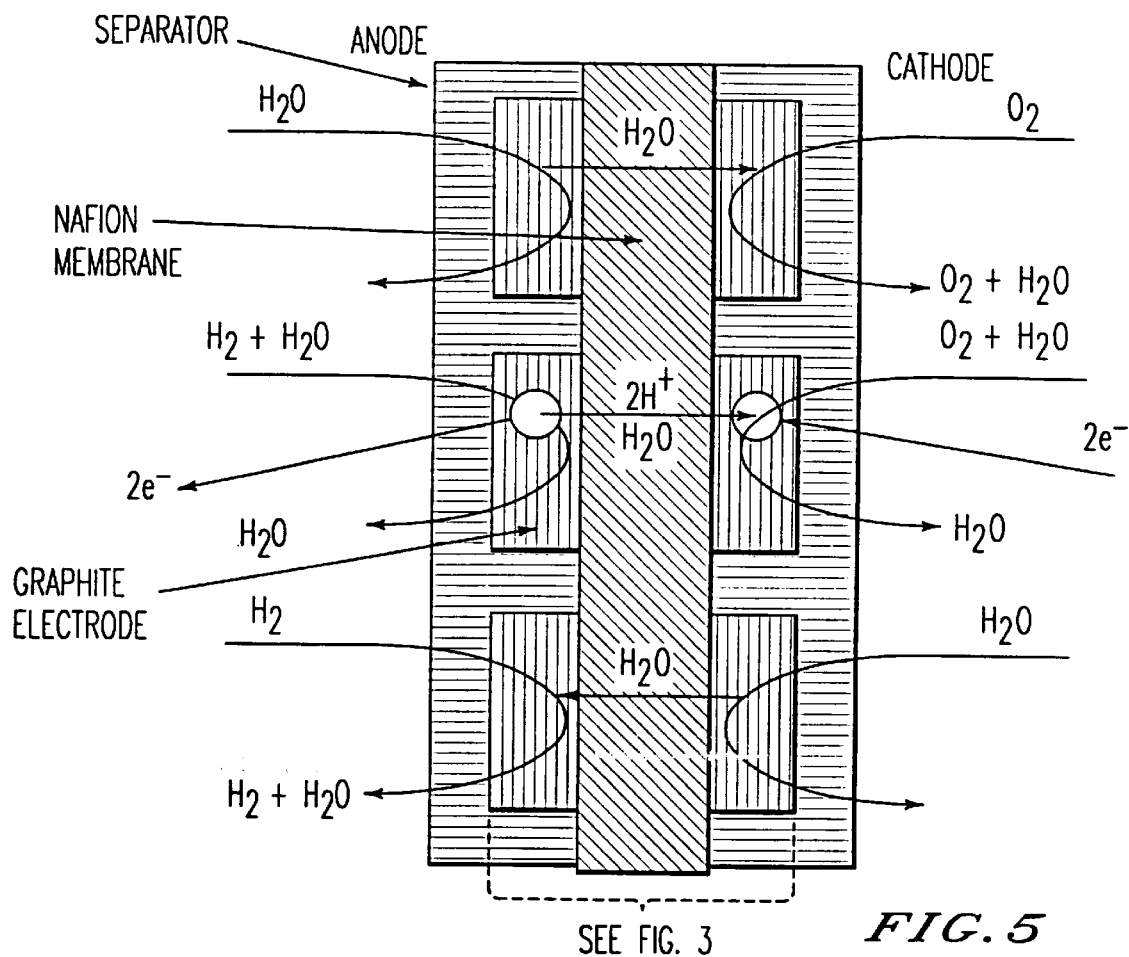
FIG. 5 is a schematic drawing of the electrochemistry of a PEM integrated humidity and thermal management fuel cell of this invention.

FIG. 5 depicts the overall electrochemical fuel cell operation for an integrated humidity and thermal management fuel cell. The center section of FIG. 5 depicts the overall fuel cell electrochemistry and is cross-referenced to FIG. 3, H1. $H_2$ on the anode side is catalytically oxidized to yield two electrons (indicated by 2e– at the end of a directional arrow) and two hydrated protons (indicated by $H+/H_2O$ in the membrane). The electrons are conducted away from the anodic catalytic site by the graphite electrodes which are in contact with the metal microscreen platelet. The hydrated protons are electro-osmotically pumped through the wet electrolytic membrane (indicated by $H+/H_2O$ in the membrane) to the cathode catalytic site where they combine with $O_2$ and two electrons (indicated by 2e–) to form product water ($H_2O$). The upper and lower sections of FIG. 5 depict the counter-flow humidification mechanism which is a central element of this invention. The electrolytic membrane serves a dual roll as a solid electrolyte and humidification membrane. The upper section shows oxygen gas on the cathode side being humidified by water on the anode side. Conversely hydrogen on the anode side is humidified by water on the cathode side.

Platelet Drawing Description

Figure 6A:
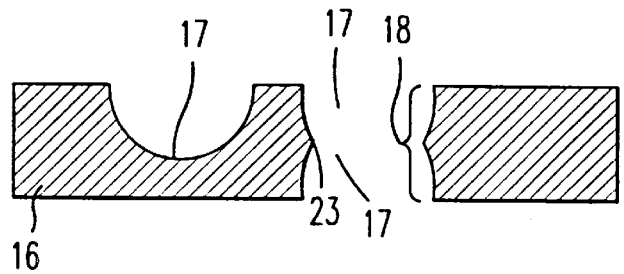
FIGS. 6A and 6B are diagrams contrasting single level depth and through features formed by chemical etching of metal (FIG. 6A) with multilevel depth and through features formed by compression or injection molding of plastic (FIG. 6B)
Figure 6B:
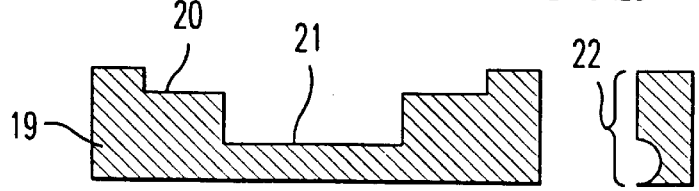

FIG. 6A is a diagram contrasting single level depth 17 and through-features 18 formed by etching metal platelets 16, e.g., by chemical, plasma, or erosion by electrical arc or high pressure fluid, or the like, techniques. FIG. 6B shows multilevel depths 20, 21 and through-features 22 formed by embossing, compression or injection molding plastic platelets 19. Chemical (solvent) etching, or the aforementioned erosion or plasma techniques may also be used on plastic. Platelets are typically designed with depth features that are 60% of the thickness of the platelet stock. Through features 18 are formed by simultaneously etching depth features 17 from both sides. Etching yields round bottom features with the result that etched through features have a residual cusp 23. This cusp significantly changes the fluid flow characteristics of through features and must be taken into account when designing etched platelet devices.

FIG. 6B shows features formed compression molding yields more rectangular features with slight mold draft. These features may be of varying and preselected depths 20, 21. The multiplicity of depths available in compression molded plastic platelets significantly reduces manufacturing costs and design complexity by reducing the number of platelets required to achieve a given depth profile. Analytical fluid models are simpler due to the lack of residual cusps.

FIG. 7 is a plan view of a microscreen current collector having a slotted flow field patterns Z1 and Z2 as shown. The slots are positioned to be coordinate with grooves and channels in the plastic fluid management core platelets. For many stack designs slotted flow field patterns Z1 and Z2 are the preferred embodiment.

FIGS. 8A–D depict typical but not exhaustive hole patterns for metal current collector microscreen platelets, 8A being hexagons, 8B being ellipsoids, 8C being Tees and 8D being alternate inverted interleaved chevrais. These patterns are fabricated by chemical milling, punching, or piercing thin metal plates. Microscreens are typically 65% open with uniform spacing of holes. The hole features are typically 8–20 mils with the web being 4–10 mils. Oriented hexagons FIG. 8A with major and minor axis aligned to the underlying serpentine channels are the preferred embodiment for microscreens. Hexagons yield the best design control over hole to web dimensions. In another embodiment, x-met (sheet that is slit in patterns, opened and flattened) is also useful.

Detailed Platelet Separator Drawing Description

There are two major embodiments of composite metal-plastic separators, edge conduction with one or more current bridges and through-conduction with one or more bus bars. These embodiments will be discussed sequentially starting with the edge conduction realizations.

Edge Conduction Integrated Humidity and Thermal Management

FIG. 9 is an exploded isometric view of a single cell F1 internal of the stack comprising separators F2A and F2B sandwiching on two EMAs F3A and adjacent EMA F3B of the next cell in the series. In this view, only the $H_2$ (anode) side of the bipolar separators are visible, but as shown below, there are coordinate air (oxygen) zones on the hidden (cathode) side. The large rectangular areas on the bipolar separator plates are conductive screens that cover the electrochemical active area on the EMA, F4A representing the anode side and F4C (hidden) the cathode side. The small rectangular areas above and below the active area are the cathode water humidification area F6 and anode hydrogen humidification flow field F5 respectively, and will be described in more detail below.

The EMAs F3A and F3B include catalyst coated areas F7A and F7C that are coordinate with the corresponding active areas F4A, F4C. Reactant and cooling water manifolds are evident on the margins. Hydrogen fuel enters via the hydrogen inlet manifold F9, flows through the hydrogen humidification flow field F5, through the anode active area F4A and leaves via the hydrogen outlet manifold F8. Air (oxygen) enters via the air (oxygen) inlet manifold, flows field through the air (oxygen) humidification flow field F14, through the cathode active area F4C and leaves through the air (oxygen) outlet manifold F12. Water for humidification and thermal management enters through water inlet manifold F11, flows through an internal heat exchanger, divides and flows through the cathode water humidification area F6 and the anode water humidification area F5. Water leaves through the water outlet manifold F10. Manifolds pass through bipolar separators F2 and EMAs F3. Compression tie rod holes F16 are evident on the margins of the bipolar separators and EMAS.

FIG. 10 is an exploded isometric view of a composite 4-platelet humidified bipolar IFMT separator F2 of this invention comprising plates of three different types, plates F17-1 and F17-4 being identical configuration conductive current collection microscreen platelets. While the configuration is preferably identical, although it could be different, the conductive material may be metal, conductive plastic, conductive ceramic, or ceramic or plastic having its surface metalized by plating or vacuum deposition). Current is conducted around the two plastic core platelets F17-2 and F17-3 by one or more edge current bridges F18, shown partly broken away. Sealing is effected around the margin of the microscreen platelet by the anode microscreen sealing surface F23, which may include sealing ridges (not shown) around the reactant and water manifolds F93. Optional sealing ridges (not shown) may be used to effect sealing around the active and humidification areas F19 as well.

Platelet F17-1 is the anode current collection microscreen consisting of a repeating pattern of through etched, punched or otherwise formed holes, channels or slots. Platelet F17-2 is the plastic or ceramic anode flow field platelet consisting of molded depth and through features. Platelet F17-2 contains the features that define the hydrogen humidification flow field F5, anode active area flow field F21, and the cathode water humidification area F6. The obverse side of platelet F17-2 forms the close out for the thermal management circuit F20 of platelet F17-3. Platelet F17-3 is the plastic or ceramic cathode flow field platelet consisting of molded depth and through features. Platelet F17-3 contains the features that define the thermal management heat exchanger F20, air (oxygen) humidification flow field F14, cathode active area flow field F22 and the anode water humidification area F15. The air (oxygen) humidification flow field F14, cathode active area flow field F22 and the anode water humidification area F15 are on the obverse side of platelet F17-3.

In all plates F17-2 to F17-3, the through transverse border passages or manifolds F93 and compression tie rod holes F16 are coordinate with those of EMA F3 in FIG. 9.

FIGS. 11A–G are a series showing in plan view from the facing side of each platelet and the details of one embodiment of the through and depth features of the 4 platelet bipolar separator plate of FIG. 10 in accord with the IFM principles of the invention. The progression of plates is as shown in FIG. 10, with the figure designation "Front" being the front of the plate as seen from the anode (foreground) side of FIG. 10, while the "Back" side is the non-visible side of the respective platelets of FIG. 10 when turned over. That is, the views are all "artwork" or plate facing (face-up) views. Platelets 1 and 4 are essentially the same with the exception of when sealing ridges are employed. FIGS. 11A–11C are plan views showing the front of platelet 1 and the back of platelet 4 joined by the current bridge F18. The anode platelet current collector microscreen F17-1 is depicted on the bottom with the cathode platelet current collector microscreen F17-4 on the top joined by the current bridge F18 in the middle. The anode and cathode current collector microscreen platelets are constructed with through features that define the microscreen (shown crosshatched). These features may be of diverse shapes and sizes as depicted in FIGS. 7 and 8.

As seen in FIG. 11A the anode current collector microscreen platelet F17-1 features define the cathode water humidification area F6, anode active area F4A, and hydrogen humidification flow field F5. A sealing surface F23 with optional sealing ridges surrounds the active and humidification areas F19. Manifold close-outs for distribution and collection manifolds of the anode flow field platelet F17-2 are formed by the anode microscreen manifold close-outs F25. The cathode current collector microscreen platelet F17-4 features define the air (oxygen) humidification flow field F14, cathode active area F4C, and the anode water humidification area F15. A sealing surface F24 with optional sealing ridges surrounds the active and humidification areas F19. Manifold close outs for distribution and collection manifolds of the anode flow field platelet F17-3 are formed by the cathode microscreen manifold close outs F26.

FIG. 11B is a plan and section views of typical metal microscreen current collector platelets with window screen depressions. The anode current collector microscreen depression F31, cathode current collector microscreen depression F90, transverse border passages or manifolds F93, anode microscreen sealing surface F23, cathode microscreen sealing surface F24, anode microscreen manifold close-out F25 and cathode microscreen manifold close-out F16 are depicted in plan and section view. The depth of the windows screen depressions F31 and F90 are designed match the depth of the depressions on the anode and cathode flow field platelets F17-2 and F17-3.

FIG. 11C is a plan and section views of metal microscreen current collector platelets without windows screen depressions. The transverse border passages or manifolds F93, anode microscreen sealing surface F23, cathode microscreen sealing surface F24, anode microscreen manifold close-out F25 and cathode microscreen manifold close-out F16 are depicted in plan and section view.

FIG. 11D depicts the front side of the plastic anode flow field platelet F17-2 -Front. This platelet has both through and depth features. The major through features are the compression tie rod holes F16, transverse manifolds; hydrogen outlet manifold F8, hydrogen inlet manifold F9, water inlet manifold F10, water outlet manifold F11, air (oxygen) outlet manifold F12, and air (oxygen) inlet manifold F13. Other through features are the hydrogen inlet via F32, hydrogen outlet via F35, cathode humidification water inlet via F44, and cathode humidification water outlet via F41. The major depth features on the front of the anode flow field platelet are the hydrogen humidification serpentine channels F36, anode active area serpentine channels F39, and the cathode humidification water serpentine channel F43. These features are designed to optimize the flow rates and pressure drops of the device.

Hydrogen fuel for the anode enters the humidification area through the hydrogen inlet via F32, enters the hydrogen distribution manifold F27 through the hydrogen distribution manifold inlet F33 and is distributed to the two hydrogen serpentine channels F36 through the hydrogen serpentine channel inlets F34. Hydrogen gas is humidified through the water permeable electrolytic membrane which is in contact with the hydrogen humidification serpentine channel F36. Humidified hydrogen leaves the humidification area through the hydrogen serpentine channel exits F37, enters the hydrogen collection manifold F28, and passes into the anode active area distribution manifold F29, flows into the anode active area serpentine channels F39 though the anode active area serpentine channel inlets F38. Within the active area hydrogen is catalytically oxidized on the anode side of an EMA to produce electrons and protons. Protons pass from the anode catalytic site through the electrolytic membrane to the cathode. Electrons are drawn off from the anode catalytic site through the graphite electrode. Electrons from the graphite electrode are collected by the anode current collector microscreen F17-1 and conducted through the composite bipolar separator by edge conductors F18.

Depleted hydrogen leaves the active area via the anode active area serpentine channels exits F40 and flows into the hydrogen collection manifold F31, finally exiting through the hydrogen exit via F35.

Hot water for cathode (air, oxygen) humidification enters through the cathode humidification water inlet via F44, passes into the cathode humidification water serpentine channel F43 through the cathode humidification water serpentine channel inlet F45, exits through the cathode humidification water serpentine channel exit F42, and leaves through cathode humidification water outlet via F41. Part of the hot water flowing through the serpentine channel is osmotically pumped across the electrolytic membrane to humidify cathode air (oxygen).

The anode current collector microscreen platelet F17-1 is bonded to the anode flow field platelet F17-2 and forms manifold close-outs for the hydrogen distribution manifold F27, hydrogen collection manifold F28, anode active area distrbution manifold F29 and anode active area collection manifold F30.

The optional anode microscreen depression F31 receives the corresponding anode current collector microscreen platelet F17-1 with anode microscreen depression F31 depicted in FIG. 11B. The depth of the anode current collector microscreen depression F31 is set to place the surface of the anode current collector microscreen platelet F17-1 flush with the surface of the anode flow field platelet F17-2, or it may be set to form a recess which receives graphite paper electrodes of the electrode membrane assemblies.

FIG. 11E depicts the back side of the plastic anode flow field platelet F17-2 -Back. This platelet has both through and depth features. The major through features are the compression tie rod holes F16, transverse manifolds; hydrogen outlet manifold F8, hydrogen inlet manifold F9, water inlet manifold F10, water outlet manifold F11, air (oxygen) outlet manifold F12, and air (oxygen) inlet manifold F13. Other through features are the hydrogen inlet via F32, hydrogen outlet via F35, cathode humidification water inlet via F44, and cathode humidification water outlet via F41. The major depth features are the hydrogen inlet channel F47, hydrogen outlet channel F50, air (oxygen) outlet channel F53, and the air (oxygen) outlet via base F55. Most of the surface of the anode flow field platelet F17-2 is used as a close out for the cooling water channels on the cathode flow field platelet F17-3.

Hydrogen flows from the hydrogen inlet manifold F9, through the hydrogen inlet channel inlet F48, into the hydrogen inlet channel F47, through the hydrogen inlet channel exit F46, and finally into the hydrogen inlet via F32. Hydrogen passes from back to front of the anode flow field platelet FIG. 11D, through the hydrogen inlet via F32. Depleted hydrogen from the active areas flows back through anode flow field platelet through the hydrogen outlet via F35, into the hydrogen outlet channel inlet F49, through the hydrogen outlet channel F50 and the hydrogen outlet channel exit F51, finally exiting into the hydrogen outlet manifold F8.

Depleted air (oxygen) is removed from the cathode humidification and active areas through the air (oxygen) outlet via F55, air (oxygen) outlet channel inlet F54, air (oxygen) outlet channel F53, air (oxygen) outlet channel exit F52, finally flowing into the air (oxygen) outlet manifold.

FIG. 11F depicts the front side of the plastic cathode flow field platelet F17-3 -Front. This platelet has both through and depth features. The major through features are the compression tie rod holes F16, transverse manifolds; hydrogen outlet manifold F8, hydrogen inlet manifold F9, water inlet manifold F10, water outlet manifold F11, air (oxygen) outlet manifold F12, and air (oxygen) inlet manifold F13. Other through features are the air (oxygen) inlet via F60, air (oxygen) outlet via F61, anode humidification water inlet via F58, and anode humidification water outlet via F57. The major depth features are the cooling water serpentine channels F62, humidification water inlet manifold F64 and the humidification water outlet manifold F63.

Cooling water enters through the water inlet manifold F10, cooling water channel inlet F65, cooling water channel F66 finally entering the cooling water serpentine channel F62 through the cooling water serpentine channel inlet F67. Flowing through the cooling water serpentine channel the cooling water picks up heat which is a by product of the electrochemical reactions. Hot water leaves through the cooling water serpentine channel exit F68 and flows into the humidification water inlet manifold junction F69, into the humidification water inlet manifold F64, and finally exits through the humidification water cathode exit F70 and cathode water humidification inlet via F56 or the humidification water anode exit F71 and anode water humidification inlet via F58. Hot water is used for humidification because of it high diffusion activity.

Air (oxygen) enters the cathode from the air (oxygen) inlet manifold F13, flows into the air (oxygen) inlet channel inlet F72, passes through the air (oxygen) inlet channel F73, into the air (oxygen) inlet channel exit F74, and flows to the cathode humidification and active area channels through the air (oxygen) inlet via F60. Air (oxygen) is humidified as it passes through the air (oxygen) humidification channels and is consumed in the cathode active area depicted in FIG. 11G. Depleted air (oxygen) and product water leave via the air (oxygen) outlet via F61 which connects to the air (oxygen) outlet manifold F12 through the air (oxygen) outlet channel on the anode flow field platelet F17-2.

FIG. 11G depicts the back side of the plastic cathode flow field platelet F17-3 -Back. This platelet has both through and depth features. The major through features are the compression tie rod holes F16, transverse manifolds; hydrogen outlet manifold F8, hydrogen inlet manifold F9, water inlet manifold F10, water outlet manifold F11, air (oxygen) outlet manifold F12, and air (oxygen) inlet manifold F13. Other through features are the air (oxygen) inlet via F60, air (oxygen) outlet via F61, anode humidification water inlet via F58, and cathode humidification water outlet via F59. The major depth features on the cathode flow field platelet are the air (oxygen) humidification serpentine channels F80, cathode active area serpentine channels F86, and the anode humidification water serpentine channel F77.

Air (oxygen) for the cathode enters the humidification area through the air (oxygen) inlet via F60, enters the air (oxygen) distribution manifold F79 through the air (oxygen) distribution manifold inlet F78 and is distributed to the two air (oxygen) serpentine channels F81 through the air (oxygen) serpentine channel inlets F80. Air (oxygen) gas is humidified through the water permeable electrolytic membrane which is in contact with the air (oxygen) humidification serpentine channel F81. Humidified air (oxygen) leaves the humidification area through the air (oxygen) serpentine channel exits F82, enters the air (oxygen) humidification collection manifold F83, and passes into the cathode active area distribution manifold F84, flows into the cathode active area serpentine channels F86 though the cathode active area serpentine channel inlets F85. Within the active area oxygen is catalytically reduced receiving protons and electrons from the anode to produce water. Electrons flow from anode to cathode via current bridge F18, into the cathode current collector microscreen 17-4, through the cathode graphite electrode on the EMA and finally docking with a cathode catalytic site where the electrons react with anode generated protons and oxygen to produce surplus heat and product water. Depleted air (oxygen) and product water leaves the active area via the cathode active area serpentine channels exits F87 and flows into the air (oxygen) collection manifold F88, through the air (oxygen) collection manifold exit F89 finally exiting through the air (oxygen) exit via F61.

Hot water for anode (hydrogen) humidification enters through the anode humidification water inlet via F58, passes into the anode humidification water serpentine channel F77 through the anode humidification water serpentine channel inlet F76, exits through the anode humidification water serpentine channel exit F75, and leaves through anode humidification water outlet via F59. Part of the hot water flowing through the serpentine channel is osmotically pumped across the electrolytic membrane to humidify anode hydrogen.

Platelet F17-3 is bonded to platelet F17-4 which may have an optional cathode current collector microscreen depression F90, and forms manifold close outs for the air (oxygen) humidification distribution manifold F79, air (oxygen) humidification collection manifold F83, cathode active area distribution manifold F84 and cathode active area collection manifold F88.

The depth of the cathode current collector microscreen depression F90 is set to place the surface of the cathode current collector microscreen platelet F17-4 flush with the surface of the cathode flow field platelet F17-3, or it may be set to form a recess which receives graphite paper electrodes of the electrode membrane assemblies F3 in FIG. 9.

Edge Conduction Integrated Thermal Management

FIG. 12 is an exploded isometric view of a single cell G1 internal of the stack comprising separators G2A and G2B sandwiching EMA G3A and contacting the next EMA G3B of the next adjacent cell in the stack. In this view, only the $H_2$ (anode) side of the bipolar separators are visible, but as shown below, there are coordinate $O_2$ zones on the hidden (cathode) side. The large rectangular areas G4A are the active areas of the cell, G4A representing the anode side and G4C the cathode side.

The EMAs G3A and G3B include catalyst coated areas G7A and G7C that are coordinate with the corresponding active areas G4A, G4C. Reactant and cooling water manifolds are evident on the margins. Hydrogen fuel enters via the hydrogen inlet manifold G7 flows through the anode active area G4A and leaves via the hydrogen outlet manifold G6. Air (oxygen) enters via the air (oxygen) inlet manifold G10 flows through the cathode active area F4C and leaves through the air (oxygen) outlet manifold G11. Cooling water for thermal management enters through water inlet manifold G9, flows through an internal heat exchanger and leaves through the water outlet manifold G8. Transverse reactant and cooling water inlet and outlet manifolds G6, G7, G9, G11, G10 and G12 pass through bipolar separators G2 and EMAs G3. Compression tie rod holes G12 are evident on the margins of the bipolar separators and EMAs.

FIG. 13 is an exploded isometric view of a 4-platelet bipolar IFMT separator G2 of this invention comprising plates of three different types, plates G13-1 and G13-4 being identical current collection microscreen platelets connected by current bridge G14 shown partly in dashed lines. Platelet G13-1 is the anode current collection microscreen consisting of a repeating pattern of through etched or punched holes. Platelet G13-2 is the plastic or ceramic anode flow field platelet consisting of molded depth and through features. Platelet G13-2 contains the features that define anode active area flow field G16. The obverse side of platelet G13-2 forms the close out for the thermal management circuit G17 of platelet G13-3. Platelet G13-3 is the plastic or ceramic cathode flow field platelet consisting of molded depth and through features. Platelet G13-3 contains the features that define the thermal management heat exchanger G17 and cathode active area flow field G18. The cathode active area flow field G18 is on the obverse side of platelet G13-3. Sealing is effected around the margin of the microscreen platelet G13-1 and G13-2. Optional sealing ridges (not shown) may be used to effect sealing around the active areas G4A and G4C.

In all plates G13-2 to G13-3 the through transverse border passages or manifolds G15 and compression tie rod holes G12 are coordinate with those of EMA G3 in FIG. 12.

FIGS. 14A–G and G are a series showing in plan view from the facing side of each platelet and the details of one embodiment of the through and depth features of the 4 platelet bipolar separator plate of FIG. 13 in accord with the IFM principles of the invention. The progression of platelets and frontback sides are the same as the FIGS. 11A–G series.

FIG. 14A is a plan view of the anode and cathode current collector microscreen platelets G13-1 and G13-4, anode screen on the bottom, cathode screen on top. The through features of the microscreens may be of diverse shapes and sizes as depicted in FIG. 8. The anode current collector microscreen platelet has features that define the anode active area G4A. A sealing surface G19 with optional sealing ridges G60 (shown in phantom) surrounds the active G4A. Manifold close outs for distribution and collection manifolds of the anode flow field platelet G13-2 are formed by the anode microscreen manifold close outs G21.

The cathode current collector microscreen platelet G13-4 features define the cathode active area G40. A sealing surface G22 with optional sealing ridges surrounds the cathode active area G4C. Manifold close outs for distribution and collection manifolds of the anode flow field platelet G13-3 are formed by the cathode microscreen manifold close outs G22.

FIG. 14B is a plan view of metal microscreen current collector platelets with window screen depressions shown in sections to the right. The two platelets G13-1 and G13-4 are joined by the current bridge G14. The anode current collector microscreen depression G25, cathode current collector microscreen depression G59, transverse border passages or manifolds G15, anode microscreen sealing surface G19, cathode microscreen sealing surface G20, anode microscreen manifold close-out G21 and cathode microscreen manifold close-out G22 are depicted in plan and section view. The depth of the window screen depressions G25 and G59 are designed match the depth of the depressions on the anode and cathode flow field platelets G13-2 and G13-3.

FIG. 14C is a plan view of metal microscreen current collector platelets without window screen depressions with corresponding plan as section views shown to the right. The two platelets G13-1 and G13-4 are joined by the current bridge G14. The transverse border passages or manifolds G15, anode microscreensealing surface G19, cathode microscreen sealing surface G20, anode microscreen manifold close-out G21 and cathode microscreen manifold close-out G22 are depicted in plan and section view.

FIG. 14D depicts the front side of the plastic anode flow field platelet G13-2 -Front. This platelet has both through and depth features. The major through features are the compression tie rod holes G12, transverse manifolds; hydrogen outlet manifold G6, hydrogen inlet manifold G7, water inlet manifold G8, water outlet manifold G9, air (oxygen) outlet manifold G11, and air (oxygen) inlet manifold G10. Other through features are the hydrogen inlet via G26 and the hydrogen outlet via G28. The major depth features on the front of the anode flow field platelet are anode active area serpentine channels G31, anode active area distribution manifold G23 and the anode active area collection manifold G24. These features are designed to optimize the flow rates and pressure drops of the device.

Hydrogen fuel for the anode area enters through the hydrogen inlet via G26, passes through the anode active area distribution manifold inlet G27, into the anode active area distribution manifold G23, flows into the anode active area serpentine channels G31 though the anode active area serpentine channel inlets G30. Within the active area hydrogen is catalytically oxidized on the anode side of the EMA to produce electrons and protons. Protons pass from the anode catalytic site through the electrolytic membrane to the cathode. Electrons are drawn off from the anode catalytic site through the graphite electrode. Electrons from the graphite electrode are collected by the anode current collector microscreen G13-1 and conducted by tab or bridge G14 to the cathode microscreen G13-4.

Depleted hydrogen leaves the active area via the anode active area serpentine channels exits G32 and flows into the anode active area collection manifold G24, through the active area collection manifold exit G29 and finally exits through the hydrogen exit via G28.

Platelet G13-1 is bonded into an anode current collector microscreen depression G25 and forms manifold close outs for the anode active area distribution manifold G23 and anode active area collection manifold G24.

The depth of the anode current collector microscreen area G25 may be selected flush to place the surface of the anode microscreen platelet G13-1 flush with the surface of the anode flow field platelet G13-2, or it may be depressed to form a recess which receives graphite paper electrodes of the electrode membrane assemblies.

FIG. 14E depicts the back side of the plastic anode flow field platelet G13-2 -Back. This platelet has both through and depth features. The major through features are the compression tie rod holes G12, transverse manifolds; hydrogen outlet manifold G6, hydrogen inlet manifold G7, water inlet manifold G9, water outlet manifold G8, air (oxygen) outlet manifold G11, and air (oxygen) inlet manifold G10. Other through features are the hydrogen inlet via G28 and the hydrogen outlet via G26. The major depth features are the hydrogen inlet channel G34, and the hydrogen outlet channel G37. Most of the surface of the anode flow field platelet G13-2 is used as a close out for the cooling water channels on the cathode flow field platelet G13-3.

Hydrogen flows from the hydrogen inlet manifold G7, through the hydrogen inlet channel inlet G35, into the hydrogen inlet channel G34, through the hydrogen inlet channel exit G33, and finally into the hydrogen inlet via G26. Hydrogen passes from back to front of the anode flow field platelet FIG. 14D, through the hydrogen inlet via G26. Depleted hydrogen from the active areas flows back through anode flow field platelet through the hydrogen outlet via G28, into the hydrogen outlet channel inlet G36, through the hydrogen outlet channel G37 and the hydrogen outlet channel exit G38, finally exiting into the hydrogen outlet manifold G6.

FIG. 14F depicts the front side of the plastic cathode flow field platelet G13-3 -Front. This platelet has both through and depth features. The major through features are the compression tie rod holes G12, transverse manifolds; hydrogen outlet manifold G6, hydrogen inlet manifold G7, water inlet manifold G9, water outlet manifold G8, air (oxygen) outlet manifold G11, and air (oxygen) inlet manifold G10. Other through features are the air (oxygen) inlet via G44 and the air (oxygen) outlet via G45. The major depth features are the cooling water serpentine channels G46, air (oxygen) inlet and outlet channels G50 and G40.

Cold cooling water enters through the cooling water inlet manifold G9, flows into the cooling water serpentine channel inlet G47, and passes into the cooling water serpentine channel G46. Flowing through the cooling water serpentine channel G46 the cooling water picks up heat which is a by product of the electrochemical reactions. Hot water exits through the cooling water serpentine channel exit G48, finally leaving through the cooling water outlet manifold G8.

Air (oxygen) flows from the air (oxygen) inlet manifold G10, through the air (oxygen) inlet channel inlet G49, into the air (oxygen) inlet channel G50, through the air (oxygen) inlet channel exit G51, and finally into the air (oxygen) inlet via base G42 which communicates with the air (oxygen) inlet via G44 on the cathode flow field platelet G13-3 in FIG. 14D. The air (oxygen) inlet via G44 brings air (oxygen) to the cathode active area flow field.

Depleted air (oxygen) is removed from the cathode active area through the air (oxygen) outlet via G45 (FIG. 14G) into the air (oxygen) outlet via base G28, into air (oxygen) outlet channel inlet G36, through the air (oxygen) outlet channel G37, past the air (oxygen) outlet channel exit G38, finely exiting through the air (oxygen) outlet manifold G6.

FIG. 14G depicts the back side of the plastic cathode flow field platelet G13-3 Back. This platelet has both through and depth features. The major through features are the compression tie rod holes G12, transverse manifolds; hydrogen outlet manifold G6, hydrogen inlet manifold G7, water inlet manifold G9, water outlet manifold G8, air (oxygen) outlet manifold Gil, and air (oxygen) inlet manifold G10. Other through features are the air (oxygen) inlet via G44 and the air (oxygen) outlet via G45. The major depth features on the cathode flow field platelet are the cathode active area distribution manifold G53, cathode active area collection manifold G57, and the cathode active area serpentine channels G55.

Air (oxygen) for the cathode enters the humidification area through the air (oxygen) inlet via G44, passes the cathode distribution manifold inlet G52, flows into the cathode distribution manifold G53 and is distributed to the cathode active area serpentine channels G55 though the cathode active area serpentine channel inlets G54. Within the active area oxygen is catalytically reduced receiving protons and electrons from the anode to produce water. Electrons flow from anode to cathode via current bridge G14, into the cathode current collector microscreen 13-4, through the cathode graphite electrode on the EMA and finally docking with a cathode catalytic site where the electrons react with anode generated protons and oxygen to produce surplus heat and product water. Depleted air (oxygen) and product water leaves the active area via the cathode active area serpentine channels exits G56 and flows into the cathode active area collection manifold G57, through the air (oxygen) collection manifold exit G58 finally exiting through the air (oxygen) exit via G45 which communicates with the air (oxygen) outlet channel G40 and the air (oxygen) outlet manifold G11 on the cathode flow field platelet 13-3 -Front FIG. 14F.

FIG. 15 is a plan view of an anode (bottom) and cathode (top) current collector microscreen platelets F17-1 and F17-4, respectively, with a current bridge F18 and multiple current tabs. The anode current collector microscreen platelet features define the cathode water humidification area F6, anode active area F4A, and hydrogen humidification flow field F5. Three current conducting tabs F94 protrude from the edges of platelet F17-1 These current tabs mate with the three corresponding current tabs on platelet F17-4 and are joined by spot welding, micro brazing, soldering or gluing with conductive adhesives. The number of current bridges is preselected as a function of the required current-carrying requirements of a given sealing ridges F95 are optional.

The cathode current collector microscreen platelet F17-4 features define the air (oxygen) humidification flow field F14, cathode active area F4C, and the anode water humidification area F15. Three current conducting tabs F94 protrude from the edges of platelet F17-4. These current tabs mate with the three corresponding current tabs on platelet F17-1 and are joined by spot welding, micro brazing, soldering or gluing with conductive adhesives.

Through reactant and cooling water manifolds F93 and tie rod holes F16 are located in the same peripheral positions as for the single current bridge realization depicted in FIG. 14A.

FIG. 16 is an exploded isometric view of a 4-platelet humidified bipolar IFMT separator F2 of this invention comprising plates of three different types, plates F17-1 and F17-4 being identical current collection microscreen platelets as above. Current is conducted around the two plastic core platelets F17-2 and F17-3 by an edge current bridge F18 and three joined current tabs F94.

Platelet F17-1 is the anode current collection microscreen consisting of a repeating pattern of through-etched or punched holes. Platelet F17-2 is the plastic or ceramic anode flow field platelet consisting of molded depth and through features. Platelet F17-3 is the plastic or ceramic cathode flow field platelet consisting of molded depth and through features. Platelet F17-4 is the cathode current collection microscreen consisting of a repeating pattern of through-etched or punched holes.

Bus Bar Conduction Integrated Humidity and Thermal Management

FIG. 17 is an exploded isometric view of a single cell A1 internal of the stack comprising separators A2A and A2B sandwiching an EMAs A3A in contact with EMA A3B of the next adjacent cell. The plate sequence and views are as above. The microscreen A4A represents the anode side and A4C the cathode side which are connected by internal bus bars described in detail below. Anode hydrogen humidification flow field A5 and cathode water humidification area A6 are present in the separators, and described in more detail below.

The EMAs A3A and A3B include catalyst coated areas A7A and A7C that are coordinate with the corresponding active areas A4A, A4C. Reactant and cooling water manifolds are evident on the margins. Hydrogen fuel enters via the hydrogen inlet manifold A9, flows through the hydrogen humidification flow field A5, through the anode active area A4A and leaves via the hydrogen outlet manifold A8. Air (oxygen) enters via the air (oxygen) inlet manifold, flows field through the air (oxygen) humidification flow field A14, through the cathode active area A4C and leaves through the air (oxygen) outlet manifold A12. Water for humidification and thermal management enters through water inlet manifold A11, flows through an internal heat exchanger, divides and flows through the cathode water humidification area A56 and the anode water humidification area A5. Water leaves through the water outlet manifold A10. Manifolds pass through bipolar separators A2 and EMAs A3. Compression tie rod holes Al6 are evident on the margins of the bipolar separators and EMAs.

FIG. 18 is an exploded isometric view of a 4-platelet humidified bipolar IFMT separator A2 of this invention comprising plates of three different types, plates A17-1 and A17-4 being identical current collection microscreen platelets. Current is conducted through the two plastic core platelets A17-2 and A17-3 by one or more internal bus bars A18. While two rectangular cross section bus bars are depicted, any number, geometrical cross-section and orientation may be employed, both within the screen field or external of it. Sealing is effected around the margin of the microscreen platelet by the plastic core platelets A17-2 and A17-3, which may include sealing ridges (not shown) around the reactant and water manifolds, and around the active areas A21, A22, and the humidification areas A5, A6, A14, A15 and A19.

The two metallic current collection microscreen platelets A17-1 (anode) and A17-4 (cathode) are identical. Platelet A17-2 is the plastic or ceramic anode flow field platelet consisting of molded depth and through features. Platelet Al7-2 contains the features that define the hydrogen humidification flow field A5, anode active area flow field A21, and the cathode water humidification area A6. The obverse side of platelet A17-2 forms the closeout for the thermal management circuit A20 of platelet A17-3. Platelet A17-3 is the plastic or ceramic cathode flow field platelet consisting of molded depth and through features. Platelet A17-3 contains the features that define the thermal management heat exchanger A20, air (oxygen) humidification flow field A14, cathode active area flow field A22 and the anode water humidification area A15. The air (oxygen) humidification flow field Al4, cathode active area flow field A2 and the anode water humidification area A15 are on the obverse side of platelet A17-3.

In all plates A17-2 to A17-3 the through transverse border passages or manifolds A93 and compression tie rod holes Al 6 are coordinate with those of EMA A3 in FIG. 17.

FIGS. 19A–G are a series showing in plan view from the facing side of each platelet and the details of one embodiment of the through and depth features of the 4 platelet bipolar separator plate of FIG. 18 in accord with the IFM principles of the invention. It should be noted that the progression of plates is as shown in FIG. 18 with the same conventions as used above in the edge conduction embodiments.

Platelets 1 and 4 are essentially the same with the exception of when sealing ridges are employed, FIG. 19A shows as A17-1 the front of platelet 1 on the left and as A17-4 the back of platelet 4 on the right. The anode current collector microscreen platelet features define the cathode water humidification area A6, anode active area A4A, and hydrogen humidification flow field A5. A sealing surface A23 with optional sealing ridges surrounds the active and humidification areas Al9. Manifold close outs for distribution and collection manifolds of the anode flow field platelet A17-2 are formed by the anode microscreen manifold close outs A25.

The cathode current collector microscreen platelet A17-4 features define the air (oxygen) humidification flow field A14, cathode active area A4C, and the anode water humidification area A15. A sealing surface A24 with optional sealing ridges surrounds the active and humidification areas A19. Manifold close-outs for distribution and collection manifolds of the anode flow field platelet A17-3 are formed by the cathode microscreen manifold close-outs A26.

FIG. 19B is a plan view of the plastic anode flow field platelet A17-2 -Front with a fragmentary portion of the anode current collector microscreen platelet A17-1 overlain on the lower right corner to slow the positioning and orientation. Platelet A17-1 is bonded into an anode current collector microscreen depression A31 and forms manifold close outs for the hydrogen distribution manifold A27, hydrogen collection manifold A28, anode active area distribution manifold A29 and anode active area collection manifold A30. Two bus bars A18 are electrically bonded to the anode current collector microscreen platelet.

The anode current collector microscreen area A31 may be coplanar with the rest of the platelet to place the surface of the anode current collector microscreen platelet A17-1 flush with the surface of the anode flow field platelet A17-2, or it may be inset to form a recess which receives graphite paper electrodes of the EMAs.

FIG. 19C depicts the front side of the plastic anode flow field platelet A17-2 -Front. This platelet has both through and depth features. The major through features are the compression tie rod holes A16, transverse manifolds; hydrogen outlet manifold A8, hydrogen inlet manifold A9, water inlet manifold A10, water outlet manifold A11, air (oxygen) outlet manifold A12, and air (oxygen) inlet manifold A13. Other through features are the hydrogen inlet via A32, hydrogen outlet via A35, cathode humidification water inlet via A44, and cathode humidification water outlet via A41. The major depth features on the front of the anode flow field platelet are the hydrogen humidification serpentine channels A36, anode active area serpentine channels A39, and the cathode humidification water serpentine channel A43. These features are designed to optimize the flow rates and pressure drops of the device.

Hydrogen fuel for the anode enters the humidification area through the hydrogen inlet via A32, enters the hydrogen distribution manifold A27 through the hydrogen distribution manifold inlet A33 and is distributed to the two hydrogen serpentine channels A36 through the hydrogen serpentine channel inlets A34. Hydrogen gas is humidified through the water permeable electrolytic membrane which is in contact with the hydrogen humidification serpentine channel A36. Humidified hydrogen leaves the humidification area through the hydrogen serpentine channel exits A37, enters the hydrogen collection manifold A28, and passes into the anode active area distribution manifold A29, flows into the anode active area serpentine channels A39 though the anode active area serpentine channel inlets A38. With in the active area hydrogen is catalytically oxidized on the anode side of an EMA to produce electrons and protons. Protons pass from the anode catalytic site through the electrolytic membrane to the cathode. Electrons are drawn off from the anode catalytic site through the graphite electrode. Electrons from the graphite electrode are collected by the anode current collector microscreen A17-1 and conducted through the composite bipolar separator by bus bars A18.

Depleted hydrogen leaves the active area via the anode active area serpentine channels exits A40 and flows into the hydrogen collection manifold A31, finely exiting through the hydrogen exit via A35.

Hot water for cathode (air, oxygen) humidification enters through the cathode humidification water inlet via A44, passes into the cathode humidification water serpentine channel A43 through the cathode humidification water serpentine channel inlet A45, exits through the cathode humidification water serpentine channel exit A42, and leaves through cathode humidification water outlet via A41. Part of the hot water flowing through the serpentine channel is osmotically pumped across the electrolytic membrane to humidify cathode air (oxygen).

FIG. 19D depicts the back side of the plastic anode flow field platelet A17-2 -Back. This platelet has both through and depth features. The major through features are the compression tie rod holes A16, transverse manifolds; hydrogen outlet manifold A8, hydrogen inlet manifold A9, water inlet manifold A10, water outlet manifold A11, air (oxygen) outlet manifold A12, and air (oxygen) inlet manifold A13. Other through features are the hydrogen inlet via A32, hydrogen outlet via A35, cathode humidification water inlet via A44, and cathode humidification water outlet via A41. The major depth features are the hydrogen inlet channel A47, hydrogen outlet channel A50, air (oxygen) outlet channel A53, and the air (oxygen) outlet via base A55. Most of the surface of the anode flow field platelet A17-2 is used as a close out for the cooling water channels on the cathode flow field platelet A17-3.

Hydrogen flows from the hydrogen inlet manifold A9, through the hydrogen inlet channel inlet A48, into the hydrogen inlet channel A47, through the hydrogen inlet channel exit A46, and finally into the hydrogen inlet via A32. Hydrogen passes from back to front of the anode flow field platelet (FIG. 19C), through the hydrogen inlet via A32. Depleted hydrogen from the active areas flows back through anode flow field platelet through the hydrogen outlet via A35, into the hydrogen outlet channel inlet A49, through the hydrogen outlet channel A50 and the hydrogen outlet channel exit A51, finely exiting into the hydrogen outlet manifold A8.

Depleted air (oxygen) is removed from the cathode humidification and active areas (FIG. 19F), through the air (oxygen) outlet via base A55, air (oxygen) outlet channel inlet A54, air (oxygen) outlet channel A53, air (oxygen) outlet channel exit A52, finally flowing into the air (oxygen) outlet manifold.

Current is conducted through the anode flow field platelet via the two bus bars A18.

FIG. 19E depicts the front side of the plastic cathode flow field platelet A17-3 -Front. This platelet has both through and depth features. The major through features are the compression tie rod holes A16, transverse manifolds; hydrogen outlet manifold A8, hydrogen inlet manifold A9, water inlet manifold A10, water outlet manifold A11, air (oxygen) outlet manifold A12, and air (oxygen) inlet manifold A13. Other through features are the air (oxygen) inlet via A60, air (oxygen) outlet via A61, anode humidification water inlet via A58, and anode humidification water outlet via A57. The major depth features are the cooling water serpentine channels A62, humidification water inlet manifold A64 and the humidification water outlet manifold A63.

Cooling water enters through the water inlet manifold A10, cooling water channel inlet A65, cooling water channel A66 finally entering the cooling water serpentine channel A62 through the cooling water serpentine channel inlet A67. Flowing through the cooling water serpentine channel the cooling water picks up heat which is a by product of the electrochemical reactions. Hot water leaves through the cooling water serpentine channel exit A68 and flows into the humidification water inlet manifold junction A69, into the humidification water inlet manifold A64, and finely exits through the humidification water cathode exit A70 and cathode water humidification inlet via A56 or the humidification water anode exit A71 and anode water humidification inlet via A58. Hot water is used for humidification because of it high diffusion activity.

Air (oxygen) enters the cathode from the air (oxygen) inlet manifold A13, flows into the air (oxygen) inlet channel inlet A72, passes through the air (oxygen) inlet channel A73, into the air (oxygen) inlet channel exit A74, and flows to the cathode humidification and active area channels through the air (oxygen) inlet via A60. Air (oxygen) is humidified as it passes through the air (oxygen) humidification channels and is consumed in the cathode active area depicted in FIG. 19F. Depleted air (oxygen) and product water leave via the air (oxygen) outlet via A61 which connects to the air (oxygen) outlet manifold A12 through the air (oxygen) outlet channel on the anode flow field platelet A17-2.

Current is conducted through the cathode flow field platelet via the two bus bars A18.

FIG. 19F depicts the back side of the plastic cathode flow field platelet A17-3 -Back. This platelet has both through and depth features. The major through features are the compression tie rod holes A16, transverse manifolds; hydrogen outlet manifold A8, hydrogen inlet manifold A9, water inlet manifold A10, water outlet manifold A11, air (oxygen) outlet manifold A12, and air (oxygen) inlet manifold A13. Other through features are the air (oxygen) inlet via A60, air (oxygen) outlet via A61, anode humidification water inlet via A58, and cathode humidification water outlet via A59. The major depth features on the cathode flow field platelet are the air (oxygen) humidification serpentine channels A80, cathode active area serpentine channels A86, and the anode humidification water serpentine channel A77.

Air (oxygen) for the cathode enters the humidification area through the air (oxygen) inlet via A60, enters the air (oxygen) distribution manifold A79 through the air (oxygen) distribution manifold inlet A78 and is distributed to the two air (oxygen) serpentine channels A81 through the air (oxygen) serpentine channel inlets A80. Air (oxygen) gas is humidified through the water permeable electrolytic membrane which is in contact with the air (oxygen) humidification serpentine channel A81. Humidified air (oxygen) leaves the humidification area through the air (oxygen) serpentine channel exits A82, enters the air (oxygen) humidification collection manifold A83, and passes into the cathode active area distribution manifold A84, flows into the cathode active area serpentine channels A86 though the cathode active area serpentine channel inlets A85. With in the active area oxygen is catalytically reduced receiving protons and electrons from the anode to produce water. Electrons flow from anode to cathode via bus bars A18, into the cathode current collector microscreen 17-4, through the cathode graphite electrode on the EMA and finely docking with a cathode catalytic site where the electrons react with anode generated protons and oxygen to produce surplus heat and product water. Depleted air (oxygen) and product water leaves the active area via the cathode active area serpentine channels exits A87 and flows into the air (oxygen) collection manifold A88, through the air (oxygen) collection manifold exit A89 finely exiting through the air (oxygen) exit via A61.

Hot water for anode (hydrogen) humidification enters through the anode humidification water inlet via A58, passes into the anode humidification water serpentine channel A77 through the anode humidification water serpentine channel inlet A76, exits through the anode humidification water serpentine channel exit A75, and leaves through anode humidification water outlet via A59. Part of the hot water flowing through the serpentine channel is osmotically pumped across the electrolytic membrane to humidify anode hydrogen.

The bus bars A18 (top and bottom) project through the plate to contact the microscreen collector plate A17-4 as seen in FIG. 19G, which shows a plan view of the plastic cathode flow field platelet A17-3 -Back with a fragment of the cathode current collector microscreen platelet A17-4 in the lower right corner. Platelet A17-4 is bonded into a cathode current collector microscreen depression A90 and forms manifold close outs for the air (oxygen) humidification distribution manifold A79, air (oxygen) humidification collection manifold A83, cathode active area distribution manifold A84 and cathode active area collection manifold A88. Two bus bars A18 are bonded to the cathode current collector microscreen platelet A17-4 to provide a good electrical connection.

The cathode current collector microscreen area A90 is selected to either place the surface of the cathode current collector microscreen platelet A17-4 flush with the surface of the cathode flow field platelet A17-3, or it may be inset to form a recess which receives graphite paper electrodes of the electrode membrane assemblies A3 in FIG. 17.

Bus Bar Conduction Integrated Thermal Management

The following detailed description illustrates bus bar through-conduction realization of the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 20 is an exploded isometric view of asingle cell B1 internal of the stack comprising separators B2A and B2B sandwiching EMA B3A and contacting EMA B3B of the next adjacent cell. In this view, only the $H_2$ (anode) side of the bipolar separators are visible, but as shown below, there are coordinate $O_2$ zones on the hidden (cathode) side. The large rectangular areas B4A are the active areas of the cell, B4A representing the anode side and B4C. the cathode side.

The EMAs B3A and B3B include catalyst coated areas B7A and A7C that are coordinate with the corresponding active areas B4A, B4C. Reactant and cooling water manifolds are evident on the margins. Hydrogen fuel enters via the hydrogen inlet manifold B7 flows through the anode active area B4A and leaves via the hydrogen outlet manifold B6. Air (oxygen) enters via the air (oxygen) inlet manifold B10 flows through the cathode active area A4C and leaves through the air (oxygen) outlet manifold B11. Cooling water for thermal management enters through water inlet manifold B9, flows through an internal heat exchanger and leaves through the water outlet manifold B8. Transverse reactant and cooling water inlet and outlet manifolds B6, B7, B9, B11, B10 and B12 pass through bipolar separators B2 and EMAs B3. Compression tie rod holes A16 are evident on the margins of the bipolar separators and EMAs.

FIG. 21 is an exploded isometric view of a 4-platelet humidified bipolar IFMT separator B2 of this invention comprising plates of three different types, plates B13-1 and B13-4 being identical current collection microscreen platelets. Current is conducted through the two plastic core platelets B13-2 and B13-3 by one or more internal bus bars Bl4. While two rectangular cross section bus bars are depicted, any number, geometrical cross section, and orientation may be employed, both within the screen field or external to it. Sealing is effected around the margin of the microscreen platelet by the plastic core platelets B13-2 and B13-3, which may include sealing ridges (not shown) around the reactant and water manifolds, and around the active areas B4A and B4C.

The two metallic current collection microscreen platelets B13-1 and B13-4 are identical. Platelet B13-1 is the anode current collection microscreen consisting of a repeating pattern of through etched or punched holes. Platelet B13-2 is the plastic or ceramic anode flow field platelet consisting of molded depth and through features. Platelet B13-2 contains the features that define anode active area flow field B16. The obverse side of platelet B13-2 forms the close out for the thermal management circuit B17 of platelet B13-3. Platelet B13-3 is the plastic or ceramic cathode flow field platelet consisting of molded depth and through features. Platelet B13-3 contains the features that define the thermal management heat exchanger B17 and cathode active area flow field B18. The cathode active area flow field B18 is on the obverse side of platelet B13-3.

In all plates B13-2 to B13-3 the through transverse border passages or manifolds B15 and compression tie rod holes B12 are coordinate with those of EMA B3 in FIG. 20.

FIGS. 22A–G are a series showing in plan view from the facing side of each platelet the details of one embodiment of the through and depth features of the 4 platelet bipolar separator plate of FIG. 21 in accord with the IFM principles of the invention. The progression of plates is as above, with FIG. 22A showing front (anode B13-1) of platelet 1 on the left and the back(cathode B13-4) of platelet 4 on the right. The anode current collector microscreen platelet Bl 3-1 has features that define the anode active area B4A. A sealing surface B19 with optional sealing ridges surrounds the active B4A. Manifold close outs for distribution and collection manifolds of the anode flow field platelet B13-2 are formed by the anode microscreen manifold close outs B21. The cathode current collector microscreen platelet B13-4 features define the cathode active area B4C. A sealing surface B22 with optional sealing ridges surrounds the active area B4C. Manifold close outs for distribution and collection manifolds of the anode flow field platelet B13-3 are formed by the cathode microscreen manifold close outs B22.

FIG. 22B is a plan view of the plastic anode flow field B13-2 -Front with a section of the anode current collector microscreen platelet B13-1 in the lower right corner. Platelet B13-1 is bonded into an anode current collector microscreen depression B25 and forms manifold close outs for the anode active area distribution manifold B23 and anode active area collection manifold B24. Two bus bars B14 are bonded to the anode current collector microscreen platelet to form a good electrical connection.

The anode current collector microscreen depression B25 is selected to place the surface of the anode microscreen platelet B13-1 flush with the surface of the anode flow field platelet B13-2, or it may be inset to form arecess which receives graphite paper electrodes of the electrode membrane assemblies.

FIG. 22C depicts the front side of the plastic anode flow field platelet B13-2 -Front. This platelet has both through and depth features. The major through features are the compression tie rod holes B12, transverse manifolds; hydrogen outlet manifold B6, hydrogen inlet manifold B7, water inlet manifold B8, water outlet manifold B9, air (oxygen) outlet manifold B11, and air (oxygen) inlet manifold B10. Other through features are the hydrogen inlet via B26 and the hydrogen outlet via B28. The major depth features on the front of the anode flow field platelet are anode active area serpentine channels B31, anode active area distribution manifold B23 and the anode active area collection manifold B24. These features are designed to optimize the flow rates and pressure drops of the device.

Hydrogen fuel for the anode area enters through the hydrogen inlet via B26, passes through the anode active area distribution manifold inlet B27, into the anode active area distribution manifold B23, flows into the anode active area serpentine channels B31 though the anode active area serpentine channel inlets B30. Within the active area hydrogen is catalytically oxidized on the anode side of an EMA to produce electrons and protons. Protons pass from the anode catalytic site through the electrolytic membrane to the cathode. Electrons are drawn off from the anode catalytic site through the graphite electrode. Electrons from the graphite electrode are collected by the anode current collector microscreen B13-1 and conducted through the composite bipolar separator by bus bars B14.

Depleted hydrogen leaves the active area via the anode active area serpentine channels exits B32 and flows into the anode active area collection manifold B24, through the active area collection manifold exit B29 and finally exits through the hydrogen exit via B28.

FIG. 22D depicts the back side of the plastic Anode Flow Field Platelet B13-2 -Back. This platelet has both through and depth features. The major through features are the compression tie rod holes B12, transverse manifolds; hydrogen outlet manifold B6, hydrogen inlet manifold B7, water inlet manifold B9, water outlet manifold B8, air (oxygen) outlet manifold B11, and air (oxygen) inlet manifold B10. Other through features are the hydrogen inlet via B28 and the hydrogen outlet via B26. The major depth features are the hydrogen inlet channel B34, hydrogen outlet channel B37, air (oxygen) outlet channel B40, air (oxygen) outlet via base B43, air (oxygen) inlet channel B50, and the air (oxygen) inlet via base B42. Most of the surface of the anode flow field platelet B13-2 is used as a close-out for the cooling water channels on the cathode flow field platelet B13-3.

Hydrogen flows from the hydrogen inlet manifold B7, through the hydrogen inlet channel inlet B35, into the hydrogen inlet channel B34, through the hydrogen inlet channel exit B33, and finely into the hydrogen inlet via B26. Hydrogen passes from back to front of the anode flow field platelet FIG. 22D, through the hydrogen inlet via B26. Depleted hydrogen from the active areas flows back through anode flow field platelet through the hydrogen outlet via B28, into the hydrogen outlet channel inlet B36, through the hydrogen outlet channel B37 and the hydrogen outlet channel exit B38, finally exiting into the hydrogen outlet manifold B6.

Air (oxygen) flows from the air (oxygen) inlet manifold B10, through the air (oxygen) inlet channel inlet B49, into the air (oxygen) inlet channel B50, through the air (oxygen) inlet channel exit B51, and finely into the air (oxygen) inlet via base B42 which communicates with the air (oxygen) inlet via B44 on the cathode flow field platelet B13-3 in FIG. 22E. The air (oxygen) inlet via B44 brings air (oxygen) to the cathode active area flow field.

Depleted air (oxygen) is removed from the cathode active area through the air (oxygen) outlet via B45 (FIG. 22E) into the air (oxygen) outlet via base B43, into air (oxygen) outlet channel inlet B41, through the air (oxygen) outlet channel B40, past the air (oxygen) outlet channel exit B39, finally exiting through the air (oxygen) outlet manifold B11.

Current is conducted through the anode flow field platelet via the two bus bars B14.

FIG. 22F depicts the front side of the plastic cathode flow field platelet B13-3 -Front. This platelet has both through and depth features. The major through features are the compression tie rod holes B12, transverse manifolds; hydrogen outlet manifold B6, hydrogen inlet manifold B7, water inlet manifold B9, water outlet manifold B8, air (oxygen) outlet manifold B11, and air (oxygen) inlet manifold B10. Other through features are the air (oxygen) inlet via B44 and the air (oxygen) outlet via B45. The major depth feature is the cooling water serpentine channels B46.

Cold cooling water enters through the cooling water inlet manifold B9, flows into the cooling water serpentine channel inlet B47, and passes into the cooling water serpentine channel B46. Flowing through the cooling water serpentine channel B46 the cooling water picks up heat which is a by product of the electrochemical reactions. Hot water exits through the cooling water serpentine channel exit B48, finally leaving through the cooling water outlet manifold B8.

Air (oxygen) passes through to the cathode flow field platelet B13-3 -Back through the air (oxygen) inlet via B44 which communicates with the air (oxygen) inlet via base B42 and the air (oxygen) inlet manifold B10 on the anode flow field platelet B13-2 -Back in FIG. 22D. Depleted air (oxygen) and product water leaves the cathode flow field active area through the air (oxygen) outlet via B45 which communicates with the air (oxygen) outlet via base B43 and the air (oxygen) outlet manifold B11 on the anode flow field platelet B13-2 -Back in FIG. 22D.

Current is conducted through the cathode flow field platelet via the two bus bars B14.

FIG. G depicts the back side of the plastic cathode flow field platelet B13-3 Back with a portion of the cathode current collector microscreen platelet B13-4 shown in position (fragmentary portion shown in the lower right corner). This platelet has both through and depth features. The major through features are the compression tie rod holes B12, transverse manifolds; hydrogen outlet manifold B6, hydrogen inlet manifold B7, water inlet manifold B9, water outlet manifold B8, air (oxygen) outlet manifold B11, and air (oxygen) inlet manifold B10. Other through features are the air (oxygen) inlet via B44 and the air (oxygen) outlet via B45. The major depth features on the cathode flow field platelet are the cathode active area distribution manifold B53, cathode active area collection manifold B57, and the cathode active area serpentine channels B55.

Air (oxygen) for the cathode enters the humidification area through the air (oxygen) inlet via B44, passes the cathode distribution manifold inlet B52, flows into the cathode distribution manifold B53 and is distributed to the cathode active area serpentine channels B55 though the cathode active area serpentine channel inlets B54. Within the active area oxygen is catalytically reduced receiving protons and electrons from the anode to produce water. Electrons flow from anode to cathode via bus bars B14, into the cathode current collector microscreen 17-4, through the cathode graphite electrode on the EMA and finely docking with a cathode catalytic site where the electrons react with anode generated protons and oxygen to produce surplus heat and product water. Depleted air (oxygen) and product water leaves the active area via the cathode active area serpentine channels exits B56 and flows into the cathode active area collection manifold B57, through the air (oxygen) collection manifold exit B58 finely exiting through the air (oxygen) exit via B45 which communicates with the air (oxygen) outlet via base B43 and the air (oxygen) outlet manifold B11 on the anode flow field platelet 13-2 -Back FIG. 22D.

Platelet B13-4 is bonded into a cathode current collector microscreen depression B59 and forms manifold close outs for the air (oxygen) active area distribution manifold B53, and the air (oxygen) active area collection manifold B57. Two bus bars B14 are bonded to the anode current collector microscreen platelet in a manner to provide good electrical conduction. The cathode current collector microscreen area B59 is selected either to place the surface of the anode microscreen platelet B13-4 flush with the surface of the cathode flow field platelet B13-3, or it may be inset to form a recess which receives graphite paper electrodes of the electrode membrane assemblies B3 in FIG. 20.

Edge and Through-Conduction Section Views

FIGS. 23A–D show several alternative constructions for edge conduction, taken along the section line 23—23 of FIG. 16. FIG. 23A shows the embodiment of FIG. 16 in which the anode microscreen F17-1 and cathode microscreen F17-4 are connected by current bridge F18, and folded together and bonded to the platelets F17-2 and F17-3 therebetween to form the BSP. Various depth, through and close-out features are described above with respect to FIG. 16 (and related platelet drawings) so they will not be repeated here or in FIGS. 23B–D.

FIG. 23B shows the tabs F94 on both the anode microscreen F17-1 and cathode microscreen platelet F17-4 bent together and bonded at the bottom, by methods such as brazing, soldering, spot welding, conductive cement, roll crimping, and the like. FIG. 23C shows an overlap of tabs F94 and bonded at F96. This type of contact could also be a press fit of tab F94 of platelet F1701 into the gap between the tab F94 of platelet F17-4 and the bottom of the two core platelets. FIG. 23D shows an example of two edge bus bars or strips F97 top and bottom spot welded or bonded at F98.

FIGS. 24A and B show section views of various embodiments of the bus-bar conduction taken along line 24—24 of FIG. 18. FIG. 24A shows an embodiment wherein the microscreens A17-1 and A17-4 are inset in a recesses A94 in the respective core platelets A17-2 and A17-3. The bus bars A18 are inserted through the bus bar retention slots A95. The various depth, through and close-out features are described above in connection with FIG. 18 and related platelet drawings. FIG. 24B shows microscreens with peripheral edges coordinate with the edges of the core platelets.

Composite Bipolar Separator Fabrication Processes

FIG. 25 is a flow sheet depicting the principal steps in the platelet manufacturing process involving feature formation by chemical milling (etching). While this applies principally to a metal microscreen platelet as described in the example below, the metal dies for the plastic core platelets are produced by this process. Further, this process is used to produce the plastic platelets themselves by chemical milling, typically by solvents. The steps are as follows:

A. PLATELET STOCK INSPECTION: Incoming metal platelet or stamping die stock C1 is subjected to inspection C2 to verify material type, rolled hardness, rolled thickness, surface uniformity, and relevant supplier information.

B. PLATELET STOCK CLEANING AND DRYING: Platelet stock is cleaned and dried C3 for photoresist application by scrubbing, degreasing, and chemical cleaning using an automatic machine. This process removes residual sheet stock rolling grease and oils in the case of metals and dirt and static cling contaminants in the case of plastics. After degreasing the platelet is subjected to a mild chemical cleaning at room temperature by a dilute etching solution to remove oxides and surface impurities. For titanium the cleaning solution is 3%–9% HF and 10%–18% HNO3. For other metals such as stainless steel or aluminum, ferric chloride of 30–45 degree Baume' at room temperature is used as the cleaning solution. For plastics, the appropriate plastic solvent may be employed. Platelets are dried in a forced convection dryer as the final step prior to application of photoresist.

Depending on whether the resist is wet or dry, the resist application proceeds by either Steps C-1 and C-2, or by C-3, below.

C-1. WET PROCESS PHOTORESIST APPLICATION: Wet process photoresist allows the finest resolution of details due to the thinness of the photoresist layer. Wet photoresist is typically applied, C4, using a dip tank. Small platelets may be spin coated using spin coating machines developed for the semiconductor industry.

C-2. RESIST OVEN: Wet resist is baked (cured) in oven C5 to from a hard resilient layer.

C-3. DRY PROCESS PHOTO-RESIST APPLICATION: Dry film photo-resist is used where tolerances can be relaxed. For fuel cell separators dry film resist is typically used. Dry film resist is peeled off a backing sheet and bonded, C6, using a heated roller press. The roller press is similar to those used in the printed circuit industry. The rolling process automatically peels off the backing material from the photoresist. Typical dry film photo-resist material is 2 mil "Riston 4620" manufactured by the duPont Company.

D. PHOTO-RESIST MASK UV EXPOSURE: Platelets are exposed C7 using a UV contact exposure machine. Careful attention is paid to precise alignment of both sides of the artwork. Registration targets on the mask are used to aid this process.

E. IMAGE DEVELOPING: The exposed platelet is passed, C8, through a developing solution and oven. Wet process resist is developed in a hydrocarbon developer, which removes uncured resist. Typical developer is "Stoddard's Solution", part number GW 325, manufactured by Great Western Chemicals and Butyl Acetate, part number CAS 104-46-4, available from Van Waters and Rogers. Wet process development uses these solutions full strength at room temperature. After exposure to the developing agents the remaining wet resist is rebaked to form a resilient layer. Dry process developing uses duPont "Liquid Developer Concentrate", part number D-4000, in a 1.5% solution at 80° F.

F. SPRAY ETCH TANK CHEMICAL MACHINING: Developed platelets are etched C9 in a spray etch tank. Spray tanks are preferred to dip tank etchers due to the higher etch rates which result in higher machine throughput rates. In some cases finer resolution can be obtained with dip tank etchers than can be obtained from spray etchers. The etching process is very sensitive to the strength of the etchant solution, speed of the conveyer belt, spray pressure and process temperature. Process feedback C11 on these parameters is maintained during a production run by continuous in-process inspection C10. Line speed is typically varied to obtain the desired etch results. Either ferric chloride or HF/nitric acid solution is used as the etchant. Ferric chloride is used for copper, aluminum, and stainless steel. HF/nitric acid is used for titanium. Fortitanium typical etchant concentrations run from 3%–10% HF and 10%–18% $HNO_3$. The range of etching temperatures for titanium are 80°–130° F. For other metals typical ferric chloride concentrations are 30°–45° Baume' with the etching temperature maintained in the range of 80°–130° F. The specific concentration and temperature conditions can be controlled for each different metal employed. Line speed is a function of the number of active etching tanks. Typical etchers are built up from individual etching tanks joined by a common conveyer. Typical etchers are available from Schmid Systems, Inc. of Maumee, Ohio and Atotech Chemcut of State College, Pa. Platelets are washed in a cascade washer after the last etch tank. The cascade washer removes excess etchant prior to inspection.

G. IN-PROCESS INSPECTION: Platelets are inspected at C10 to feed back etch rate and line speed information to the etching process. In-process inspection is typically performed visually.

H. STRIP RESIST: Wet process photo resist is stripped C12 using a hydrocarbon stripper at 200° F. A suitable one being "Chem Strip", part number PC 1822, manufactured by Alpha Metals of Carson, Calif. Dry process photo resist is stripped using a commercial strip solution such as "Ardrox", part number PC 4055, manufactured by Ardrox of La Mirada, Calif. Ardrox is diluted to 1–3% and used at 130° F. After stripping the platelets are cleaned using a cascade washer.

I. FINAL INSPECTION: Visual final inspection is performed C13 by measuring and comparing with the critical dimensions, platelet inspection information C30 selected during the CAD design process. This information is fed back to control the etching and design process. After final inspection the completed metal platelets are processed by either process J-1 or J-2.

J-1. NITRIDING FURNACE: Completed titanium platelets are subjected to nitriding C14 in a vacuum furnace. Separators are loaded into a vacuum furnace which is evacuated to $10^{-6}$ torr. Dry nitrogen is introduced into the furnace to a pressure of 1 psig. This cycle is repeated. Once the final pressure of 1 psig is attained, the furnace is heated to between 1200° F. and 1625° F. for a period of from about 20 to about 90 minutes. The specific times and temperatures depend upon the thickness of the titanium nitride coating desired. The furnace is cooled, repressured and the finished product nitrided (passivated) platelet is ready for assembly with plastic core fluid management platelets to make a composite separator.

J-2. NITRIDING FURNACE BYPASS: Metals other than titanium are not nitrided.

K. METAL MICROSCREEN MOTHERSHEET WORK IN PROCESS BUFFER INVENTORY: Completed metal microscreen mother sheets are queued in a buffer inventory being kept together by type or in groups. Note the roll stock is typically titanium of thickness 4–25 mils (depending on platelet design requirements) 36" wide and the platelet blanks are 6"×8", so that in the continuous feed process described above the platelets are arranged 6-up, that is, 6 across the width of the sheet.

It is important to note that this process can be used for forming the plastic core platelet compression or embossing dies.

FIG. 26 is a process flow sheet depicting the presently preferred method of fabricating plastic fluid management platelets and laminating with metal microscreen platelets to form monolithic composite bipolar separators.:

A. COMPRESSION MOLDING PROCESS: Incoming plastic platelet stock C17 is subjected to inspection to verify material type, rolled hardness, rolled thickness, surface uniformity, and relevant supplier information. After inspection plastic sheet stock is compression molded C18 to form depth and through features. Compression molding is capable of forming depth features with infinitely variable depths as well as widths.

B. PLASTIC PLATELET SINGULATOR: Plastic platelet mother sheets are singulated by the plastic platelet singulator C19. Shears, saws, knives and punches are typical methods of singulating plastic platelets.

C. ADHESIVE BOND AID APPLICATION PROCESS: Adhesive bond aid C20 is applied to the plastic core platelets to facilitate leak free bonding. The specific nature of the bond aid depends on the type of plastic being bonded. Bond aid varies from solvents, epoxy glues, and contact adhesives. Bond aid is applied using spray or screen printing processes depending upon the plastic platelet being fabricated.

Bond aid is applied to the mating lands of platelets and must be prevented from flowing into depth features which can cause partial or total blockage of fluid passages. This requires precise control of bond aid viscosity and application thickness. The viscosity and thickness parameters vary for each plastic/bond aid combination and are well known in the art.

D. METAL PLATELET SINGULATOR: Metal microscreen platelets mother sheets C16 are singulated by the metal platelet singulator C21. Shears, or saws are typical methods of singulating metal platelets.

E. STACKING PROCESS: Metal and plastic platelets are oriented horizontally ordered (placed in proper sequence), and vertically stacked in sequence C22 on hot platens. The platelet alignment holes (compression tie rod holes of the various figures) are placed over pins to precisely align the platelets so that mating platelet features correlate to form the vias, lands, manifolds and channels. In this manner up to 100 composite bipolar separators may be stacked for lamination at a time in a single bonding stack between a top and a bottom platen.

F. LAMINATION BONDING: The assembled platelet stacks are loaded into a heated lamination press for bonding C23. Different metals, plastic and bond aid combinations require different bonding schedules. Bonding conditions are determined by a specific schedule of applied pressure and temperature. Typical bond temperatures range 150 deg. C. to 300 deg. C. Bond pressure and temperature must be precisely controlled to prevent excessive deformation of internal passages while achieving leak proof bonds.

G. PROOF AND/OR LEAK CHECK: Bonded platelet separators are leak checked, C24, using a test fixture to apply internal pressure to the channels, manifolds and vias to verify bond integrity, i.e., that there are no edge leaks or internal channel short circuits.

H. FINAL TRIM: Processing aids, such as handling frames and platelet sequencing numbers (formed on the edges of the platelets) are removed (cut off) in the final trim operation C25 to produce the composite bonded platelet separator having the intricate, internal microchannel fields described above.

FIG. 27 depicts the process of preparing the platelet design artwork for the photolithography wet or dry process etching of platelets described above in FIGS. 25 and 26. The steps are as follows:

A. PLATELET DRAWINGS: Platelet assembly drawings are developed on computer automated drawing CAD systems C27. The drawings are dimensioned in net dimensions. Both sides of each platelet are finalized as plan views depicting the front and back. These drawings are electronically transmitted to the platelet mask artwork generation CAD system C29. From the CAD drawings a platelet inspection database C30 is generated. This inspection database consists of critical dimensions that need to be verified during the artwork creation and manufacturing processes. Both artwork and platelets are inspected during the manufacturing process.

B. MASK ARTWORK GENERATION: Platelet CAD drawings are converted in the mask artwork CAD system C29 to photo tooling masks for each platelet. Etch factors are applied to each feature in each drawing. Etch factors adjust the width of the phototooling mask to the width of the features to compensate for undercutting that occurs during the chemical etching processes used to mill individual platelets. This entails reducing channel dimensions in the photo tooling mask to compensate for undercutting. Etch factors depend upon the type of metal, type of chemical milling equipment, etch speed, type and strength of the etchant used. Fabrication aids are added during the mask generation process. Fabrication aids include registration targets, platelet numbers and handling frames to aid in the stacking and bonding process.

C. ARTWORK PHOTOPLOTTING: Platelet art work is plotted at a 1 times magnification on a film using an automatic photoplotter C31.

D. POSITIVE INSPECTION: Video inspection of the finished artwork is performed, C32, using the inspection database C30 generated during the Platelet CAD drawing process. After inspection the top (front) and bottom (back) platelet artworks are joined in precise registration to form platelet artwork C33.

Platelet artwork is used in the chemical milling processes that make metal microscreen platelets. It is also used to develop compression molding tooling.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A polar fidel cell separator assembly for a PEM fluid reactant fuel cell not having a graphite stencil layer comprising in operative combination:

a) at least one core platelet of thin sheet selected from a ceramic or plastic material having a first side and a second side, b) at least one side of each platelet having integrated fluid distribution features permanently formed therein, said features being selected from at least one of fields, close-outs, splitters; via bases, lands, tabs, metering orifices, channels, vias, mixers, filters, Coanda-effect circuits, diverters, and manifolds;

c) said features are interrelated and coordinate from platelet to platelet to provide in combination at least one permanent continuous microchannel fluid reactant flow field area; and d) said core platelet is bonded to selected ones of a current collector platelet to form a unipolar terminal current collector, to another core platelet, or to at least one other core platelet and at least one current collector to form a monolithic bipolar separator, for association with an electrode membrane assembly to form a fel cell stack, said bonded platelets integrated in the same plane as an active field, and/or in a plane parallel thereto, with either a humidification and/or cooling field in the same separator assembly.

2. A polar fuel cell separator assembly as in claim 1 wherein said current collector platelet material is selected from conductive plastic, conductive ceramic, metallized plastic, metallized ceramic or composites thereof to facilitate electron conduction from anode to cathode.

3. A polar fuel cell separator assembly as in claim 2 Wwherein at least some of said features form at least one coolant field for thermal management.

4. A polar fuel cell separator assembly as in claim 1 wherein at least one of said features form at least one humidification field for humidifying a fuel or an oxidant reactant.

5. A polar fuel cell separator assembly as in claim 3 wherein at least one of said features form at least one humidification field for humidifying a fuel or an oxidant reactant.

6. A polar fuel cell separator as in claim 5 wherein said coolant field communicates with at least one of said humidification fields to provide heated humidification fluid to said humidification field.

7. A polar fuel cell separator as in claim 1 wherein said features are formed by a combination of depth forming and through forming.

8. A polar fuel cell separator as in claim 2 wherein said core platelet is disposed between a pair of spaced apart microscreen collector platelets, or between a microscreen collector platelet and an endplate, and said pair of microscreen platelets and said microscreen and endplate combination are in electrical communication with each other by means selected from one or more current bridges, current tabs, spring clips, edge jumpers, pleated conductive current bridges, edge bus bars, internal bus bars, or combinations thereof.

9. A polar fuel cell separator assembly as in claim 8 wherein said core platelets are plastic and said features therein are formed by compression techniques selected from stamping, embossing, punching, compression molding of sheet stock and injection molding.

10. A polar fuel cell separator assembly as in claim 9 wherein at least some of said features are formed on each side of said core platelet.

11. A polar fuel cell separator assembly as in claim 10 wherein said core comprises at least a pair of platelets bonded to each other, a first of which is an anode flow fluid platelet and a second of which comprises a cathode flow field platelet.

12. A polar fuel cell separator assembly as in claim 11 which includes bonded to said platelet core a pair of microscreen platelets, including a first anode microscreen platelet and a second cathode-microscreen platelet.

13. A polar fuel cell separator assembly as in claim 12 wherein said microscreen platelet includes areas having apertures therein, said apertures being selected from round holes, hexagons, slots, Tees, chevrons, squares, diamonds, triangles, elllipsoids and NACA ports.

14. A platelet for a polar fuel cell separator assembly for a PEM fluid reactant fuel cell not having a graphite stencil layer comprsing:
   a) a thin sheet material platelet selected oTom ceramic, plastic, conductive plastic, conductive ceramic, metallized plastic, metallized ceramic or composites thereof, each said sheet having a first side and a second side;
   b) at least one side of said platelet having microchannel fluid distribution features formed therein, said features being selected from at least one of fields, metering orifices, channels, vias, via bases, lands, tabs, mixers, filters, diverters, splitters, Coanda-effect circuits, and manifolds, said platelet integrates in the same plane as an active field, and/or in a plane parallel thereto, with either a humidification an/or cooling field in the same separator assembly; and
   c) said features, in cooperation with corresponding ones of said features in other platelets in said fuel cell separator provide at least one microchannel fluid reactant flow field area.

15. A platelet as in claim 14 wherein said features in said flow field area include through features forming a microscreen current collector platelet.

16. A platelet as in claim 15 wherein said sheet is selected from electrically non-conductive plastic or electrically non-conductiveceramic, and includefeatures therein forming a core platelet selected from an anode flow field platelet and a cathode flow field platelet.

17. A platelet as in claim 16 wherein said features include features forming at least one microchannel coolant field.

18. A platelet as in claim 17 wherein said features include features forming at least one microchannel humidification field.

19. A platelet as in claim 18 it wherein said coolant field and said humidification field microchannels are in communication to provide counterflow humidification of reactant gases.

20. A platelet as in claim 19 wherein said reactant flow field area is formed in an external surface of a plurality of platelets forming a core, and said coolant field is interior thereof and disposed with an area coordinate with said reactant flow field area.

21. A platelet as in claim 20 wherein a platelet includes on said first surface at least one reactant flow field area and on said second surface said coolant field.

22. A platelet as in claim 21 wherein said first surface includes at least one humidification microchannel area.

23. A platelet as in claim 14 wherein said microchannels are tailored in length, cross-sectional dimensions and serpentine configuration to the reactant fluid composition and viscosity.

24. A fuel cell stack comprising in operative combination:
   a) a plurality of cells comprising:
      i) bipolar separators and membrane electrode assemblies in a stacked array;
      ii) an anode separator end plate at one end of said stack in contact with one of said membrane electrode assemblies;
      iii) a cathode separator end plate at a second end of said stack in contact with a membrane electrode assembly;
   b) said bipolar separator, and said anode and cathode separators include core platelets as in claim 18; and
   c) said cells are assembled in sequence under compression to form an operating cell.

25. A fuel cell stack as in claim 24 wherein said features include at least one microchannel coolant field area.

26. A fuel cell stack as in claim 25 wherein said features include at least one microchannel humidification field for a fuel or an oxidant in communication with said coolant field to provide heated fluid to said humidification field.

27. A fuel cell stack as in claim 26 wherein said fields are tailored in length, microchannel cross-section dimension and serpentine configuration for $H_2$ as fuel and air/$O_2$ as an oxidant.

28. A fuel cell stack as in claim 27 wherein said separators include electrically non-conductive core platelets of plastic or ceramic laminated between current collector microscreen platelets formed of diffusion bonded metal selected from Ti, Al, Cu, W, Niobium, stainless steel, alloys, laminates, platings and composites thereof.

29. A fuel cell stack as in claim 28 wherein:
   a) said membrane electrode assembly is selected from a carbon paper coated PEM and a carbon paperless PEM, and
   b) said separators include awindow frame platelet in contact with said carbon paper coated PEM or a window screen platelet in contact with said carbon paperless PEM.

30. A polar fnel cell separator assembly as in claim 4 wherein said humidification field is coplanar wit said reactant flow field.

31. A polar fuel cell separator assembly as in claim 30 wherein, in assembly with an electrode membrane, said humidification field of an anode or cathode side of a first separator assembly is in cross-membrane humidification communication with a reactant gas humidifing field of a cathode or anode side of an adjacent separator.

32. A polar fuel cell separator assembly as in claim 31 fwherein said humidification field is in communication with a coolant field to provide heated humidification fluid to said humidification field.

33. A polar fuel cell separator assembly as in claim 32 wherein said reactant gas humidifying field is disposed upstream of the electrode membrane active field for said reactant, and said coolant field is upstream of said humidification field to provide for countercurrent cross-membrane humidifying of said reactant gas with heated coolant fluid vapors passing through said membrane.

* * * * *